United States Patent [19]
Chimoto et al.

[11] Patent Number: 5,838,383
[45] Date of Patent: Nov. 17, 1998

[54] MULTIMEDIA TELEVISION RECEIVER AND METHOD OF BOOTING THE SAME

[75] Inventors: Hiroyuki Chimoto; Seijiro Yasuki; Shigeru Tashiro, all of Yokohama, Japan

[73] Assignee: Kabushiki Kaisha Toshiba, Kawasaki, Japan

[21] Appl. No.: 522,486

[22] Filed: Aug. 31, 1995

[30] Foreign Application Priority Data

Aug. 31, 1994 [JP] Japan .................................. 6-207378
Sep. 29, 1994 [JP] Japan .................................. 6-235728

[51] Int. Cl.$^6$ ........................... H04N 5/44; H04N 7/10; H04N 7/14
[52] U.S. Cl. .............................. 348/553; 348/7; 348/10; 348/12
[58] Field of Search ........................... 348/7, 10, 12, 348/553, 13, 11, 6; 455/6.2, 6.3; H04N 5/44, 7/10, 7/14

[56] References Cited

U.S. PATENT DOCUMENTS

| | | | |
|---|---|---|---|
| 4,489,394 | 12/1984 | Borg | 364/900 |
| 4,692,757 | 9/1987 | Tsuhara et al. | 340/721 |
| 5,140,425 | 8/1992 | Yamaguchi et al. | 348/553 |
| 5,208,665 | 5/1993 | McCalley et al. | 348/12 |
| 5,289,461 | 2/1994 | de Nijs | 370/58.1 |
| 5,436,675 | 7/1995 | Hayashi et al. | 348/725 |
| 5,471,577 | 11/1995 | Lightbody et al. | 348/552 |
| 5,539,880 | 7/1996 | Lakhani | 395/200.02 |
| 5,619,251 | 4/1997 | Kuroiwa et al. | 348/6 |
| 5,621,456 | 4/1997 | Florin et al. | 348/7 |

FOREIGN PATENT DOCUMENTS 0 600 647 6/1994 European Pat. Off. .
372032 11/1991 Japan .

OTHER PUBLICATIONS

Television Digest, vol. 34, No. 22, pp. 15–16, GI to Enter CE With Modular TV System, May 30, 1994.
"Programmable Receiver for a Multi–Media System", IBM Technical Disclosure Bulletin, vol. 36, No. 11, Nov. 1993, pp. 125 and 126.
Patent Abstracts of Japan, vol. 018, No. 088 (E–1507), Feb. 14, 1994 & JP–A–05 292423 (Hitachi Ltd), Nov. 5, 1993.
Patent Abstracts of Japan, vol. 014, No. 185 (P–1036), Apr. 13, 1990 & JP 02 033657 A (Hitachi Ltd), Feb. 2, 1990.

*Primary Examiner*—Mark R. Powell
*Assistant Examiner*—Vivek Srivastava
*Attorney, Agent, or Firm*—Cushman Darby & Cushman IP Group of Pillsbury Madison & Sutro, LLP

[57] ABSTRACT

An NTSC tuner, an ISDB tuner, a CATV tuner, and a CATV modulator are connected to an analog switch box. Demodulation sections, an A/D, clock-reproducing section, and a modulation section are connected between the analog switch box a bus. MPEG2 video decoder sections, an MPEG2 audio decoder sections, an NTSC/EDTV horizontal decoder section, an EDTV vertical decoder section, an MPEG2 video encoder section, and an MPEG2 audio encoder section are connected between the bus and a bus. An audio amplifier, a graphics controller, and A/D conversion sections are connected the bus. The switch box and the buses are connected to a bus controller, which is connected to a CPU, a memory, and a remote-control I/F. These modules are selectively used to receive and process digital broadcasting signals, digital CATV signals or NTSC broadcasting signals. Even while the CPU is performing bootstrap processing immediately after the power switch of the television receiver is turned on, a DMA device is initialized, causing a monitor to display an image being received, no matter whether an operating system has been activated or not.

17 Claims, 37 Drawing Sheets

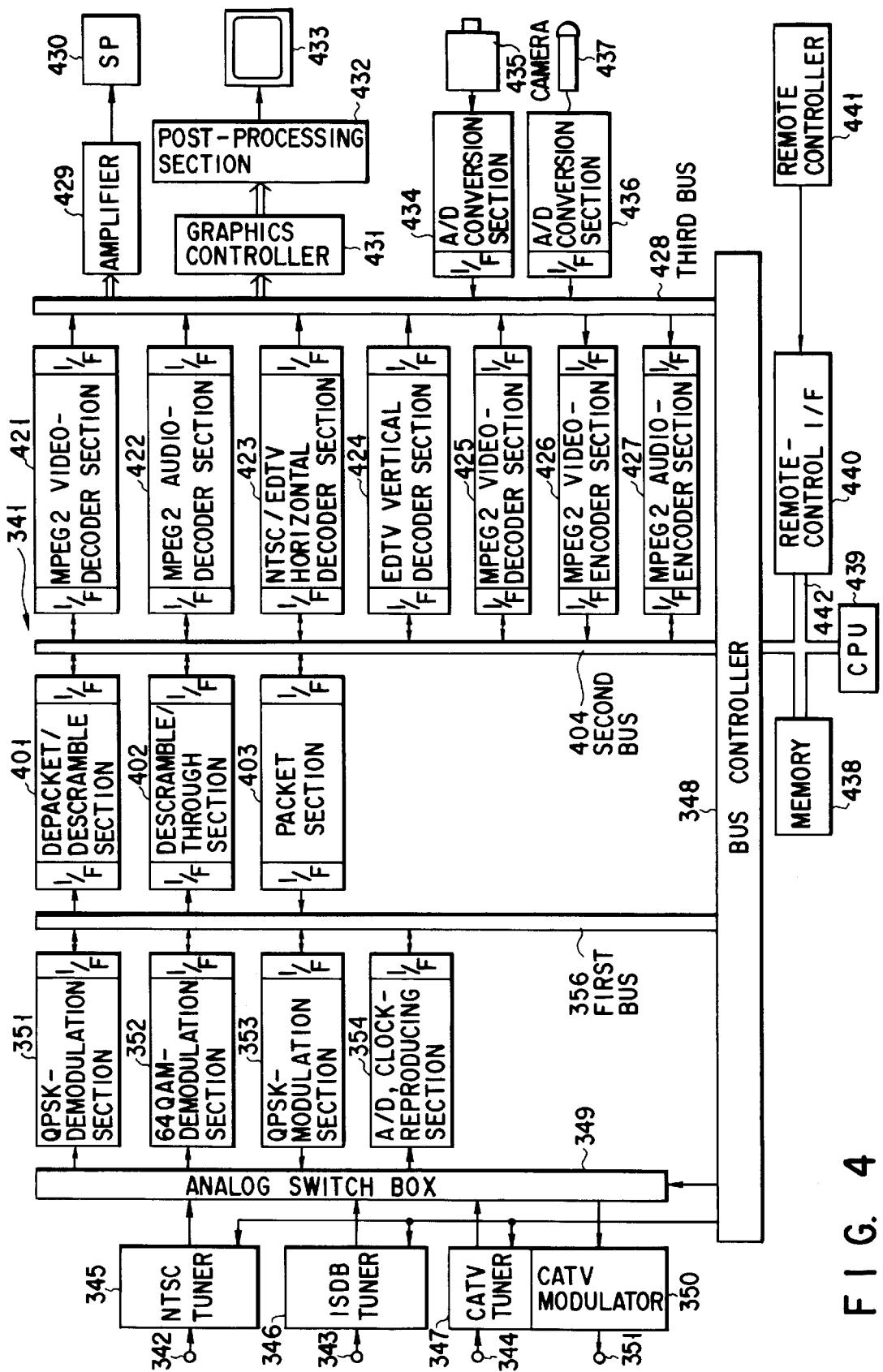
F I G. 4

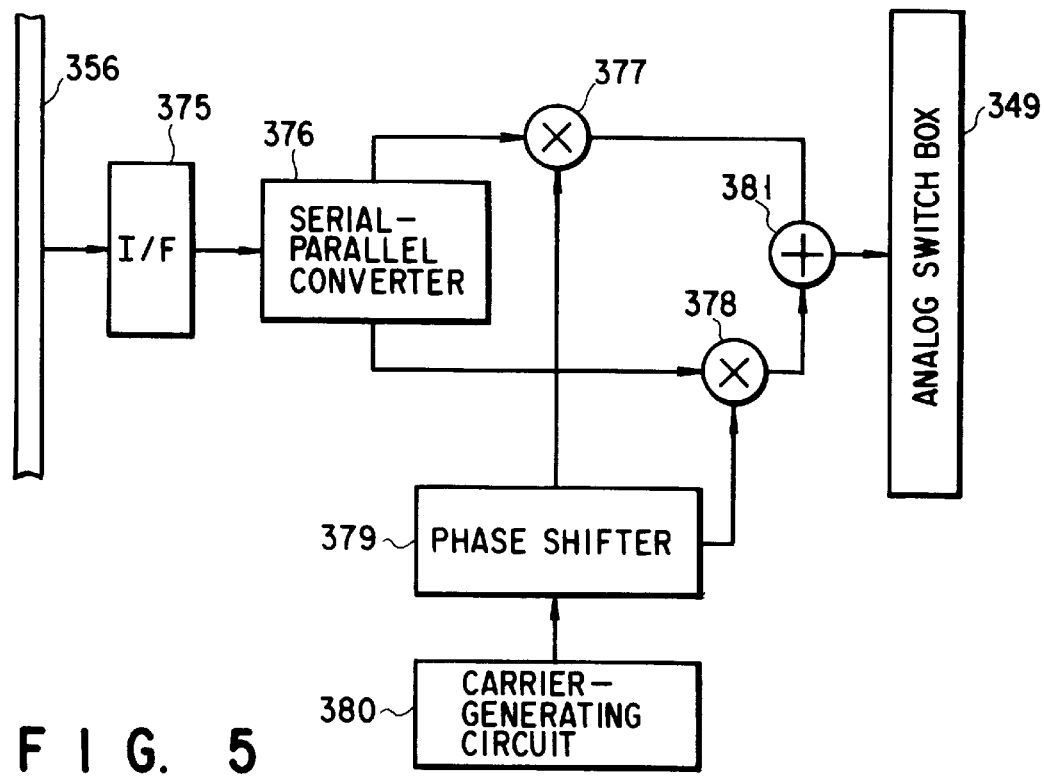
F I G. 5
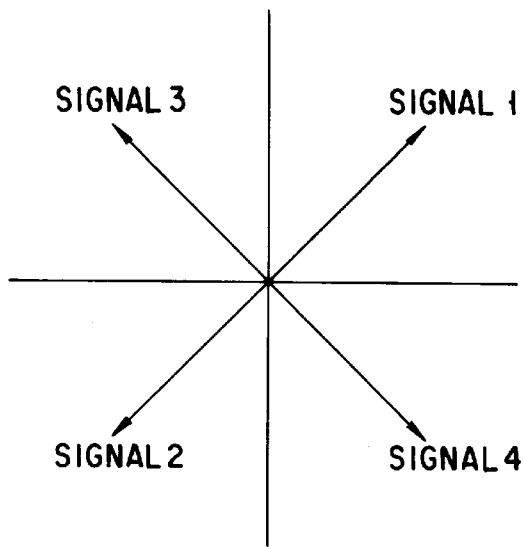
F I G. 6

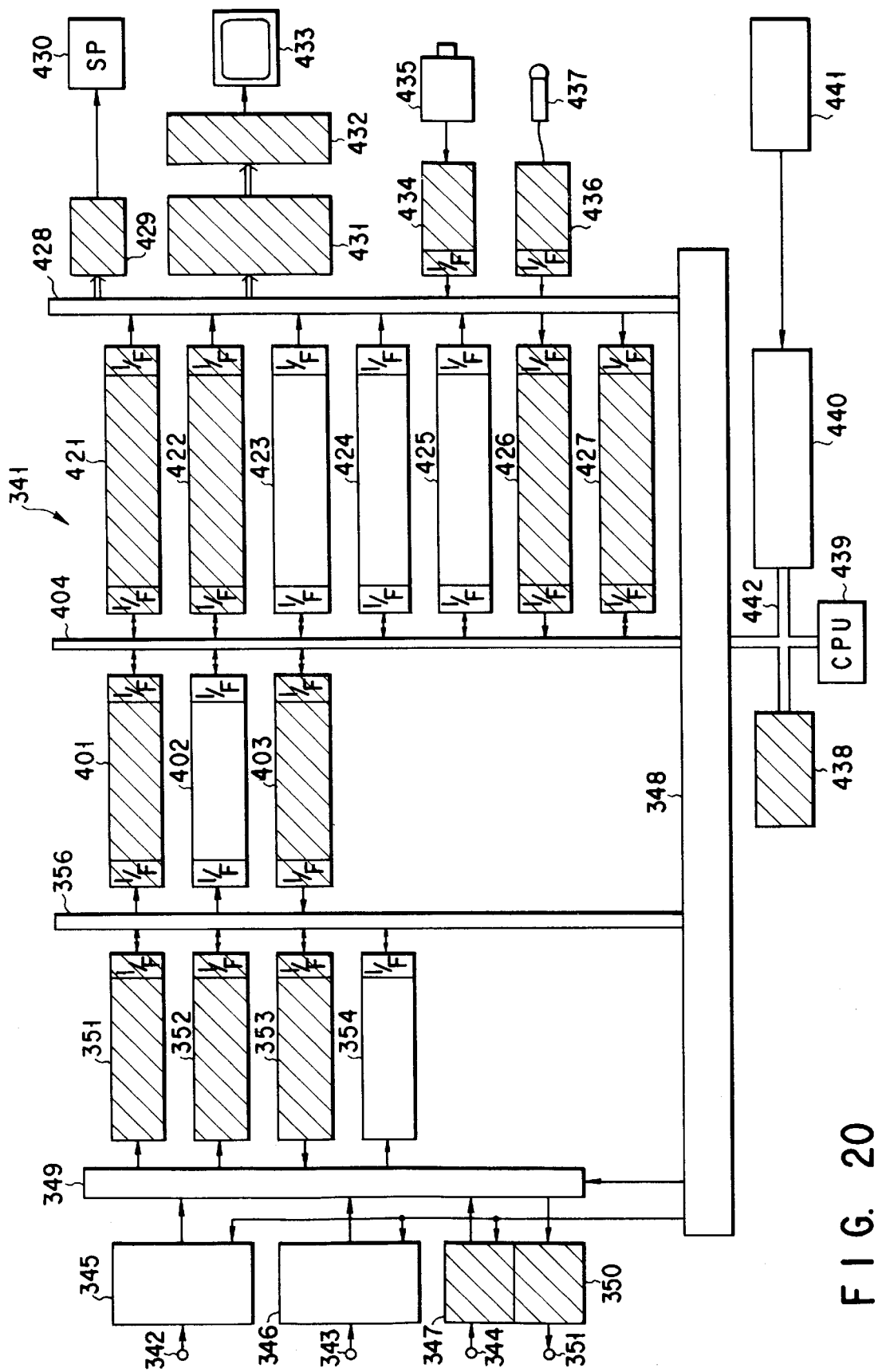
F I G. 20

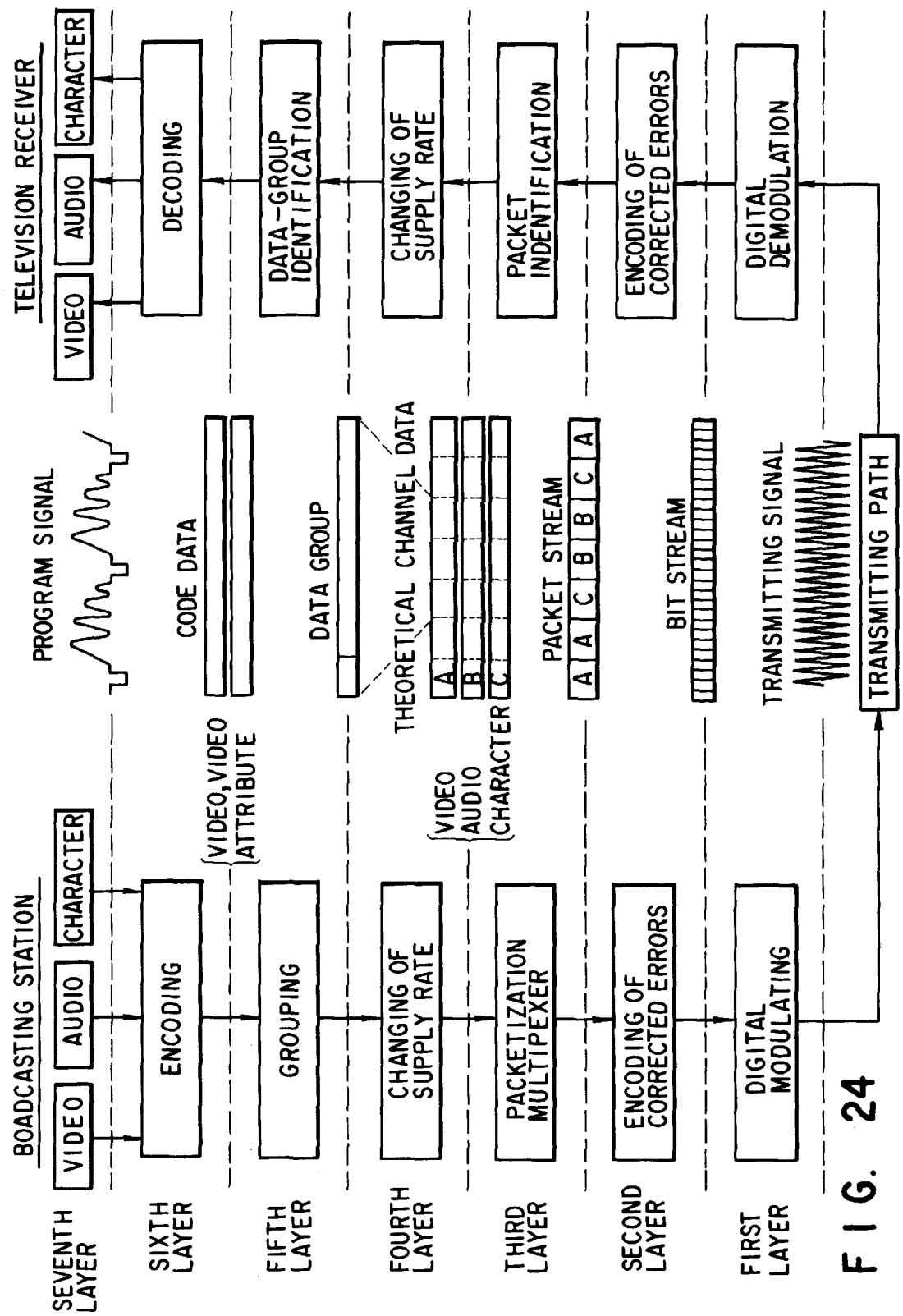
F I G. 24

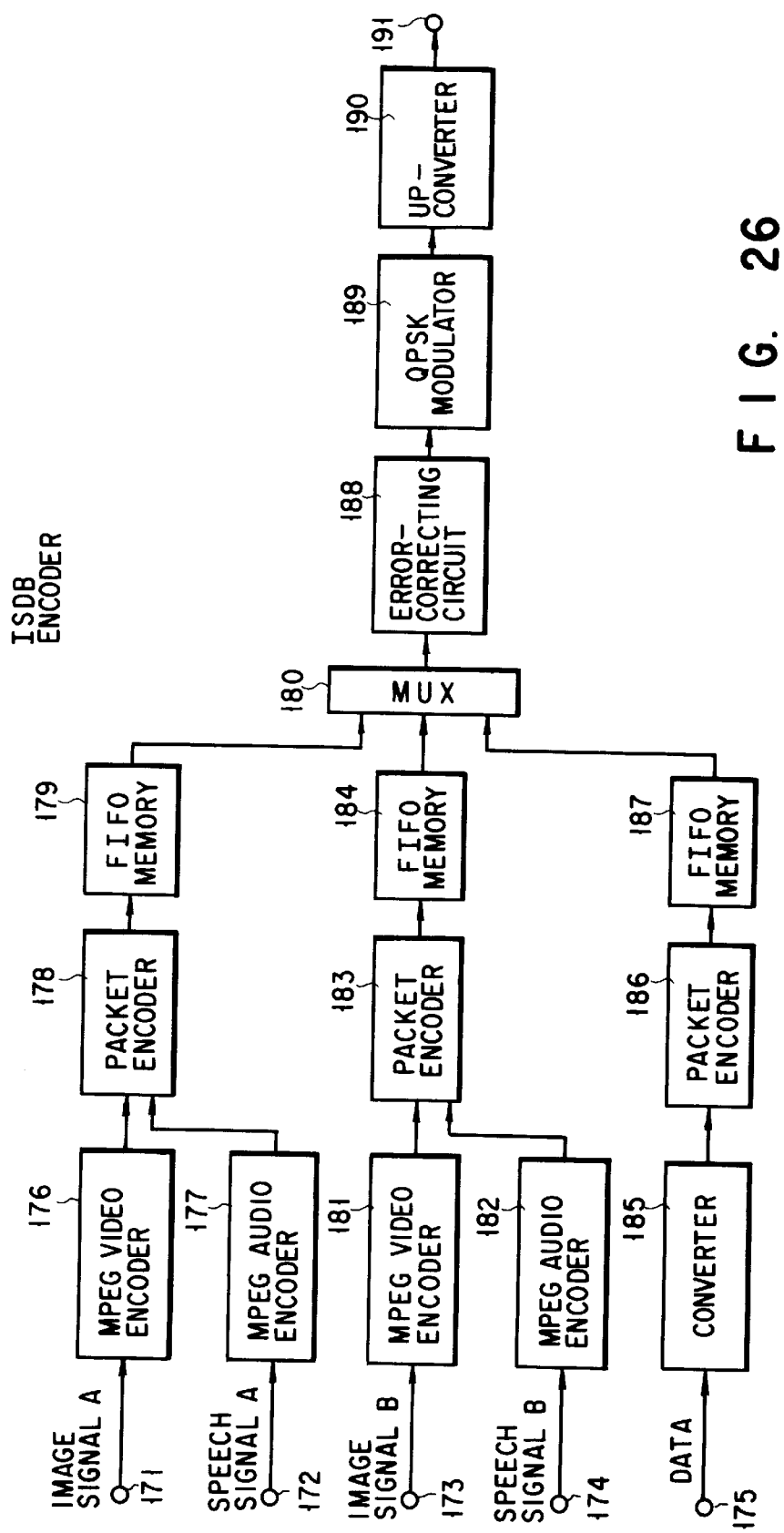
F I G. 26

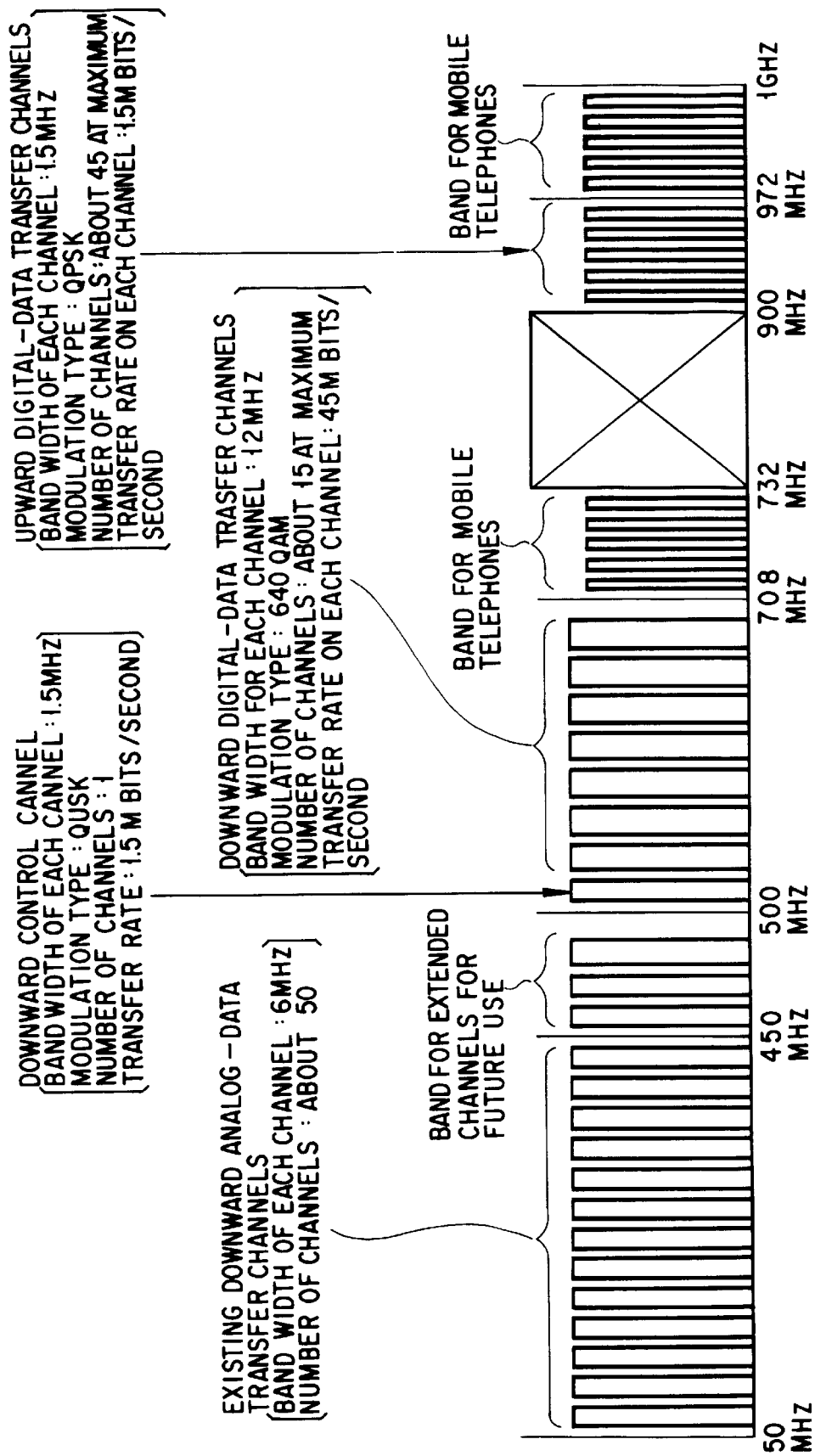
F I G. 27

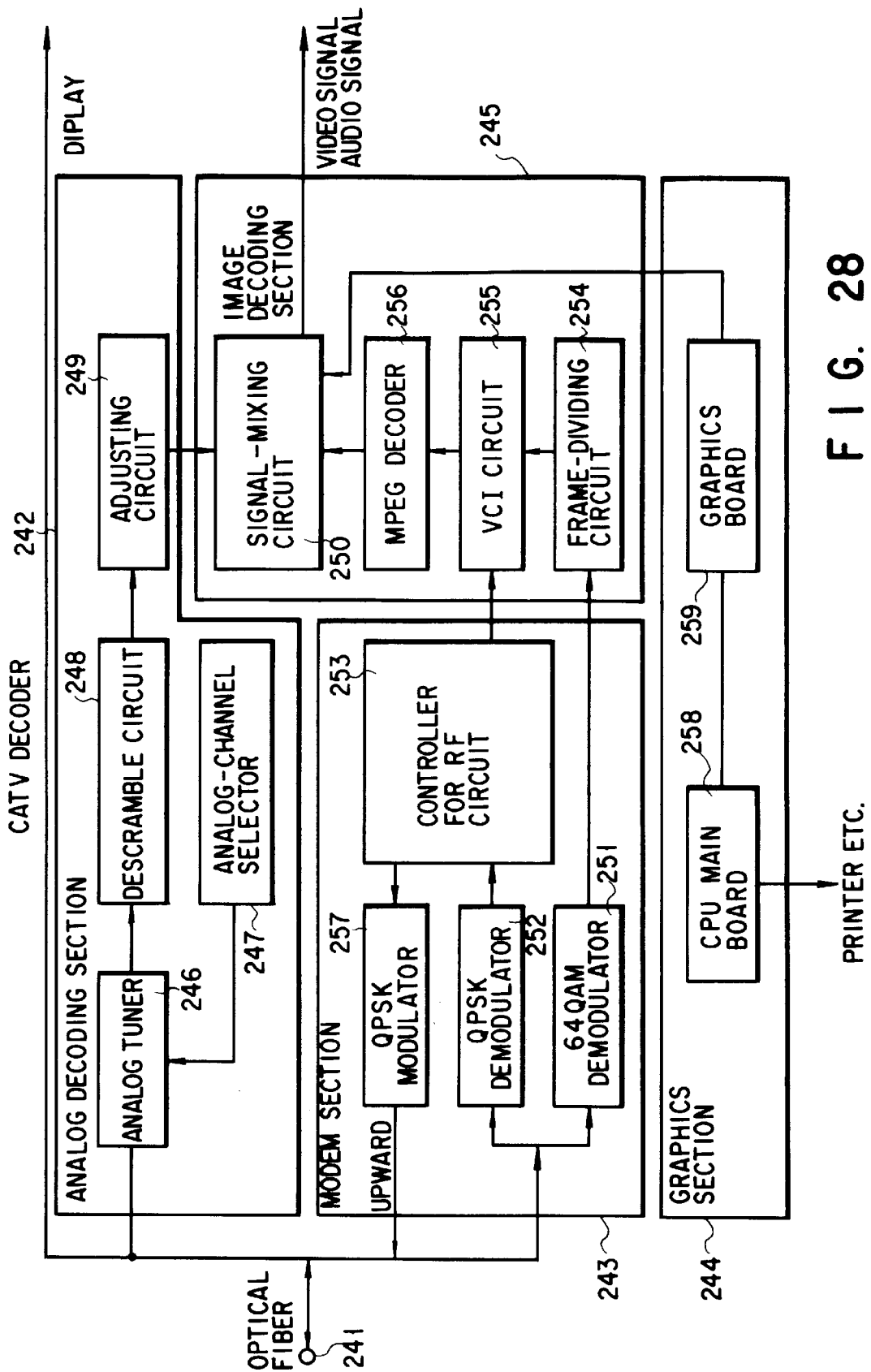
F I G. 28

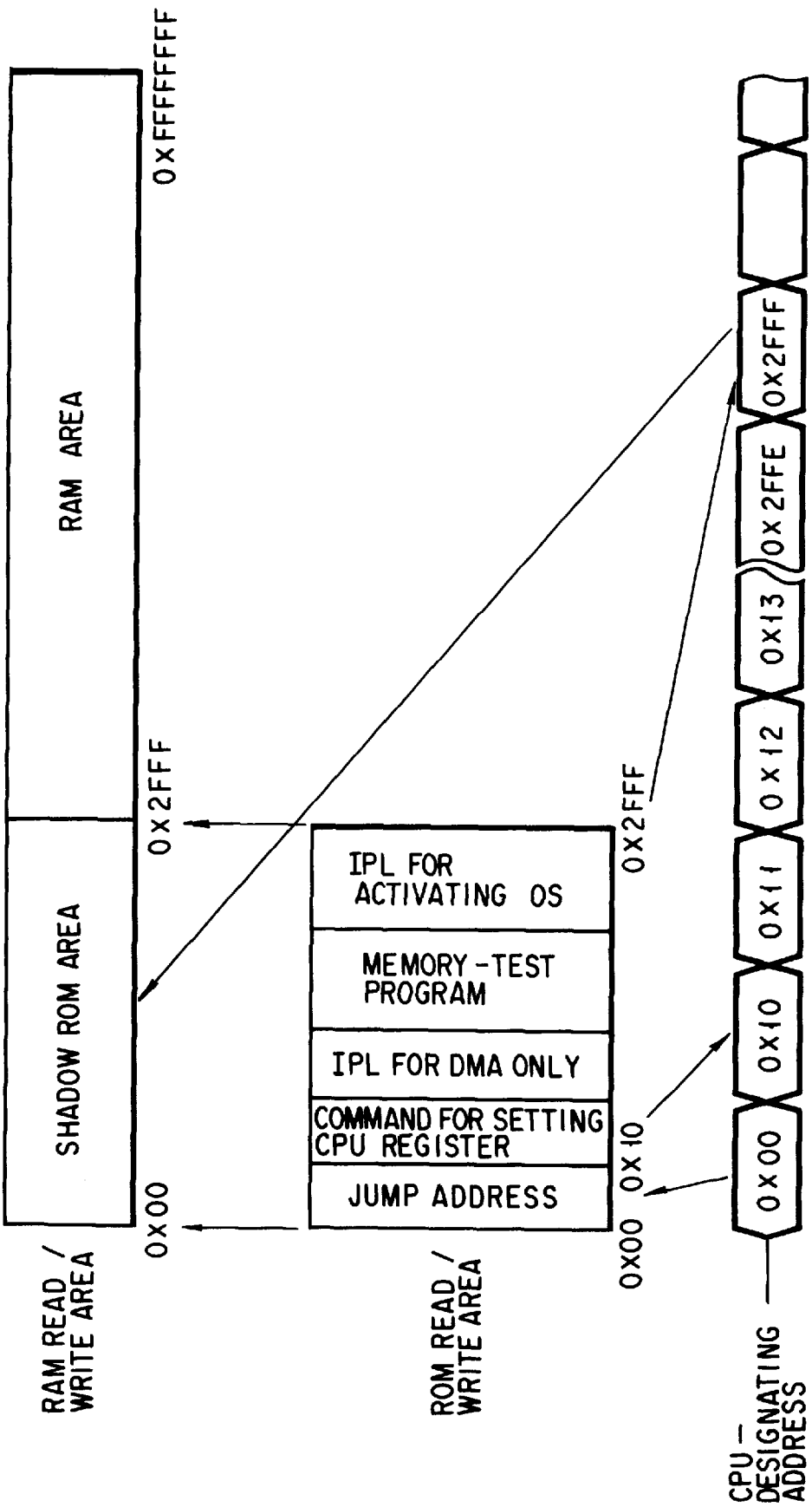
F I G. 33

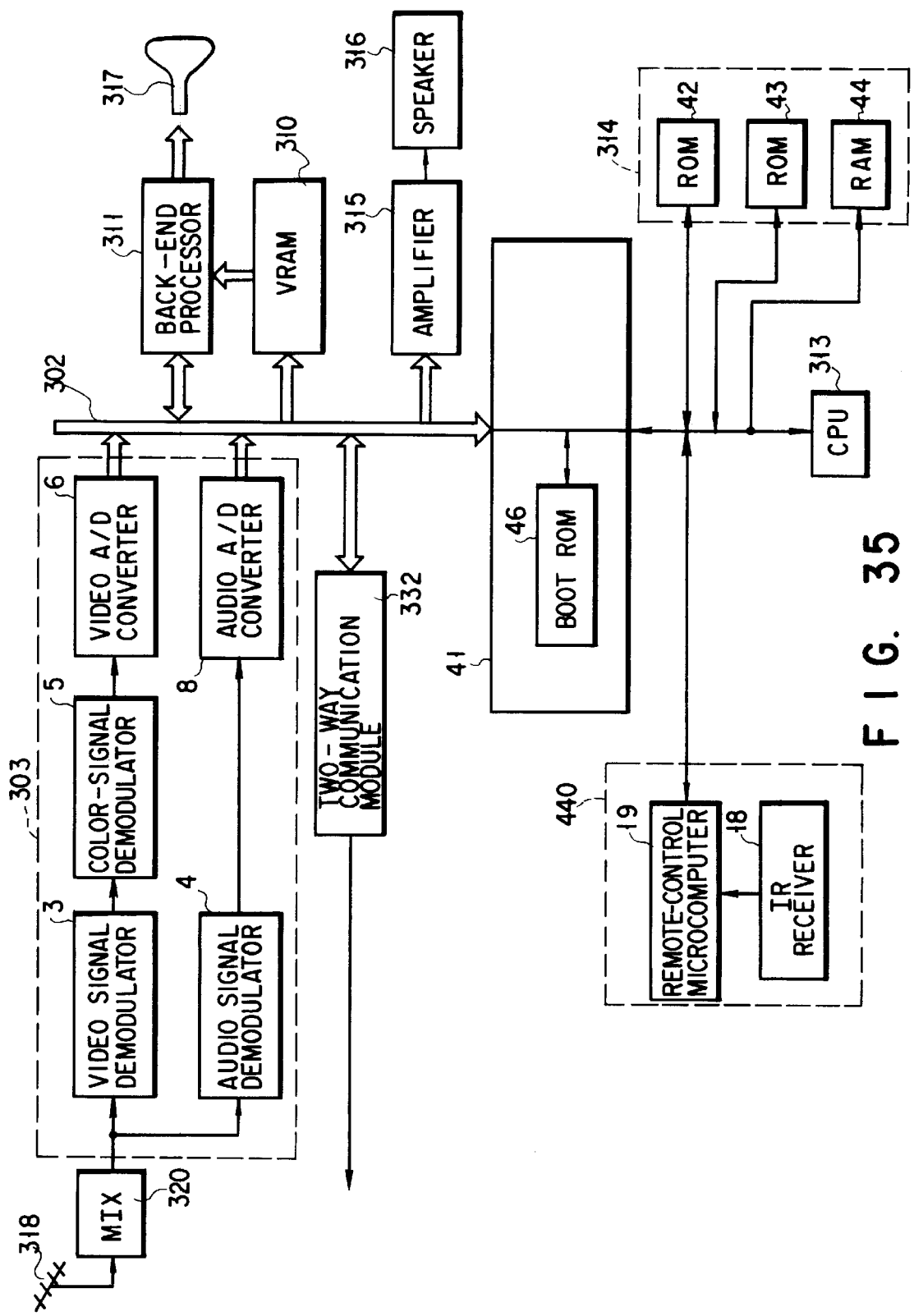
F I G. 35

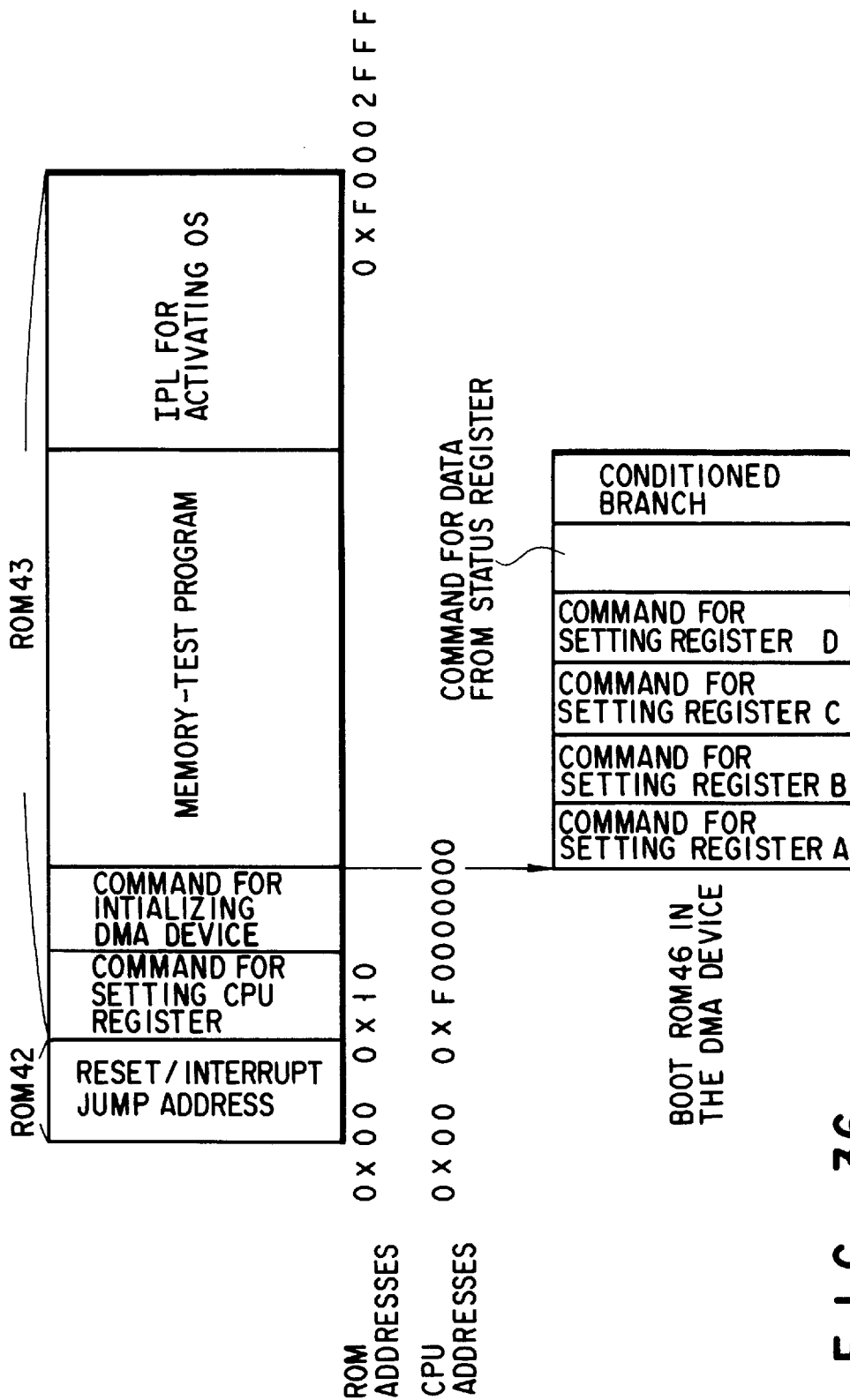
F I G. 36

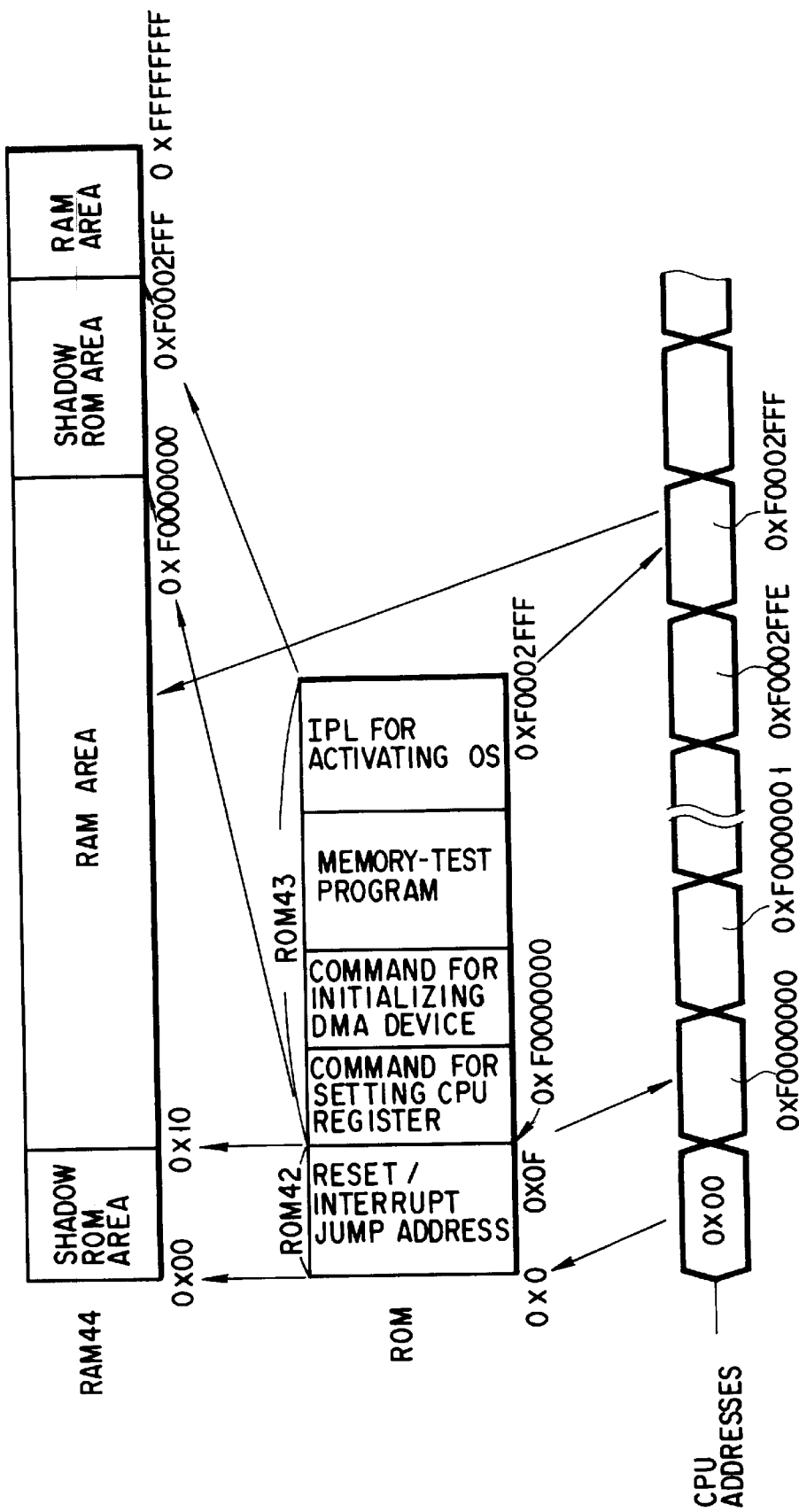
F I G. 38

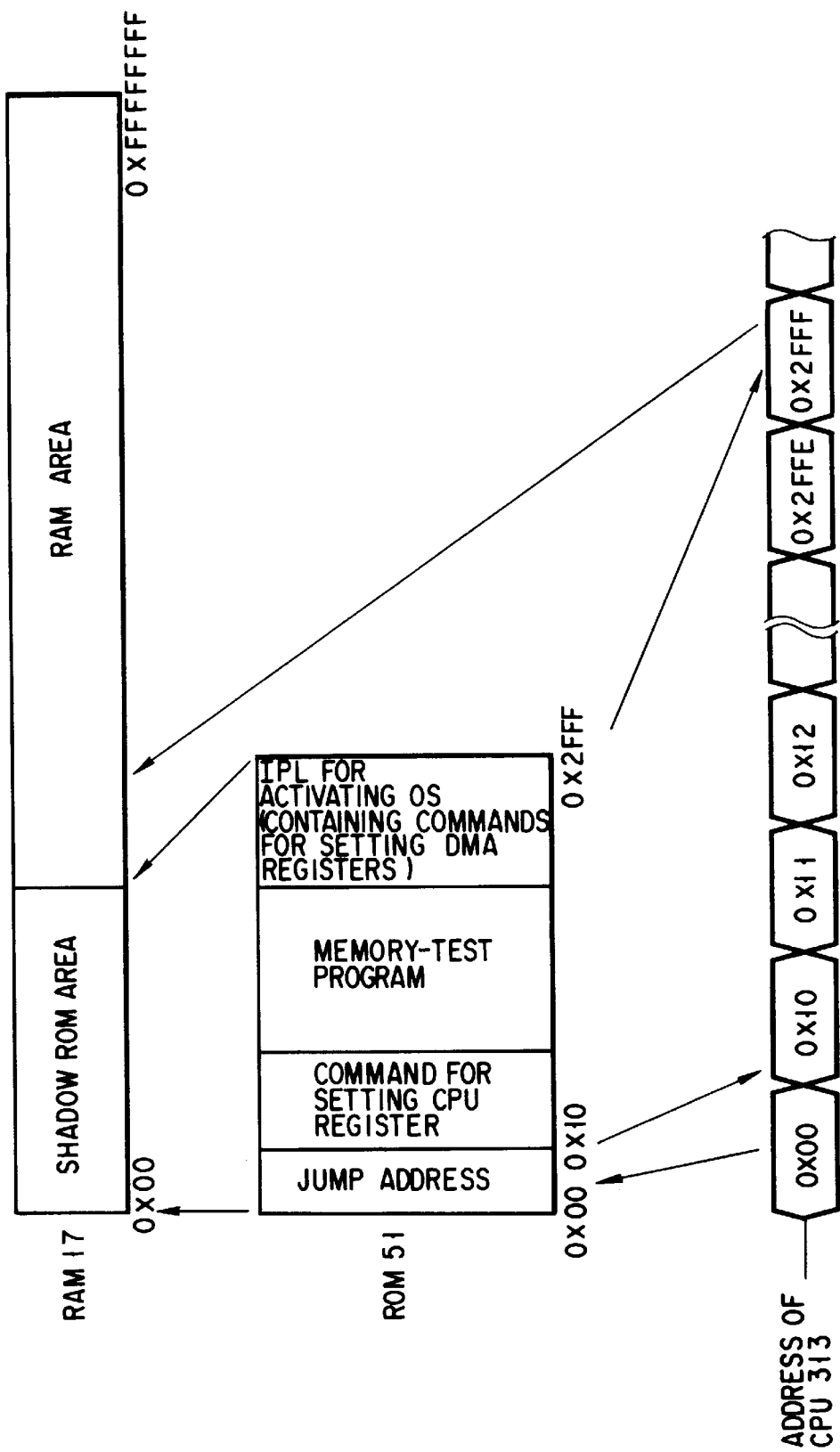
F I G. 42

MULTIMEDIA TELEVISION RECEIVER AND METHOD OF BOOTING THE SAME

BACKGROUND OF THE INVENTION

1. Field of the Invention

The present invention relates to a multimedia television receiver which can receive a plurality of broadcast signals and perform two-way communication and which incorporates a computer for controlling the video display processing circuit, and also relates to a method of booting the multimedia television receiver.

2. Description of the Related Art

In Japan, color television broadcasting is performed by the NTSC method. In the NTSC method, digital data representing characters may be multiplexed during the vertical blanking periods of broadcast signals. When television receivers receive the digital data, the TV audience can enjoy not only ordinary TV program but also character-broadcasting program).

So-called "second-generation EDTV (Extended Definition TV) broadcasting" came into service in 1995. The second-generation EDTV broadcasting is accomplished by the use of digital-data processing technique which improves the quality of images and sounds. Recently, a new type of broadcasting has been practiced, wherein audio channels for BSs (Broadcasting Satellites) are utilized to achieve data broadcasting and facsimile broadcasting.

In the field of TV-signal processing, the technique of processing digital data has advanced along with the data storage technique, making it possible to process digital data representing images. Digital television broadcasting is now discussed for its practical use.

Indispensable for successful digital television broadcasting is image-data compressing technique. Various proposals have been made on the standardization of image-compressing technique. International standards are now being formulated for the MPEG2 (Moving Picture Experts Group 2) method which is a digital compressed coding method designed to transmit moving pictures in the form of compressed digital codes. In the MPEG2 method, various encoding methods are employed such as inter-frame predictive encoding, run-length encoding and entropy encoding. The MPEG2 method is utilized in CATV systems and the like. In a CATV for effecting two-way data transmission is effected, moving-picture data is compressed, thereby enabling a number of channels to serve. If image data is compressed by the MPEG2 method, it will be retained that high-quality characteristics of sounds and images at the receiver.

Thanks to the completion of the MPEG2 method, multimedia systems have been developed very recently. In the multimedia system, various items of data, including images, are transmitted to the users at their request. Examples of multimedia system are a broadcasting system and a two-way CATV system, which can provide users with speeches, images and other kinds of data.

To decode encoded data items transmitted from a broadcasting station, a household-use television receiver needs to incorporate several decoders of various system. These decoders are as follows:

(a) NTSC decoder (b) Multiplex signal decoder

This is a decoder designed to decode multiplex character signals.

(c) Second-generation EDTV decoder

An example is disclosed in Television Society Journal, Vol. 17, No. 65, pp. 19–24, BCS' 93–42, December 1993). In the second-generation EDTV broadcasting, images are displayed on a wide screen having an aspect ratio of 16:9.

(d) ISDB decoders

Digital broadcasting using the 12 GHz-waves relayed by BSs, known as ISDB (Integrated Service Digital Broadcasting), is now discussed for its practical use. ISDB systems are disclosed in Television Society Journal, Vol. 115, No. 35, pp. 31–36, BCS' 91–38, December 1991); Hierarchical Model of ISDB, 1993 Proceeding of Television Society, ITE' 93, 15–6; and High-Functional Digital Service, 1993 Proceeding of Television Society, ITE' 93, 15–8.

In ISDB service, digital data (software) may be transmitted together with video data, so as to be used by the users. In this case, a software decoder must be incorporated into the television receiver. Moreover, the television receiver needs to incorporate video decoders so that the user may enjoy seeing many related images simultaneously, which have been sent by multi-angle broadcasting available in ISDB service.

(e) CATV decoders

CATV decoders must be incorporated into a household-use television receiver since CATV system and two-way CATV system have already been developed. CATV systems are disclosed in, for example, Nikkei Electronics, May 23, 1994, pp. 82–89.

All decoders mentioned above are available in the form of units. If a television receiver incorporates these decoders, the receiver will be a large-scale one. To receive and utilize the software sent in ISDB service, the receiver needs to be versatile enough to incorporate a decoder for performing an additional function.

The television receiver may incorporate a personal computer for controlling the video display operation for driving a cathode-ray tube or a liquid control device. In this case, the receiver does not display a TV program until the personal computer is prepared to control the video display processing circuit. The personal computer remains in boot state for some time after the power-supply switch of the receiver has been turned on. First, the boot-strap program is executed, then the memory is tested, and finally the IPL (Initial Program Loader) loads the OS (Operating System) into the memory. Namely, the computer cannot start controlling the video display processing circuit before the OS is loaded into the memory. Thus, the message "BOOTING" is automatically displayed on the CRT screen. The user can see no TV programs, disabling him or her to select a channel for any desirable TV program, until the computer starts controlling the video display processing circuit.

SUMMARY OF THE INVENTION

An object of the present invention is to provide a multimedia television receiver which has a plurality of decoder modules connected by a bus for decoding signals of various types, in which the decoder modules are selected in accordance with the type of signals to be decoded, and which can be manufactured at low cost.

Another object of the invention is to provide a multimedia television receiver which is versatile enough to perform various functions.

A further object of this invention is to a multimedia television receiver which comprises a television section and a personal computer and in which the personal computer controls the television section to enable the television section to display a TV program shortly after the power-supply switch is turned on though it takes some time to boot the operation system.

Still another object of the present invention is to provide a method of booting a multimedia television receiver according to the present invention.

To achieve the objects described above, the television receiver according to the present invention comprises a plurality of function modules for receiving and transmitting various kinds of broadcasting waves and communication waves, and a bus structure for enabling the modules to operate in time-division fashion or independently of one another.

The function modules can perform function required to receive and transmit various kinds of broadcasting waves and communication waves. Thanks to the bus structure, the modules are used in time-dividing fashion or independently to receive and transmit various kinds of broadcasting waves and communication waves. In other words, each function module can serve to receive and transmit two or more types of waves.

According to a first aspect of the invention there is provided a television receiver comprising: first, second and third buses; a receiving module for receiving various kinds of broadcasting waves and communication waves; an analog switch box for receiving signals from the receiving module; a demodulating module for demodulating the signal which the analog switch box selects, thereby to generate demodulated data; a converting module for receiving the demodulated data through the first bus and converting the demodulated data to a data stream; a decoding module for receiving the data stream from the demodulating module through the second bus and decoding the data stream, thereby to generate decoded data; an image-outputting module for receiving the decoded data from the decoding module through the third bus and outputting an image represented by the decoded data; a speech-outputting module for receiving the decoded data from the decoding module through the third bus and outputting a speech represented by the decoded data; a bus controller connected to the analog switch box and the first, second and third buses; and control means for controlling the receiving module, the demodulating module, the converting module, the decoding module, the image-outputting module, and the speech-outputting module, by using the analog switch box, the first to third buses and the bus controller, thereby to change an operating mode of each module in accordance with the broadcasting waves or the communication waves.

The receiving module can receive various kinds of broadcasting waves and communication waves. The demodulating module demodulates the signal received, generating demodulated data. The converting module converts the demodulated data to a data stream. The decoding module decodes the data stream, generating image data and speech data. The image-outputting module outputs the image represented by the image data. The speech-outputting module outputs the speech represented by the speech data. The bus controller changes the operating mode of each module in accordance with the broadcasting waves or the communication waves, whereby the television receiver can provide the user with various broadcasting services.

According to a second aspect of this invention there is provided a television receiver comprising: a power switch; receiving means for receiving and demodulating a television signal and outputting a video signal; analog-to-digital converting means for converting the video signal to a digital video signal; memory means for storing the digital video signal; display means for reading the digital video signal from the memory means, thereby to display an image; a bus for transferring the digital video signal between the analog-to-digital converting means and the memory means; control means for controlling transfer of data through the bus; a ROM storing a bootstrap program including a command for activating an operating system; and a CPU for initializing the control means in accordance with the bootstrap program stored in the ROM, immediately after the power switch is turned on, thereby to make data transfer possible and then setting the other components of the television receiver under the control of the operating system.

The CPU reads and executes the bootstrap program stored in the ROM immediately after the power switch is closed. First, the CPU initializes the control means, enabling the control means to transfer the digital video data. The digital video signal output by the analog-to-digital converting means is supplied via the memory means to the display means. The display means displays the image represented by the television signal. Since the CPU keeps executing the bootstrap program, the operating system is activated while the control means controlling the processing of the video data. Once the operating system is activated completely, the CPU set the other components of the television receiver under the control of the operating system.

According to a third aspect of the present invention there is provided a television receiver comprising: a power switch; receiving means, analog-to-digital converting means; memory means; display means; a bus for transferring a digital video signal; an analog bus for transferring a video signal from the receiving means to the display means; transfer control means for controlling the transfer of data through the bus; a ROM storing a bootstrap program containing a command for activating an operation system and a command for initializing the transfer control means; and a CPU for supplying the video signal through the analog bus to the display means immediately after the power switch is closed, thereby to cause the display means to display an image received by the receiving means, and for activating the operation system and initializing the transfer control means in accordance with the bootstrap program stored in the ROM, thereby to set the other components of the television receiver under the control of the operating system.

Immediately after the power switch is closed, the video signal received and demodulated by the receiving means is supplied through the analog bus to the display means, which displays the image received by the receiving means. The CPU executes the bootstrap program immediately after the power switch is turned on, thereby activating the operating system. Then, the CPU supplies the digital video signal from the analog-to-digital converting means through the memory means to the display means, and sets the other components of the television receiver under the control of the operating system.

According to a fourth aspect of this invention, there is provided a method of booting a television receiver comprising a power switch, a receiving means, a ROM, data-transfer control means, display means, the method comprising the steps of: accessing a jump address of the ROM immediately after the power switch is turned on; initializing the data-transfer control means in accordance with an initializing command stored at the jump address; receiving and demodulating a television signal, thereby generating a video signal; supplying the video signal to the display means under the control of the data-transfer control means, thereby to display an image received by the receiving means; activating an operating system at the same time the display means displays the image; and setting the processing of the video signal under the control of the operating system thus activated.

In this method, the jump address of the ROM is accessed immediately after the power switch is closed. Since the command for initializing the data-transfer control means is stored at the jump address, the digital video signal can be transferred before the operating system is activated, and the display means can display the image received by the receiving means. When the operating system is activated, the processing of the video signal is set under the control of the operating system, that is, the under the control of a computer.

According to a fifth aspect of the present invention there is provided a method of booting a television receiver comprising a analog bus, a digital bus, display means, and data-transfer control means, the method comprising the steps of: receiving and demodulating a television signal, generating a video signal; transferring the video signal through the analog bus to the display means, thereby to display an image; activating an operating system and initializing the data-transfer control means for controlling the digital bus, at the same time the display means displays the image; transferring the video signal through the digital bus to the display means after the operating system is activated; and setting the processing of the video signal under the control of the operating system.

Thus, immediately after the power switch is closed, the video signal produced by demodulating a television signal received can be transferred through the analog bus to the display means, which displays the image represented by the video signal. Immediately after the power switch is closed, the operating system is activated. Thereafter, a digital video signal can be transferred through the digital bus to the display means and is processed under the control of the operating system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4 is a block diagram illustrating another television receiver according to the present invention;

FIG. 5 is a block diagram showing the QPSK modulation section of the receiver illustrated in FIG. 4;

FIG. 6 is a diagram explaining the operation of the QPSK modulation section shown in FIG. 5;

FIG. 20 is a block diagram for explaining how the television receiver of FIG. 4 provides an eighth broadcasting service;

FIG. 24 is a diagram explaining the signal-processing effected in the ISDB system;

FIG. 26 is a block diagram showing the encoder incorporated in the ISDB system;

FIG. 27 is a diagram representing the spectrum of a signal used in a two-way CATV system;

FIG. 28 is a block diagram showing the decoder used in the two-way CATV system;

FIG. 33 is a chart explaining the booting of the television receiver shown in FIG. 30;

FIG. 35 is a block diagram illustrating another television receiver according to the present invention;

FIG. 36 is a diagram showing the contents of the ROM and the boot ROM, both incorporated in the television receiver shown in FIG. 35;

FIG. 38 is a chart explaining the booting of the television receiver shown in FIG. 35;

FIG. 42 is a chart explaining the booting of the television receiver shown in FIG. 40.

DETAILED DESCRIPTION OF THE PREFERRED EMBODIMENTS

Embodiments of the present invention will now be described, with reference to the accompanying drawings.

Figure 1:
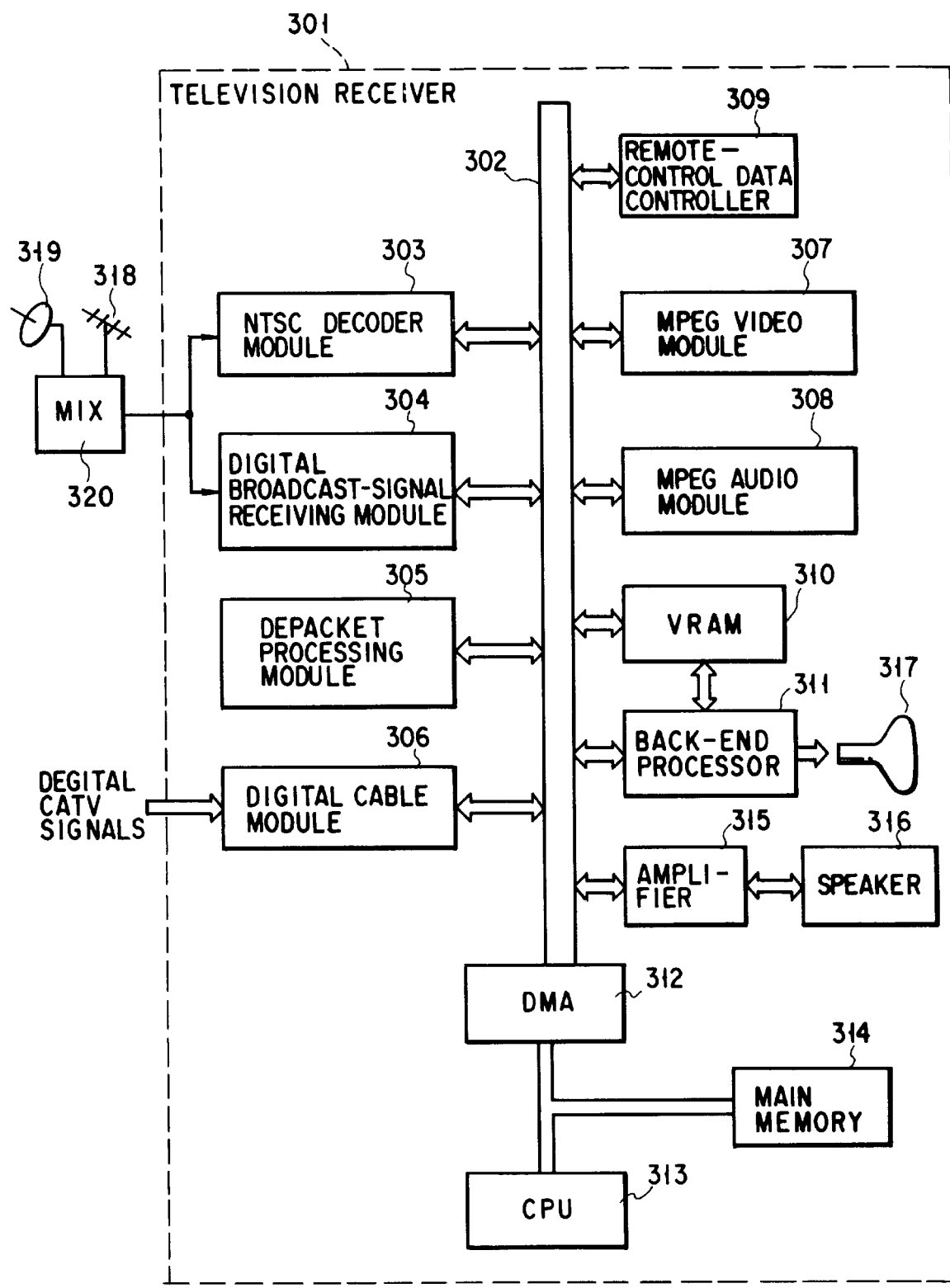
FIG. 1 is a block diagram showing a television receiver according to the present invention.
Figure 2:
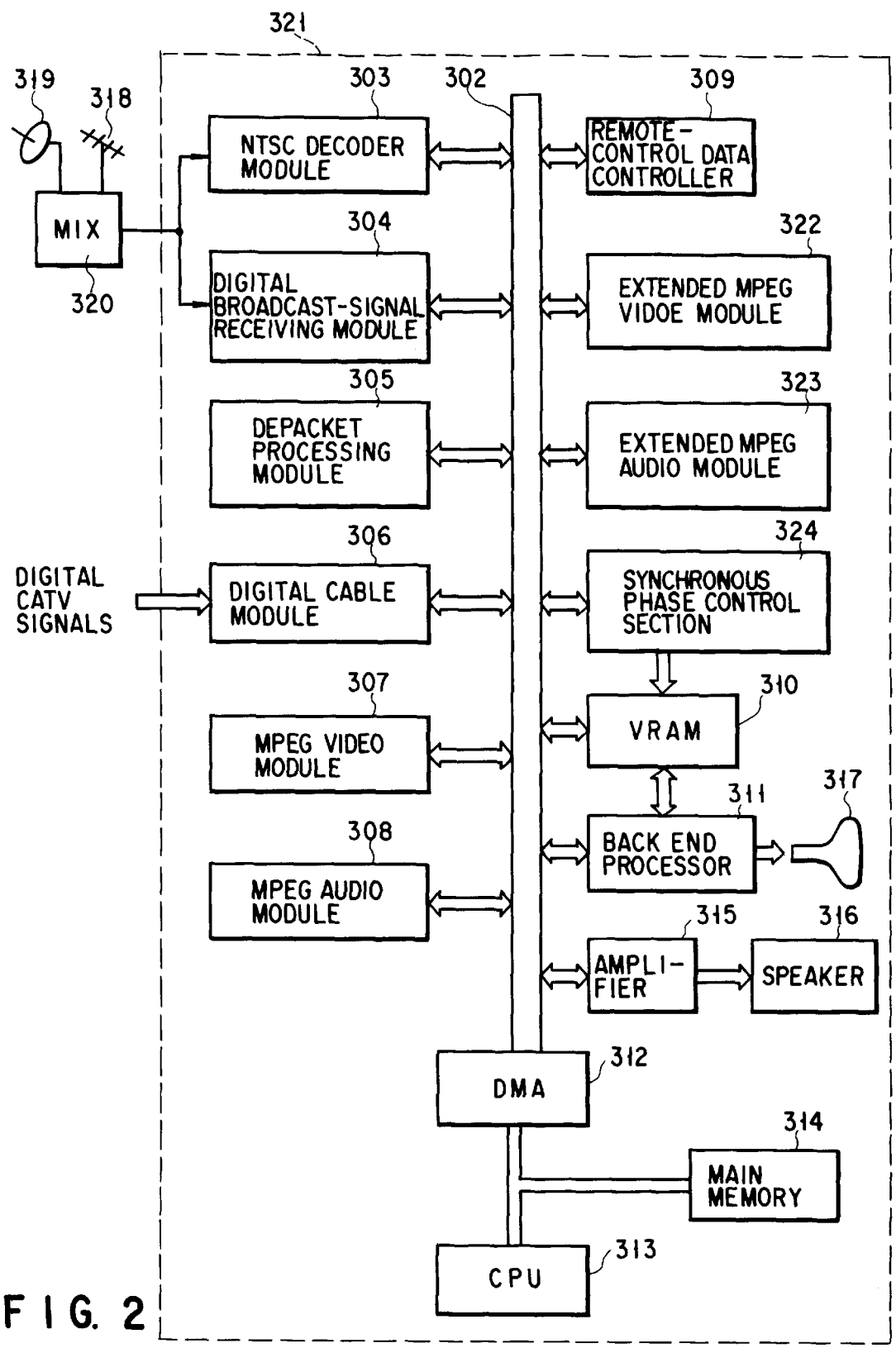
FIG. 2 is a block diagram showing another television receiver according to the invention.
Figure 3:
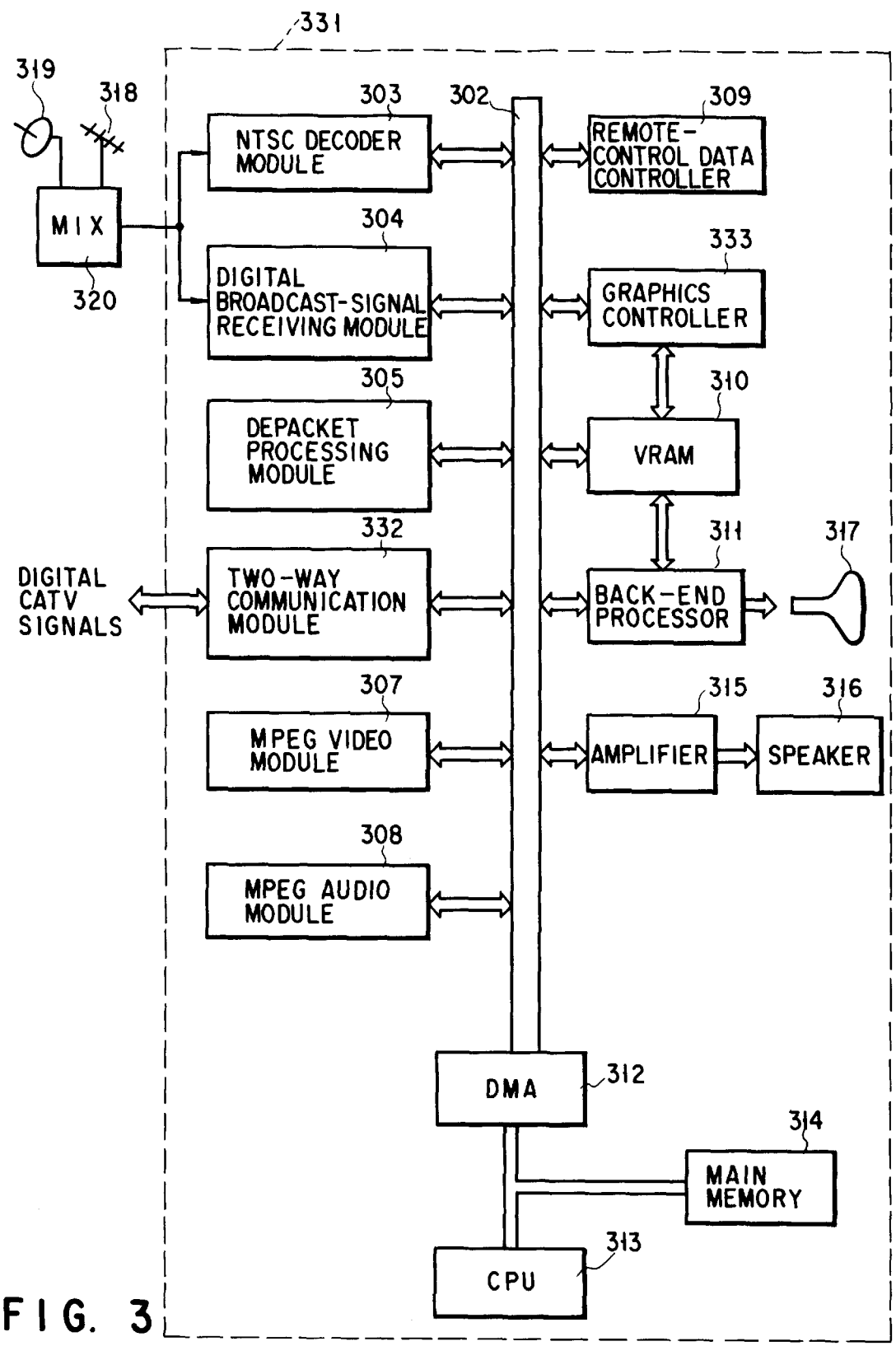
FIG. 3 is a block diagram showing still another television receiver according to this invention.

FIGS. 1 to 3 are block diagrams, each showing a television receiver according to this invention which can receive not only NTSC analog TV signals but also digital broadcast signals. The digital broadcast signals include ground-wave signals, broadcasting-satellite (BS) signals, and cable-television (CATV) signals.

The television receiver 301 shown in FIG. 1 will be described first. Connected to the receiver 302 are a ground-wave antenna 318 and a BS antenna 319. The ground-wave antenna 318 generates TV signals from the broadcast waves it receives from ground broadcasting stations. The BS antenna 319 generates TV signals from the broadcast waves it receives from a broadcasting satellite. The TV signals generated either antenna are input to a tuner 320. The tuner 320 is a mixer circuit (hereinafter referred to as "MIX 320"). The MIX 320 supplies the TV signals to the television receiver 301.

As FIG. 1 shows, the television receiver 301 comprises a bus 302, an NTSC decoder module 303, a digital broadcast-signal receiving module 304, a depacket processing module 305, a digital cable module 306, an MPEG video module 307, and an MPEG audio module 308. The bus 302 connects the modules 302 to 308, one to another. The receiver 301 further comprises a DMA (Direct Memory-Access) device 312, a CPU 313, a main memory 314, a VRAM 310, a back-end processor 311, a CRT (Cathode-ray Tube) 317, an amplifier 315, a speaker 316, and a remote-control data controller 309.

The main memory 314 stores a control program. The CPU 313 executes this program to control the other components of the receiver 301. The CPU 313 can set parameters in the modules 303 to 308 and change the parameters whenever necessary. When controlled by the CPU 313, the DMA device 312 controls the transfer of data through the bus 302. Data is thereby transferred among the modules 303 to 308.

The NTSC decoder module 303 comprises processing units (not shown) such a high-frequency receiving unit, a video demodulation unit, and color-signal demodulating unit. The module 303 decodes the NTSC analog TV signals supplied from the MIX 320, thereby generating digital signals. The digital signals are supplied via the bus 302 to the digital broadcast-signal receiving module 304. The module 304 outputs digital data of the channel the user has selected. The digital data is outputted from the module 304 through the bus 302. The depacket processing module 305 performs depacket process on the data packet supplied to it through the bus 302, converting the data packet into a stream of digital data. The digital data stream is supplied from the module 305 to the bus 302. The MPEG video module 307 receives MPEG-encoded video data via the bus 302 and decodes the video data into image data, which is supplied to the bus 302. The MPEG audio module 308 receives MPEG-encoded audio data via the bus 302 and decodes the audio data into speech data, which is supplied to the bus 302. The video module 307 and the audio module 308 are of either MPEG1 type or MPEG2 type. The digital cable module 306 has a CATV tuner (not shown). The module 306 receives CATV signals supplied via the CATV cable (not shown) connected to it and generate a data packet for the channel selected. The data packet is supplied from the module 306 through the bus 302.

The modules 303 to 308 perform various functions, cooperating to provide one of various broadcasting services, as the data transfer among them is controlled by the DMA device 312. It is not that each module operates for a specific broadcasting service. The modules 303 to 308 may operate independently of one another or in time-dividing fashion, under the control of the DMA device 312. The parameters set in each module can be changed so that the module may cooperate with the other modules to achieve a different broadcasting service. The modules 303 to 308 can be removed from the housing of the television receiver 301.

The VRAM 310 holds the image data supplied to it via the bus 302. The back-end processor 311 receives the image data from the VRAM 310 and processes the image data while being controlled by the control data input via the bus 302. The image data processed by the processor 311 is stored into the VRAM 310 and also supplied to the CRT 317. The CRT 317 displays the image represented by the image data supplied from the back-end processor 311. The amplifier 315 amplifies the speech data it has received through the bus 302. The amplified speech data is input to the speaker 316. The speaker 316 converts the speech data into a speech. The remote-control data controller 309 receives the remote control data the user has input by operating a remote controller (not shown) and supplies the remote control data to the bus 302.

How the television receiver 301 operates will now be explained.

When the user operates the remote controller to designate the receipt of NTSC analog TV signals of the channel the user has selected. The remote controller generates and transmits remote control data designating the receipt of NTSC analog TV signals of the selected channel, to the television receiver 301. In the receiver 301, the data controller 309 receives the remote control data and supplies the data to the bus 302. The CPU 313 receives the remote control data and transfers parameters to the NTSC decoder module 303 via the DMA device 312 and the bus 302. Once these parameters are set in the NTSC decoder module 303, the module 303 can receive and process NTSC analog TV signals.

In the meantime, the ground-wave antenna 318 generates TV signals from the broadcast waves it receives from the ground broadcasting stations. The TV signals, i.e., analog signals, are supplied via the MIX 320 to the NTSC decoder module 303. The module 303 selects the TV signals of the channel designated by the remote control data supplied from the remote-control data controller 309. The module 303 decodes these signals into base-band video signals and further converts these video signals to digital image data and digital speech data. Both items of digital data are supplied from the module 303 to the bus 302. The DMA device 312 transfers the image data to the VRAM 310 and the speech data to the amplifier 315.

The image data is read from the VRAM 310 and processed by the back-end processor 311. The image data processed is supplied to the CRT 317, which displays the image represented by the image data. On the other hand, the amplifier 315 amplifies the speech data. The amplified speech data is input to the speaker 316, which converts the speech data into a speech.

When the user operates the remote controller to designate the receipt of BS signals of the channel the user has selected. The remote controller generates and transmits remote control data designating the receipt of BS signals of the selected channel, to the television receiver 301. In the receiver 301, the data controller 309 receives and supplies the remote control data to the CPU 313. The CPU 313 supplies prescribed parameters through the DMA device 312 and the bus 302 to the digital broadcast-signal receiving module 304, the depacket processing module 305, the MPEG video module 307, and the MPEG audio module 308. Once these parameters are set in the modules 304, 305, 307 and 308, these modules are made to receive and process BS signals.

Meanwhile, the BS antenna 319 generates BS signals from the broadcast waves it receives from the broadcasting satellite. The BS signals are input via the MIX 320 to the television receiver 301. In the receiver 301, the receiving module 304 selects the BS signals of the channel designated by the remote control data supplied from the remote-control data controller 309 and converts them into a stream of bits. The stream of bits is supplied to the bus 302. The DMA device 312 transfers the stream of bits to the depacket processing module 305. The module 305 converts the bit stream into a stream of MPEG data, which is supplied to the bus 302. The MPEG data stream consists of a video data stream and an audio data stream. The DMA device 312 transfers the video data stream to the MPEG video module 307, and the audio data stream to the MPEG audio module 308.

The MPEG video module 307 decodes the video data stream into image data. The MPEG audio module 308 decodes the audio data stream into speech data. The DMA device 312 transfers the image data to the VRAM 310 through the bus 302, and the speech data to the amplifier 315 through the bus 302. The image data is read from the VRAM 310 and processed by the back-end processor 311. The image data processed is supplied to the CRT 317, which displays the image represented by the image data. On the other hand, the amplifier 315 amplifies the speech data. The amplified speech data is input to the speaker 316, which converts the speech data into a speech.

When the user operates the remote controller to designate the receipt of CATV signals of the channel the user has selected. The remote controller generates and transmits remote control data designating the receipt of CATV signals of the selected channel, to the television receiver 301. In the receiver 301, the data controller 309 receives and supplies the remote control data to the CPU 313. The CPU 313 supplies prescribed parameters through the DMA device 312 and the bus 302 to the digital cable module 306, the depacket processing module 305, the MPEG video module 307, and the MPEG audio module 308. Once these parameters are set in the modules 306, 305, 307 and 308, these modules are made to receive and process CATV signals.

In the meantime, CATV signals are supplied via the CATV cable (not shown) to the digital cable module 306. The module 306 selects the CATV signals of the channel designated by the remote control data supplied from the remote-control data controller 309 and converts them into a stream of bits. The stream of bits is supplied to the bus 302. The DMA device 312 transfers the stream of bits to the depacket processing module 305. The module 305 converts the bit stream into a stream of MPEG data, which is supplied to the bus 302. The MPEG data stream consists of a video data stream and an audio data stream. The DMA device 312 transfers the video data stream to the MPEG video module 307, and the audio data stream to the MPEG audio module 308.

The MPEG video module 307 decodes the video data stream into image data. The MPEG audio module 308 decodes the audio data stream into speech data. The DMA device 312 transfers the image data to the VRAM 310 through the bus 302, and the speech data to the amplifier 315 through the bus 302. The image data is read from the VRAM 310 and processed by the back-end processor 311. The image data processed is supplied to the CRT 317, which displays the image represented by the image data. On the other hand, the amplifier 315 amplifies the speech data. The amplified speech data is input to the speaker 316, which converts the speech data into a speech.

As described above, the depacket processing module 305, the MPEG video module 307, and the MPEG audio module 308 operate when the television receiver 301 receives BS signals and also when the receiver 301 receives CATV signals. That is, these modules 305, 307 and 308 can process both types of digital TV signals. This is because the DMA device 312 transfers the digital TV signals via the bus 302 among these modules 305, 307 and 308 and the other modules (i.e., the NTSC decoder module 303, the receiving module 304, the digital cable module 306).

Since the modules 305, 307 and 308 serve to process digital TV signals of both types, i.e., BS signals and CATV signals, the television receiver 301 has less components than in the case where two sets of modules 305, 307 and 308 are required, one set for BS signals and the other set for CATV signals. In terms of hardware scale, the television receiver 301 is much smaller than the conventional multimedia television receivers.

As described above, the modules 303 to 308 can be removed from the housing of the receiver 301. Therefore, the modules 303 to 308 can easily be replaced by other modules to change the functions the receiver 301 can perform. Furthermore, the receiver 302 may have extra module receptacles to incorporate additional modules. In this case, the receiver 301 can perform multi-screen display; it can display, on the screen of the CRT 317, a plurality of images at the same time by processing the TV signals of many channels.

The television receiver 321 shown in FIG. 2, which is another embodiment of the invention, will now be described. This television receiver 321 can perform multi-screen display unlike the television receiver shown in FIG. 1. The components identical to those shown in FIG. 1 are designated at the same reference numerals in FIG. 2 and will not be described in detail.

As may be understood from FIG. 2, the television receiver 321 differs from the television receiver 301 (FIG. 1) only in that it has three additional components, an extended MPEG video module 322, an extended MPEG audio module 322, and a synchronous phase control section 324. The extended MPEG video module 322 and the extended MPEG audio module 322 are identical in structure to the MPEG video module 307 and the MPEG audio module 308, respectively. The extended MPEG video module 322 receives MPEG-encoded video data via the bus 302 and decodes it into image data. The extended MPEG audio module 323 receives MPEG-encoded audio data via the bus 302 and decodes it into speech data. The synchronous phase control section 324 can write data into, and read data from, the VRAM 310 asynchronously. It can read image data from the VRAM 310 and perform PIP (Picture In Picture) process on the image data so that the CRT 317 may display two images of two channels at the same time.

How the television receiver 321 shown in FIG. 2 operates will now be explained.

When the user operates the remote controller to designate the receipt BS signals of the BS channel the user has selected and also CATV signals of the CATV channel the user has selected. The remote controller generates remote control data which designates the receipt of BS signals of the selected BS channel and the receipt of CATV signals of the selected CATV channel. The remote control data is supplied to the television receiver 321. In the receiver 321, the data controller 309 receives the remote control data and supplies the data to the bus 302. The CPU 313 receives the remote control data and reads, in accordance with the remote control data, the data from the main memory 314 and transfers parameters to the modules 304 to 308 and the modules 322 and 323 through the DMA device 312 and the bus 302. These the parameters include the length of data packet and the sizes of windows for displaying the images of the selected channels. The CPU 313 then initialize the modules 304 to 308, 322 and 323. As a result, the modules 304 to 308, 322 and 323 start operating.

The BS antenna 319 generates BS signals from the broadcast waves it receives from the broadcasting satellite. The BS signals are input via the MIX 320 to the television receiver 321. In the receiver 321, the receiving module 304 selects the BS signals of the channel designated by the remote control data supplied from the remote-control data controller 309 and converts them into a stream of BS bits. The BS bit stream is supplied to the bus 302. Meanwhile, CATV signals are supplied via the CATV cable (not shown) to the digital cable module 306. The module 306 selects the CATV signals of the channel designated by the remote control data supplied from the controller 309 and converts them into a stream of CATV bits. The CATV bit stream is supplied to the bus 302. The DMA device 312 transfers, in time-dividing fashion, the BS bit stream and the CATV bit stream to the depacket processing module 305.

The depacket processing module 305 converts the BS bit stream into a stream of BS MPEG data, and the CATV bit stream into a stream of CATV MPEG data. More precisely, the module 305 depackets the two input bit streams in time-dividing fashion—that is, by selecting alternately the parameters for the BS channel and the parameters for the CATV channel.

The BS MPEG data stream consists of BS video data and BS audio data, which the DMA device 312 transfers to the MPEG video module 307 and the MPEG audio module 308, respectively. The CATV MPEG data stream consists of CATV video data and CATV audio data, which the DMA device 312 transfers to the extended MPEG video module 322 and the extended MPEG audio module 323, respectively.

The MPEG video module 307 decodes the BS video data stream into BS image data. The MPEG audio module 308 decodes the BS audio data stream into BS speech data. The extended MPEG video module 322 decodes the CATV video data stream into CATV image data. The extended MPEG audio module 323 decodes the CATV audio data stream into CATV speech data.

The DMA device 312 transfers the BS image data and the CATV image data to the VRAM 310 through the bus 302. The BS image data and the CATV image data are read asynchronously from the VRAM 310 under the control of the synchronous phase control section 324. The section 324 performs PIP process on the BS image data and the CATV image data. These image data items are thereby synthesized into a multi-screen image data, which is stored into the VRAM 310. The back-end processor 311 reads the multi-screen image data from the VRAM 310 and performs prescribed process on it. The multi-screen image data processed is supplied to the CRT 317, which displays the two images represented by the multi-screen image data.

Meanwhile, the DMA device 312 transfers the BS speech data and the CATV speech data to the amplifier 315 through the bus 302. The amplifier 315 amplifies both speech data items. The amplified speech data items are input to the speaker 316, which converts the speech data items into speeches. These speeches can be output at the same time by stereophonic technique, or only one of them may be selected and output.

As indicated above, the BS parameters and the CATV parameters, both for the depacket processing module 305 are alternately selected in time-dividing fashion. Hence, one depacket processing module can depacket both the BS bit stream and the CATV bit stream into a BS data stream and a CATV data stream. This helps to reduce the number of components required.

The extended MPEG video module 322 and the extended MPEG audio module 323 are used in addition to the MPEG video module 307 and the MPEG audio module 308. This is because the MPEG chip used cannot operate fast enough to process the video and audio data items for the two channels, i.e., the BS channel and the CATV channel, within a limited time. The MPEG chip may be replaced by one which can process the data items within a limited time. If this is the case, the MPEG video module 307 and the MPEG audio module 308 alone can process the video and audio data items for two channels at a sufficiently high speed, provided they are driven in time-dividing fashion.

The television receiver 331 shown in FIG. 3, which is still another embodiment of the present invention, will be described. The television receiver 331 can accomplish two-way communication for CATV channel, unlike the television receiver shown in FIG. 1. The two-way communication function is necessary to achieve VOD (Video On Demand) in the CATV channel. The components identical to those shown in FIG. 1 are designated at the same reference numerals in FIG. 3 and will not be described in detail.

As seen from FIG. 3, the television receiver 331 differs from the television receiver 301 (FIG. 1) only in that a two-way communication module 332 replaces the digital cable module 306 and that a graphics controller 333 is provided. The two-way communication module 332 receives CATV data supplied through the cable (not shown) and demodulates the CATV data into a CATV data packet, which is supplied to the bus 302. The module 332 has, for example, an RF-circuit controller and a QPSK modulating section and can modulate data and supply the modulated data (up stream data) to a CATV station through the cable (not shown). The graphics controller 333 receives the data supplied through the bus 302 and converts the data to GUI (Graphics User Interface) graphics data, which is supplied to the bus 302.

How the television receiver 331 shown in FIG. 3 operates will now be explained.

When the user operates the remote controller to designate the receipt of CATV signals of the channel the user has selected. The remote controller generates and transmits remote control data designating the receipt of CATV signals of the selected channel, to the television receiver 331. In the receiver 331, the data controller 309 receives and supplies the remote control data to the CPU 313. The CPU 313 reads data from the main memory 314 and supplies prescribed parameters through the DMA device 312 and the bus 302 to the depacket processing module 305, the MPEG video module 307, the MPEG audio module 308, the two-way communication module 332, the graphics controller 333, and back-end processor 311. Once provided with the parameters, these components are made to receive and process CATV signals.

The graphics controller 333 transfers GUI graphics data to the VRAM 310. The GUI graphics data includes data items representing a channel-selection menu and a program-selection menu. The back-end processor 311 reads the graphics data from the VRAm 310 and supplies the data to the CRT 317, which displays the graphics data. Seeing the graphic data displayed on the screen of the CRT 317, the user operates the remote controller to, for example, select a program he or she wants to enjoy. Thus operated, the remote controller generates remote control data designating the program to be selected. The remote control data is transmitted to the television receiver 331.

In the television receiver 331, the CPU 313 supplies parameter data to the two-way communication module 332, said parameter data corresponding to the remote control data transmitted from the remote controller. Meanwhile, the remote control data is supplied to the two-way communication module 332. The two-way communication module 332 processes the remote control data, generating data which the receiver 331 is to supply to a CATV station (not shown). The QPSK-modulating section incorporated in the module 332 QPSK-modulates this data. The module 332 supplies the QPSK-modulated data via the cable to the CATV station. Upon receipt of the QPSK-modulated data the CATV station starts supplying CATV signals of the selected program to the television receiver 331 through the cable.

The two-way communication module 332 starts receiving the CATV signals to the receiver 331. At the same time, the module 332 supplies the CPU 323 with a command which indicates that the module 332 has started receiving the program data. In response to this command, the CPU 313 supplies a command to the graphics controller 333, prohibiting the controller 333 from transferring the GUI graphics data to the VRAM 310. As a result, the display of the graphics data on the screen is switched off.

The two-way communication module 332 demodulates the program data it has received, generating a bit stream. The DMA device 312 transfers the bit stream to the depacket processing module 305. The module 305 converts the bit stream into an MPEG data stream which consists of CATV video data and CATV audio data. The DMA device 312 supplies the CATV video data via the bus 302 to the MPEG video module 307, and the CATV audio data via the bus 302 to the MPEG audio module 308. The MPEG video module 307 decodes the CATV video data into image data, and the MPEG audio module 308 decodes the audio data into speech data.

The DMA device 312 transfers the image data and the speech data, thus produced, to the VRAM 310 and the amplifier 315, respectively. The back-end processor 311 reads the image data from the VRAM 310 and performs a prescribed process on the image data. The processed image data is supplied to the CRT 317. On the other hand, the amplifier 315 amplifies the speech data, which is supplied to the speaker 316. The CRT 317 displays the image represented by the image data, whereas the speaker 316 generates the speech represented by the speech data.

As described above and illustrated in FIG. 3, the two-way communication module 332 is connected to the cable and used in place of the digital cable module 306 (FIGS. 1 and 2). The television receiver 331 has less components than in the case where two sets of modules 305, 307 and 308 are required, one set for BS signals and the other set for CATV signals. In terms of hardware scale, the television receiver 331 is much smaller, like the television receiver 301 (FIG. 1), than the conventional multimedia television receivers.

Another television receiver 341 according to this invention will be described, with reference to FIG. 4 which are a block diagram.

As can be understood from FIG. 4, the television receiver 341 comprises five groups of modules, an analog switch box 349, and three buses 356, 404 and 428. Each module group consists of modules performing the similar functions. The five groups are: a reception module group, a modulation/demodulation module group, a packet/depacket module group, a encoder/decoder module group, and a conversion module group. The switch box 349 and the three buses 356, 404 and 428 are arranged at the boundaries of the five module groups.

NTSC TV signals (analog signals), BS signals (digital), and CATV signals (digital signals) are supplied to input terminals 342, 343 and 344, respectively. The NTSC signals are supplied to an NTSC tuner 345, to which a channel-select signal output is supplied, too, from a bus controller 348 (later described). In accordance with the channel-select signal the NTSC tuner 345 selects the NTSC signals of the selected channel and processes them, generating base-band video signals. Meanwhile, the BS signals are supplied to an ISDB tuner 346, to which a channel-select signal is supplied, too, from the bus controller 348. In accordance with the channel-select signal the ISDB tuner 346 selects the BS signals of the selected channel and output them. Also, the CATV signals are supplied to an CATV tuner 347, to which a channel-select signal is supplied from the bus controller 348. In accordance with the channel-select signal the CATV tuner 347 selects the CATV signals of the selected channel and output them.

A CATV modulator 350 is connected to the analog switch box 349. The CATV modulator 350 is provided to modulate data to be supplied from the television receiver 341 through an output terminal 351.

The NTSC tuner 345 supplies the base-band video signals to the analog switch (matrix switch) box 349. The ISDB tuner 346 supplies the BS signals to the box 349. The CATV tuner 347 supplies the CATV signals to the box 349. Controlled by the bus controller 348, the analog switch box 349 supplies the output signals of the tuners 235, 246 and 347 to a QPSK-demodulation section 351, a 64QAM-demodulation section 352, or an A/D, clock-reproducing section 354, and supplies an output of a QPSK-modulation section 353 to the CATV modulator 350. The QPSK-demodulation section 351, 64QAM-demodulation section 352, QPSK-modulation section 353 and A/D, clock-reproducing section 354 are connected by interfaces I/Fs to the first bus 356. These components 351, 352, 353 and 354 are controlled by control signals supplied to them through the first bus 356.

A depacket/descramble section 401, a descramble/through section 402, and a packet section 403 are provided between the first bus 356 and the second bus 404. To be more specific, each of these sections 401, 402 and 403 has one end coupled by an interface I/F to the first bus 356 and the other end connected by an interface I/F to the second bus 404. Provided between second bus 404 and the third bus 428 are: an MPEG2 video-decoder section 421, an MPEG2 audio-decoder section 422, an NTSC/EDTV horizontal decoder section 423, an EDTV vertical decoder section 424, an MPEG2 video-decoder section 425, an MPEG2 video-encoder section 426, and an MPEG2 audio-encoder section 427. Connected to the third bus 428 are an amplifier 429 and a graphics controller 431. The output of the amplifier 429 is connected to a speaker 430. The output of the graphics controller 431 is connected to a post-processing section 432, the output of which is connected to a monitor 433. The controller 431 and the section 432 correspond to the VRAM 310 and the back-end processor 311 (both shown in FIGS. 1 to 3), respectively. An A/D conversion section 434 and a A/D conversion section 436 have their outputs connected to the third bus 428. The A/D conversion sections 434 and 436 are connected at their inputs to a video camera 435 and a microphone 437, respectively.

The analog switch box 349 and the buses 356, 404 and 428 are connected to the bus controller 348. The bus controller 348 incorporates a DMA device 312. Connected to the bus controller 348 are a memory 438 (corresponding to the main memory 314), a CPU 438 (corresponding to the CPU 313), and a remote-control I/F 440 (incorporating a remote-control microcomputer). The remote-control I/F 440 is connected to a remote controller 441.

The QPSK-modulation section 353 will now be described in detail with reference to the block diagram of FIG. 5.

As shown in FIG. 5, the QPSK-modulation section 353 comprises an I/F 375, a serial/parallel converter 376, two multipliers 377 and 378, a phase shifter 379, a carrier-generating circuit 380, and an adder 381. The I/F 375 is connected at input to the first bus 356 and at output to the converter 376. The converter 376 receives serial data from the I/F 375 and converts it to parallel data. The items of the parallel data are alternately supplied to the multipliers 377 and 378. The carrier-generating circuit 380 generates waves at a predetermined frequency, which are supplied to the phase shifter 379. The phase shifter 379 shifts the phase of the waves, thereby generating the first and second carriers. The first carrier and the second carrier have a phase difference of 90°. More precisely, the first carrier has phase of 45°, whereas the second carrier has phase of 45°+90°. The first carrier and second carrier are input to the multiplier 377 and the multipliers 378, respectively. The multiplier 377 multiplies the data from the converter 376 by the first carrier, thereby modulating the data. Similarly, the multiplier 378 multiplies the data from the converter 376 by the second carrier, thereby modulating the data. The modulated data items are input to the adder 381.

FIG. 6 illustrates the phases of the signals which the multipliers 377 and 378 produce. As FIG. 6 shows, the multiplier 377 outputs signal 1 when it receives digital data "1," and outputs signal 2 when it receives digital data "0." The multiplier 378 outputs signal 3 when it receives digital data "1," and outputs signal 4 when it receives digital data "0." The adder 381 synthesizes the data items output from the multipliers 377 and 378, generating a single data item. This data item is supplied to the analog switch box 349.

The QPSK-demodulation section 351 will now be described in detail, with reference to the block diagram of FIG. 7.

Figure 7:
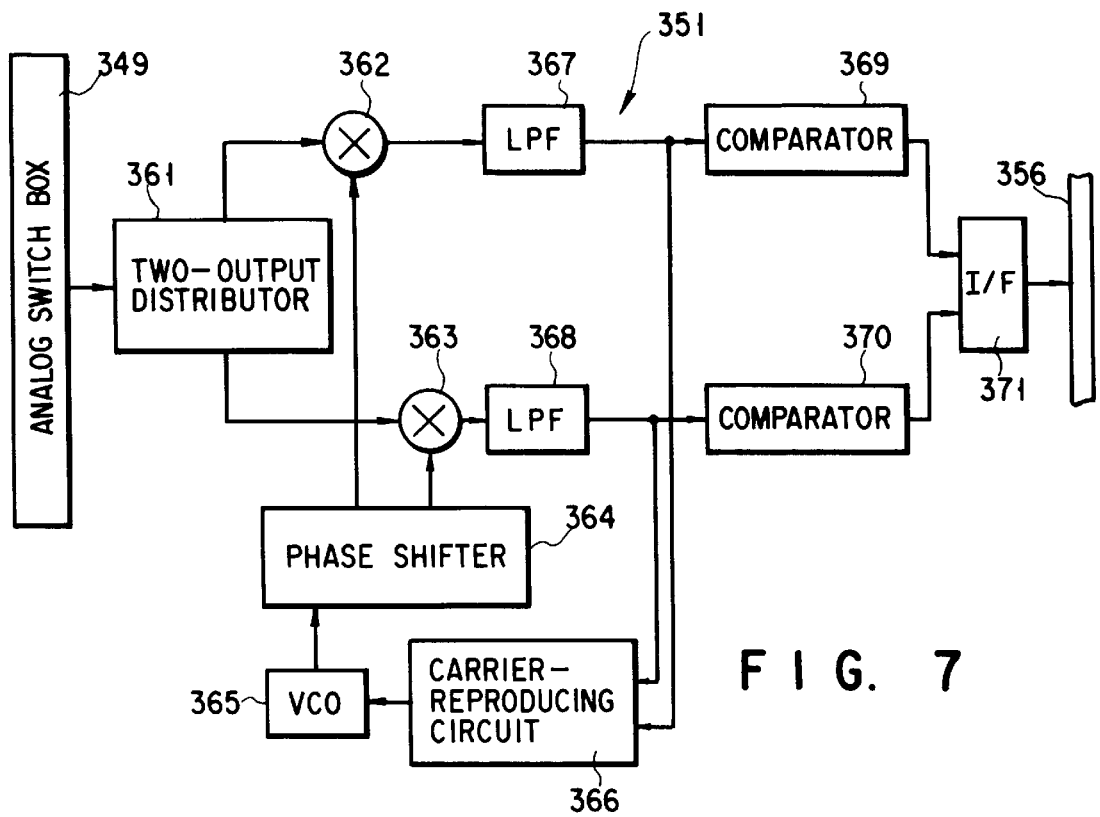
FIG. 7 is a block diagram showing the QPSK demodulation section of the receiver illustrated in FIG. 4.

As seen from FIG. 7, the QPSK-demodulation section 351 comprises a two-output distributor 361, two multipliers 362 and 363, a phase shifter 364, a voltage-controlled oscillator (VCO) 365, a carrier-reproducing circuit 366, two low-pass filters (LPFS) 367 and 368, two comparators 369 and 370, and an interface (I/F) 371.

The digital data supplied from the analog switch box 349 is supplied to the two-output distributor 361. The distributor 361 distributes the digital data to the multipliers 362 and 363. The carrier-reproducing circuit 366 supplies a control signal to the VCO 365. The VCO 365 reproduces a carrier the frequency of which is determined by the control signal supplied from the circuit 366. The carrier is supplied from the VCO 365 to the phase shifter 364. The phase shifter 364 shifts the phase of the reproduced carrier, thereby generating first and second reproduced carrier. The first carrier and the second reproduced carrier have a phase difference of 90°. More precisely, the first reproduced carrier has phase of 45°, whereas the second reproduced carrier has phase of 45°+90°. The first carrier and second carrier are input to the multiplier 362 and the multiplier 363, respectively.

The multiplier 362 multiplies the input data from the two-output distributor 361 by the first reproduced carrier, thereby output the detected data. The multiplier 363 multiplies the input data from the two-output distributor 361 by the second reproduced carrier, thereby output the detected data. The detected data are input to the LPF 367 and the LPF 368, respectively. The LPF 367 limits the band of the detected data, outputting the noise-eliminated data to the comparator 369. Similarly, the LPF 368 limits the band of the detected data, outputting the noise-eliminated data to the comparator 370. The comparator 369 compares the data with a prescribed threshold value, thereby generating a binary digital data stream. The comparator 370 compares the data with the prescribed threshold value, thereby generating a binary digital data stream. Both digital data streams are input to the I/F 371. The I/F 371 time-divides and multiplexes the digital data streams, providing time-divided multiplex data. The time-divided multiplex data is supplied to the first bus 356.

The carrier-reproducing circuit 366 reproduces a carrier from the outputs supplied from the LPFs 367 and 368. It also generates a control signal based on the frequencies of the carriers and the phase error of the carriers. The control signal is supplied to the control terminal of the VCO 365, which synchronizes the carriers with each other.

In the QPSK-demodulation section 351 described above, the multiplier 362 outputs "1" to the comparator 369 when it receives signal 1 shown in FIG. 6, and outputs "0" to the comparator 369 when it receives signal 2 shown in FIG. 6. And the multiplier 363 outputs "1" to the comparator 370 when it receives signal 3 shown in FIG. 6, and outputs "0" to the comparator 370 when it receives signal 4 shown in FIG. 6. The comparators 369 and 370 output binary digital data streams from the input signals. The digital data streams are supplied through the I/F 371 to the first bus 356.

Figure 8:
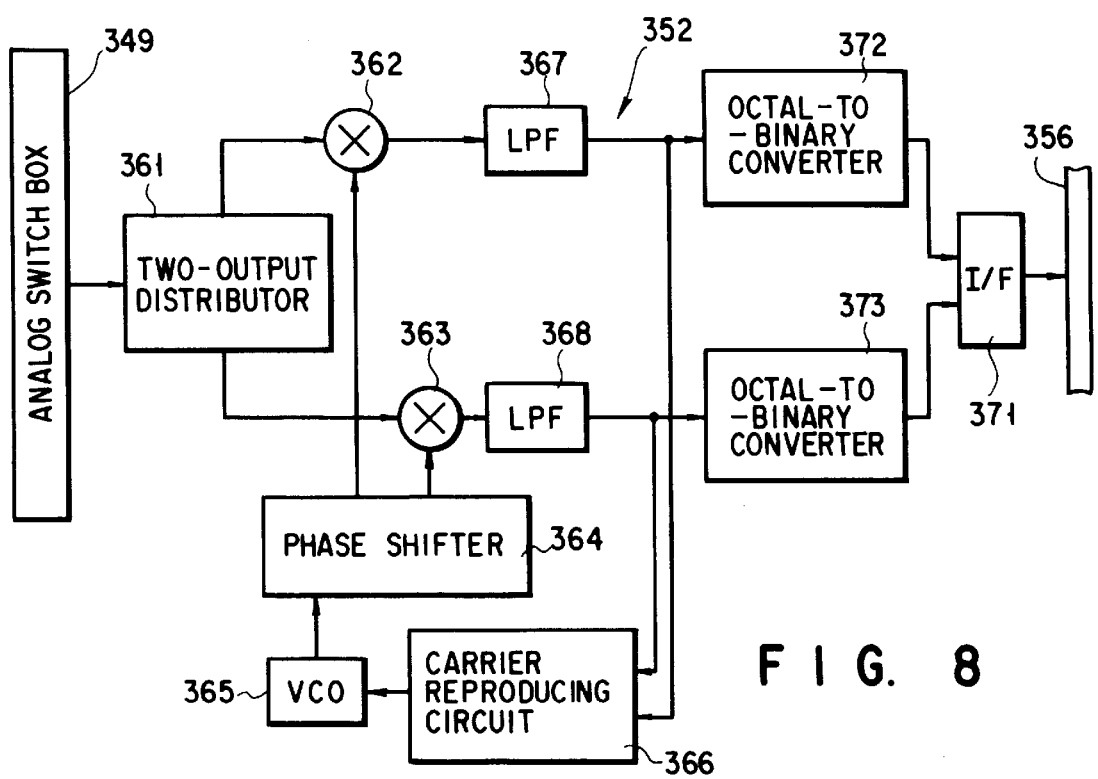
FIG. 8 is a block diagram showing the 64QAM demodulation section of the receiver illustrated in FIG. 4.
Figure 9:
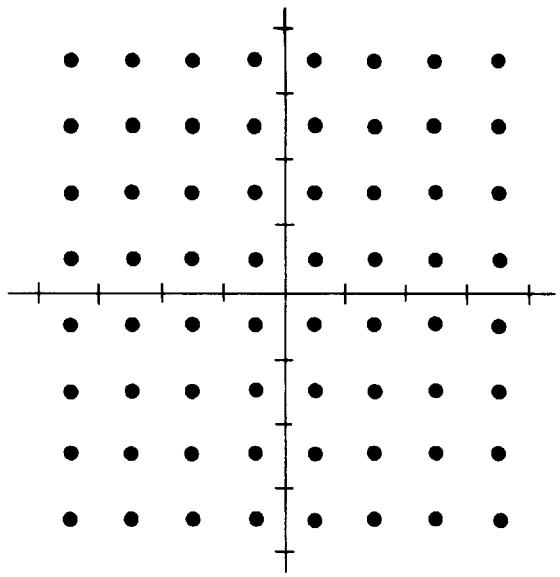
FIG. 9 is a diagram representing the map of an 64QAM symbol data.

The 64QAM-demodulation section 352 will now be described in detail, with reference to FIGS. 8 and 9. FIG. 8 is a block diagram. FIG. 9 is a diagram representing the map of an 64QAM symbol data. As can be understood from FIG. 8, the section 352 is similar to the QPSK-demodulation section 351 shown in FIG. 7. The components identical to those shown in FIG. 7 are designated at the same reference numerals in FIG. 8 and will not be described in detail.

The 64QAM-demodulation section 352 differs from the QPSK demodulation section 351 (FIG. 7) only in that octal-to-binary converters 372 and 373 are used in place of the comparators 369 and 370. Either octal-to-binary converter is designed to convert octal digital data to binary digital data, which is output to the I/F 371.

The multiplier 362 multiplies the data from the two-output distributor 361 by the first reproduced carrier which has phase of 45°, thereby demodulating the input data into first octal data. The multiplier 363 multiplies the data from the two-output distributor 361 by the second produced carrier which has phase of 45°+90°, thereby demodulating the input data into second octal data. The first and second reproduced carriers have a phase difference of 90°. As shown in FIG. 9, the 64QAM symbol data is obtained by modulating the carriers having a 90° phase difference, at eight levels of amplitude. An item of symbol data consists of 64 bits, which are depicted as black dots in FIG. 9.

The first octal data is input to the LPF 367, and the second octal data to the LPF 368. The octal-to-binary converter 372 converts the input octal data to binary data, while the octal-to-binary converter 373 converts the input octal data to binary data. The two binary data items, thus produced, are input to the I/F 371.

The A/D, clock-reproducing section 354 will now be described in detail, with reference to the block diagram of FIG. 10.

Figure 10:
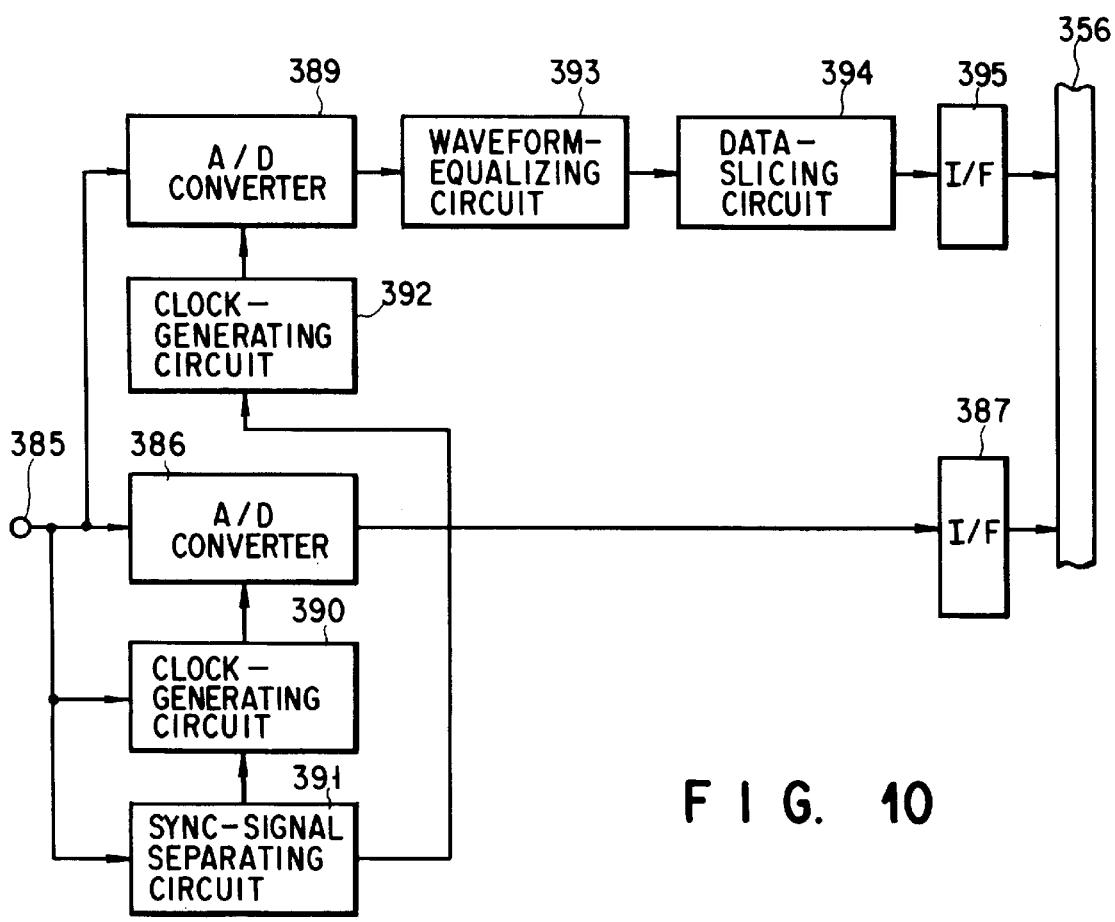
FIG. 10 is a block diagram depicting the A/D conversion section and clock-reproducing section used in the television receiver illustrated in FIG. 4.

As shown in FIG. 10, the A/D, clock-reproducing section 354 comprises an input terminal 385, A/D converters 386 and 389, clock-generating circuits 390 and 392, a sync-signal separator 391, a waveform-equalizer 393, a data-slicing circuit 394, and I/Fs 387 and 395.

In operation, the input terminal receives an NTSC analog video signal from the analog switch box 349. The analog video signal is supplied to the A/D converters 386 and 389, the clock-generating circuits 390 and 392, the converters 386 and 389, clock-generating circuits 390 and 392, and the sync-signal separator 391. The sync-signal separator 391 separates a horizontal sync signal and a vertical sync signal from the NTSC analog video signal, and supplies a burst gate signal to both clock-generating circuits 390 and 392. Using the burst gate signal, the clock-generating circuit 390 extracts a burst signal from the analog video signal. The burst signal, thus extracted is used to generate a clock signal, which has a frequency four times the color sub-carrier frequency (fsc) and which is suitable as the clock signal for use in decoding the NTSC video signal. The clock signal is supplied to the A/D converter 386. Using the clock signal, the A/D converter 386 converts the analog video signal to a digital video signal. The digital video signal is supplied to the I/F 387, which supplies the video signal to the first bus 356.

Using the burst gate signal from the sync-signal separator 391, the clock-generating circuit 392 extracts a burst signal from the analog video signal. This burst signal is used to generate a clock signal, which has a frequency of ⅘ fsc and which is suitable as the clock signal for use in decoding multiplex character signals. The clock signal is supplied to the A/D converter 389. Using the clock signal, the A/D converter 389 converts the analog video signal to a digital video signal. The digital video signal is input to the waveform-equalizer 393. The waveform-equalizer 393 equalizes the waveform of the digital video signal and supplies the signal to the data-slicing circuit 394. The data-slicing circuit 394 slices the digital video signal at a prescribed level and outputs it to the I/F 395. The I/F 395 supplies the digital video signal to the first bus 356.

As indicated above, the A/D, clock-reproducing section 354 supplies an NTSC digital video signal and a multiplex character signal, in time-dividing fashion, to the first bus 356. This renders it possible to process the NTSC digital video signal and the multiplex character signal at the same time.

Referring back to FIG. 4, the television receiver 341 will be further described. As shown in these figures, the first bus 356 connects the sections 351, 352, 353 and 354, which form the modulation/demodulation module group, to the depacket/descramble section 401, the descramble/through section 402 and packet section 403, which form the packet/depacket module group. The sections 401, 402 and 403 are connected by the I/Fs to the first bus 356 and the second bus 404.

Figure 11:
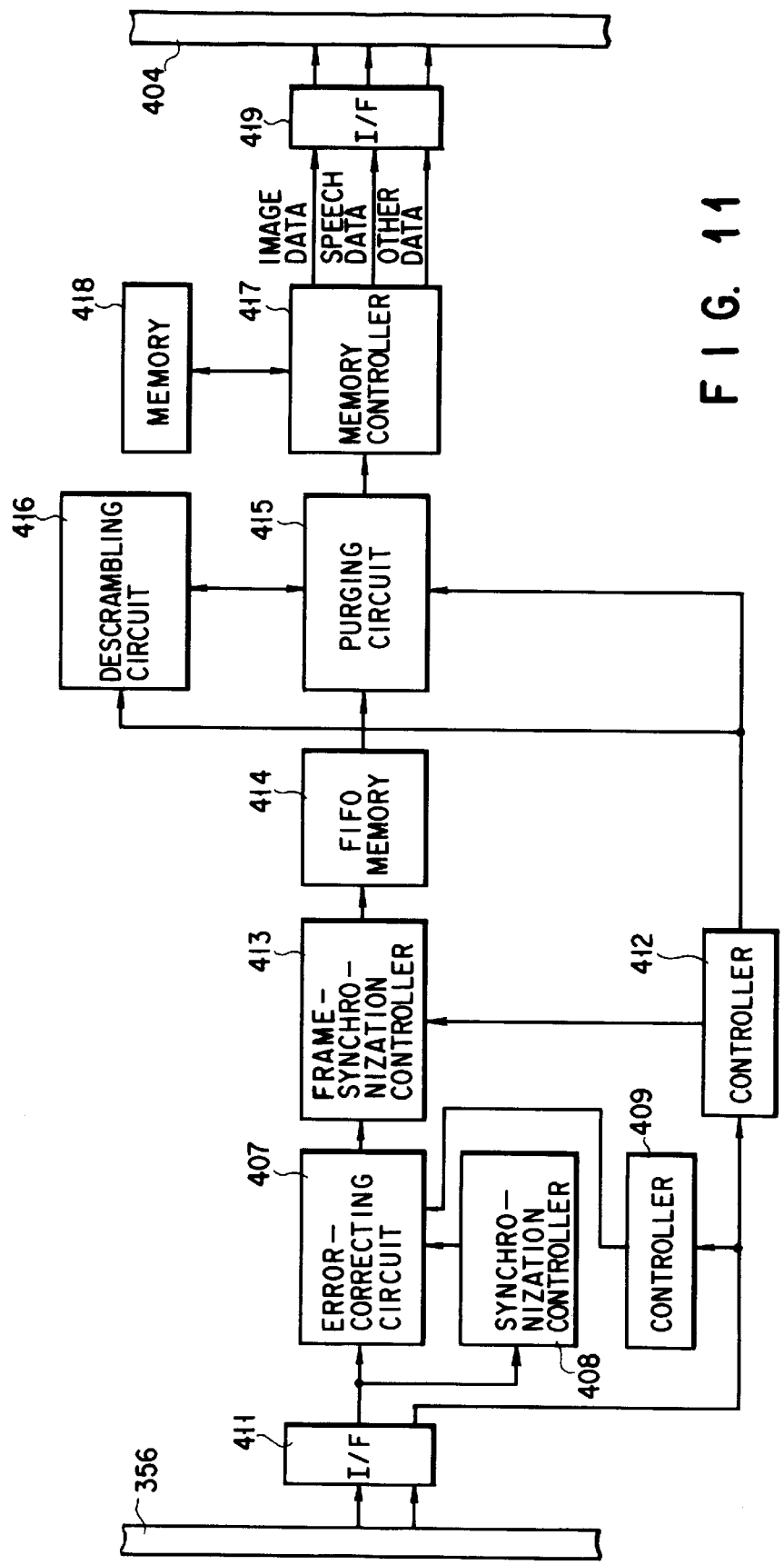
FIG. 11 is a block diagram showing the depacket/descramble section incorporated in the receiver shown in FIG. 4.

The depacket/descramble section 401 will be descried in detail, with reference to the block diagram of FIG. 11.

As shown in FIG. 11, the section 401 comprises an error-correcting circuit 407, a synchronization controller 408, controllers 409 ad 412, I/Fs 411 and 419, a frame-synchronization controller 413, a FIFO memory 414, a purging circuit 415, a descrambling circuit 416, a memory controller 417, and a memory 418.

In operation, the I/F 411 receives a data stream from the first bus 356 and supplies it to the error-correcting circuit 407 and the synchronization controller 408. At the same time, the I/F 411 supplies a control signal to the controller 409 and the controller 412. The synchronization controller 408 synchronizes the phase of the input data stream. The controller 409 controls the error-correcting circuit 407 in accordance with the control signal. Controlled by the controller 409, the circuit 407 corrects errors in the input data stream and supplies the corrected data stream to the frame-synchronization controller 413. The controller 413 synchronizes the frames of the data stream. The frame-synchronized data stream is stored into the FIFO memory 414. The FIFO memory 414 outputs the data stream to the purging circuit 415. The purging circuit 415 analyzes the input data stream and supplies the data stream to the memory controller 417, and also to the descrambling circuit 416. The descrambling circuit 416 reads the data stream from the purging circuit 415 and descrambles the data stream. The resultant descramble data stream is supplied to the purging circuit 415.

The memory controller 417 receives the data stream from the purging circuit 415, writes it into the memory 418, and takes it back from the memory 418, thereby separating the data stream into image data, speech data, graphics data, program data, and the like. These data items are input to the I/F 419.

The controller 412 controls the frame-synchronization controller 413, the purging circuit 415, and the descrambling circuit 416. To be more specific, the controller 412 adjusts the timing of the frame synchronization performed by the controller 413 and alters the processing mode of the descrambling circuit 416, in accordance with the control signal supplied from the I/F 411. Furthermore, the controller 412 supplies a control signal to the purging circuit 415, causing the circuit 415 to perform prescribed purging processes (e.g., header analysis) in accordance with the format of the input data stream.

As can be understood from the above, the depacket/descramble section 401 can decode data streams of different formats.

Referring back to FIG. 4 again, the descramble/through section 402 descrambles the bit stream it has received from the first bus 356 via the I/F. Alternatively, the section 402 allows the passage of the bit stream. The bit stream, either descrambled or not descrambled, is supplied though the I/F to the second bus 404. The packet section 403 processes the digital data supplied from the second bus 404 via the I/F, forming a packet of data. The data packet is supplied to first bus 356 via the I/F.

The depacket/descramble section 401, the descramble/through section 402, and the packet section 403 are controlled by the control signal supplied from the bus controller 348 through the second bus 404.

The second bus 404 connects the sections 401, 402 and 403 which form the packet/depacket module group, to the MPEG2 video-decoder section 421, MPEG2 audio-decoder section 422, NTSC/EDTV horizontal decoder section 423, EDTV vertical decoder section 424, MPEG2 video-decoder section 425, MPEG2 video-encoder section 426 and MPEG2 audio-encoder section 427, which form the encoder/decoder module group. Each section of the encoder/decoder module group is connected at one end to the second bus 404 by an I/F, and at the other end to the third bus 428 by an I/F. The decoder sections 421 to 425 and the encoder sections 426 and 427 can have their internal parameters changed by the control signal supplied from the bus controller 348 through the third bus 428.

The MPEG2 video-decoder sections 421 and 425 are identical in structure. Their structure is disclosed in detail in Interface, August 1992, pp. 125–145. Only the section 421 will be described with reference to the block diagram of FIG. 12.

Figure 12:
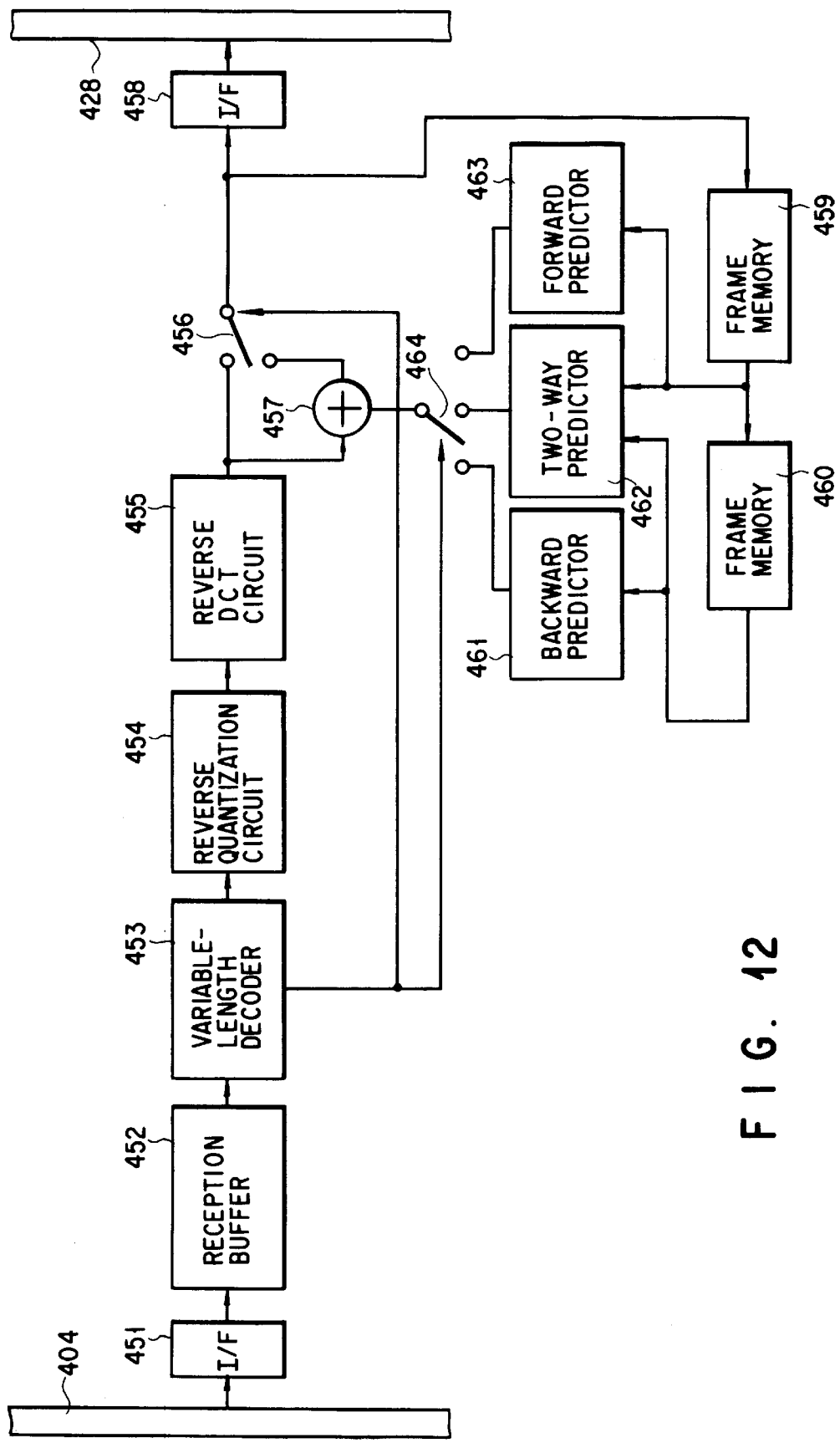
FIG. 12 is a block diagram of one of the identical MPEG2 video-decoder sections used in the receiver shown in FIG. 4.

As FIG. 12 shows, the MPEG2 video-decoder section comprises two I/Fs 451 and 458, a reception buffer 453, a variable-length decoder 453, a reverse quantization circuit 454, a reverse DCT circuit 455, two switches 456 and 464, an adder 457, two frame memories 459 and 460, a backward predictor 461, a two-way predictor 462, and a forward predictor 463.

How the MPEG2 video-decoder section operates will be explained.

The I/F 451 receives an MPEG data stream from the second bus 404 and supplies it to the reception buffer 452. The buffer 452 temporarily holds the input MPEG data stream and then outputs it to the variable-length decoder 453. The decoder 453 reversely quantizes the input MPEG data. The reversely quantized data is supplied to the reverse DCT circuit 455. The circuit 455 effects reverse DCT on the reversely quantized data, converting frequency-axis data to spatial-coordinate data. The output of the reverse DCT circuit 455 is supplied to the switch 456 and also to the adder 457. The variable-length decoder 453 generates data indicating whether the input data stream is intra-frame encoded one or inter-frame encoded one, and supplies it to the switch 456. The decoder 453 also generates data indicating the direction of prediction to be performed in inter-frame predictive encoding, and supplies it to the switch 464.

The switch 456 selects the output of the reverse DCT circuit 455 and supplies it to the third bus 428 via the I/F 458 if the input data has been intra-frame encoded. If the input data is inter-frame one, the switch 456 selects the output of the adder 457 and supplies it to the frame memory 459 and the I/F 458.

The frame memory 459 delays the reproduced data selected by the switch 456 for one-frame period, and supplies the delayed data to the frame memory 460, the forward predictor 463, and two-way predictor 462. The frame memory 460 delays the data output from the frame memory 459 for one-frame period, and supplies the delayed data to the backward predictor 461. The forward predictor 463 effects movement-compensating prediction on a decoded frame, by using decoded data representing the immediately preceding frame, thereby generating first predicted image data. The first predicted image data is supplied to the switch 464. The backward predictor 461 performs movement-compensating prediction on the same decoded frame, by using decoded data representing the immediately following frame, thereby generating second predicted image data. The second predicted image data is supplied to the switch 464. The two-way predictor 462 effects movement-compensating prediction on the same decoded frame, by using two decoded data items representing the immediately preceding and following frames, thereby generating third predicted image data. The third predicted image data is supplied to the switch 464. The switch 464 selects the first predicted image data, the second predicted image data or the third predicated image data and supplies the selected predicted image data to the adder 457.

If the MPEG data stream input to the MPEG2 video-decoder section is inter-frame encoded data, the output of the reverse DCT circuit 455 is a predicted error. In this case, the switch 464 selects one of the predicted image data items generated by the predictors 461, 462 and 463 in accordance with the data indicating the direction of prediction for inter-frame predictive encoding. The predicted image data, thus selected, is supplied to the adder 457. The adder 457 adds the predicted error to the selected predicted image data, thereby reproducing an frame image data. The frame image data reproduced is supplied to the third bus 428 through the switch 456 and the I/F 458.

As shown in FIG. 4, the MPEG2 audio-decoder section 422 receives the MPEG audio data from the second bus 404 via the I/F and decodes it into speech data. The speech data is supplied to the third bus 428 through the I/F. The NTSC/EDTV horizontal decoder section 423 receives an NTSC signal or a main-screen, second-generation EDTV signal from the second bus 404 via the I/F. The decoder section 423 decodes the NTSC signal or the EDTV signal and also the horizontal reinforcing signal in the EDTV signal, thus improving the horizontal resolution. The main-screen signal representing an image with improved horizontal resolution is supplied to the third bus 428 via the I/F. The EDTV vertical decoder section 424 receives a second-generation EDTV signal from the second bus 404 via the I/F. The decoder section 424 decodes the vertical reinforcing signal in the EDTV signal. The decoded reinforcing signal is added to the main-screen signal, producing a main-screen signal representing an image with improved horizontal resolution representing an image with improved vertical resolution. This main-screen signal is supplied to the third bus 428 via the I/F.

The MPEG2 video-encoder section 426 receives image data from the third bus 428 via the I/F and MPEG encodes it, thereby generating an MPEG video data stream. The video MPEG data stream is supplied to the second bus 404 through the I/F. The MPEG2 audio-encoder section 427 receives audio data from the third bus 428 via the I/F and MPEG-encodes it, thereby generating an audio MPEG data stream. The audio MPEG data stream is supplied to the second bus 404 through the I/F.

The third bus 428 connects the sections 421 to 427 forming the encoder/decoder module group to the amplifier 429, the graphics controller 431, and the A/D conversion sections 434 and 436.

The amplifier 429 amplifies the audio data stream supplied from the third bus 428, generating a speech signal. The speech signal is input to the speaker (SP) 430, which generates a speech represented by the speech signal. The graphics controller 431 receives image data for the third bus 428 and supplies it to the post-processing section 432. The section 432 processes the image data, producing an image signal. The image signal is supplied to the monitor 433, which displays the image represented by the input image signal.

The video camera 435 generates an image signal, which is supplied to the A/D conversion section 434. The A/D converter 434 converts the image signal to a digital image signal, which is supplied to the third bus 428 through the I/F. The microphone 437 collects speech and generates a speech signal, which is supplied to the third bus 428 through the I/F.

The bus 442 connects the bus controller 348 to the memory 438, the CPU 439, and the remote-control I/F 440. When operated by the user, the remote controller 441 generates operation commands, which is transferred to the CPU 439 through the remote-control I/F 440. The memory 438 stores programs for controlling the various decoders incorporated in the television receiver 341. The CPU 439 executes these programs and interprets the commands supplied from the I/F 440, thereby driving the bus controller 348. The memory 438 has a storage area for storing the data supplied from the second bus 404. The CPU 439 produces data to be supplied from the television receiver 341. This data is supplied from the CPU 439 to the QPSK-modulation section 353 through the bus controller 348 and the first bus 356.

The operation of the television receiver 341 described above will now be explained, with reference to FIGS. 13 to 20 which are block diagrams identical to the block diagram of FIG. 4. In FIGS. 13 to 20, the modules which operate to achieve a particular broadcasting service are shaded.

Figure 13:
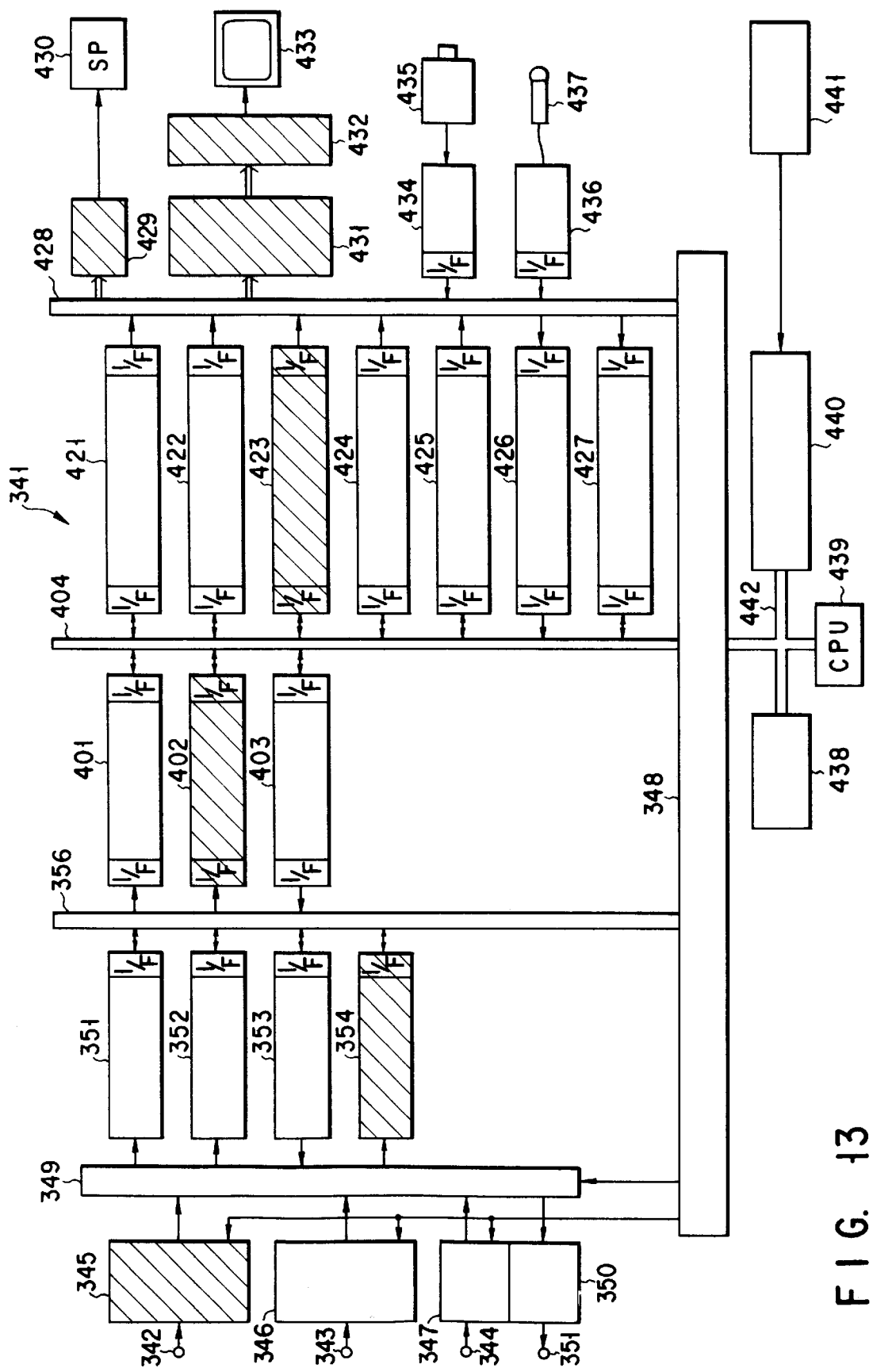
FIG. 13 is a block diagram for explaining how the television receiver of FIG. 4 provides a first broadcasting service.

With reference to FIG. 13 it will be explained how the television receiver 341 operates when it receives an NTSC signal.

NTSC signal waves supplied to the input terminal 342 are supplied to the NTSC tuner 345. Meanwhile, the commands are supplied to the CPU 439 from the remote controller 441 through the I/F 440. From the commands the CPU 439 determines the channel the user has selected and generates a control signal designating the selected channel. The control signal is supplied to the NTSC tuner 345 through the bus controller 348. The NTSC 345 tuner selects an NTSC signal of the selected channel and processes them, generating a base-band video signals. The NTSC tuner 345 supplies the baseband video signal to the analog switch box 349.

Controlled by the bus controller 348, the analog switch box 349 has selected the NTSC tuner 345 as a signal source and the A/D, clock-reproducing section 354 as a signal receiver. Hence, the base-band video signal is are supplied from the NTSC tuner 345 to the A/D, clock-reproducing section 354. The section 354 generates a clock signal from the analog video signal. Further, the section 354 converts the analog video signal into a digital signal by using the clock signal.

The output of the A/D, clock-reproducing section 354 is supplied to the descramble/through section 402 via the first 356, and hence to the NTSC/EDTV horizontal decoder section 423 via the second bus 404, under the control of the bus controller 348. The NTSC/EDTV horizontal decoder section 423 decodes the NTSC signal and supplies it to the third bus 428. The bus controller 348 supplies the image data to the graphics controller 431, and the speech data to the amplifier 429.

The graphics controller 431 supplies the image data to the post-processing section 432. The section 432 processes the image data, producing an image signal. The image signal is supplied to the monitor 433, which displays the image represented by the input NTSC image signal. The amplifier 429 amplifies the speech data, generating a speech signal and supplying it to the speaker 430. The speaker 430 generates a speech represented by the speech signal.

Figure 14:
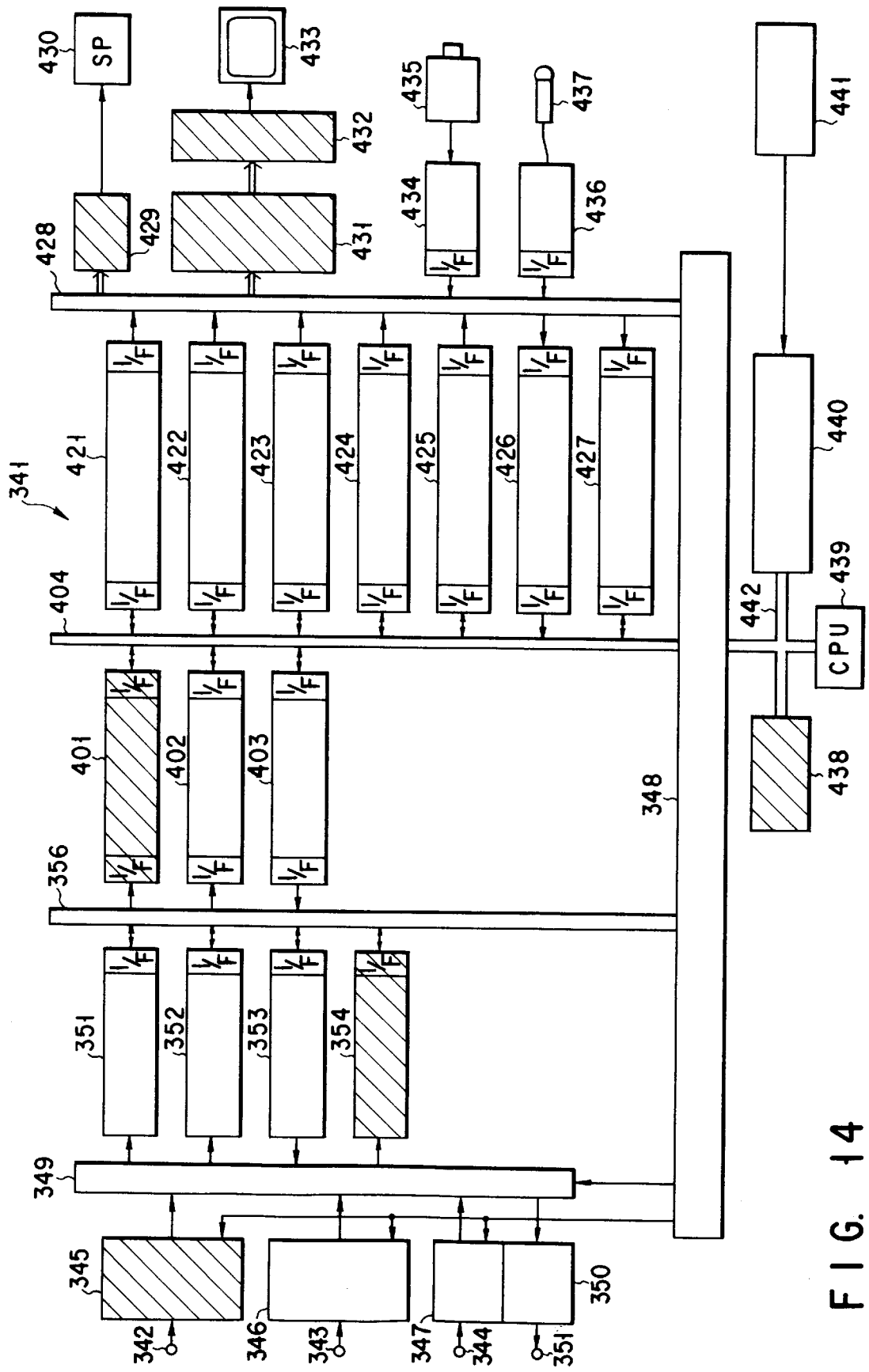
FIG. 14 is a block diagram for explaining how the television receiver of FIG. 4 provides a second broadcasting service.

With reference to FIG. 14 it will be explained how the television receiver 341 operates when it receives a multiplex character signal.

The bus controller 348 controls the analog switch box 349, whereby the output of the NTSC tuner 345 is supplied to the A/D, clock-reproducing section 354. The A/D, clock-reproducing section 354 converts the multiplex character signal into a digital signal, which is supplied to the first bus 356. The digital signal is supplied to the depacket/descramble section 401 under the control of the bus controller 348.

The depacket/descramble section 401 converts the digital signal of the character multiplex format into a data stream, which is supplied to the second bus 404. The bus controller 348 transfers the data stream from the section 401 into the memory 438 through the bus 442. The CPU 439 reads the character data stream from the memory 438 and convert it into image data. The image data is transferred via the bus controller 348 to the graphics controller 431. The graphics controller 431 supplies the image data to the post-processing section 432. The section 432 processes the image data, producing an image signal. The image signal is supplied to the monitor 433, which displays the characters represented by the input multiplex character signal.

Figure 15:
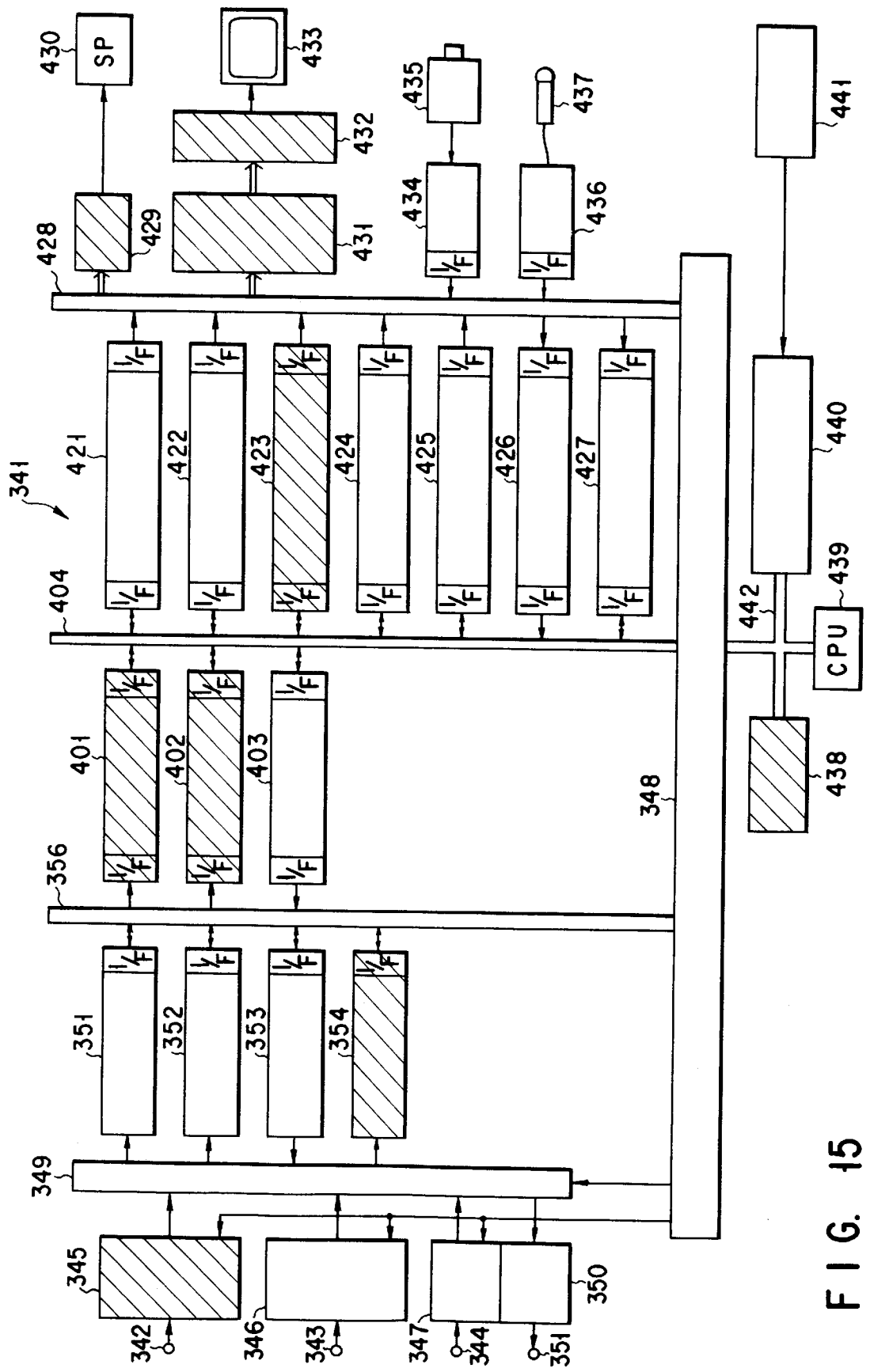
FIG. 15 is a block diagram for explaining how the television receiver of FIG. 4 achieves a third broadcasting service.

With reference to FIG. 15 it will be explained how the television receiver 341 operates when it receives an NTSC signal and a multiplex character signal at the same time.

As described above, the modules shaded in FIG. 13 are used to decode the NTSC signal, and the modules shaded in FIG. 14 are used to decode the multiplex character signal. The decoding of the NTSC signal and the decoding of the multiplex character signal are carried out in time-dividing fashion.

The image data generated from the NTSC signal is supplied from the NTSC/EDTV horizontal decoder section 423 to the graphics controller 431 through the third bus 428. On the other hand, the image data generated from the multiplex character signal is supplied from the memory 438 to the graphics controller 431 through the third bus 438. The graphics controller 431 supplies synthesizes two image data items, forming a single image data item. This image data is supplied to the post-processing section 432. The section 432 processes the image data, producing an image signal and supplying it the monitor 433. The monitor 433 displays not only the image represented by the NTSC signal, but also the characters represented by the multiplex character signal.

Figure 16:
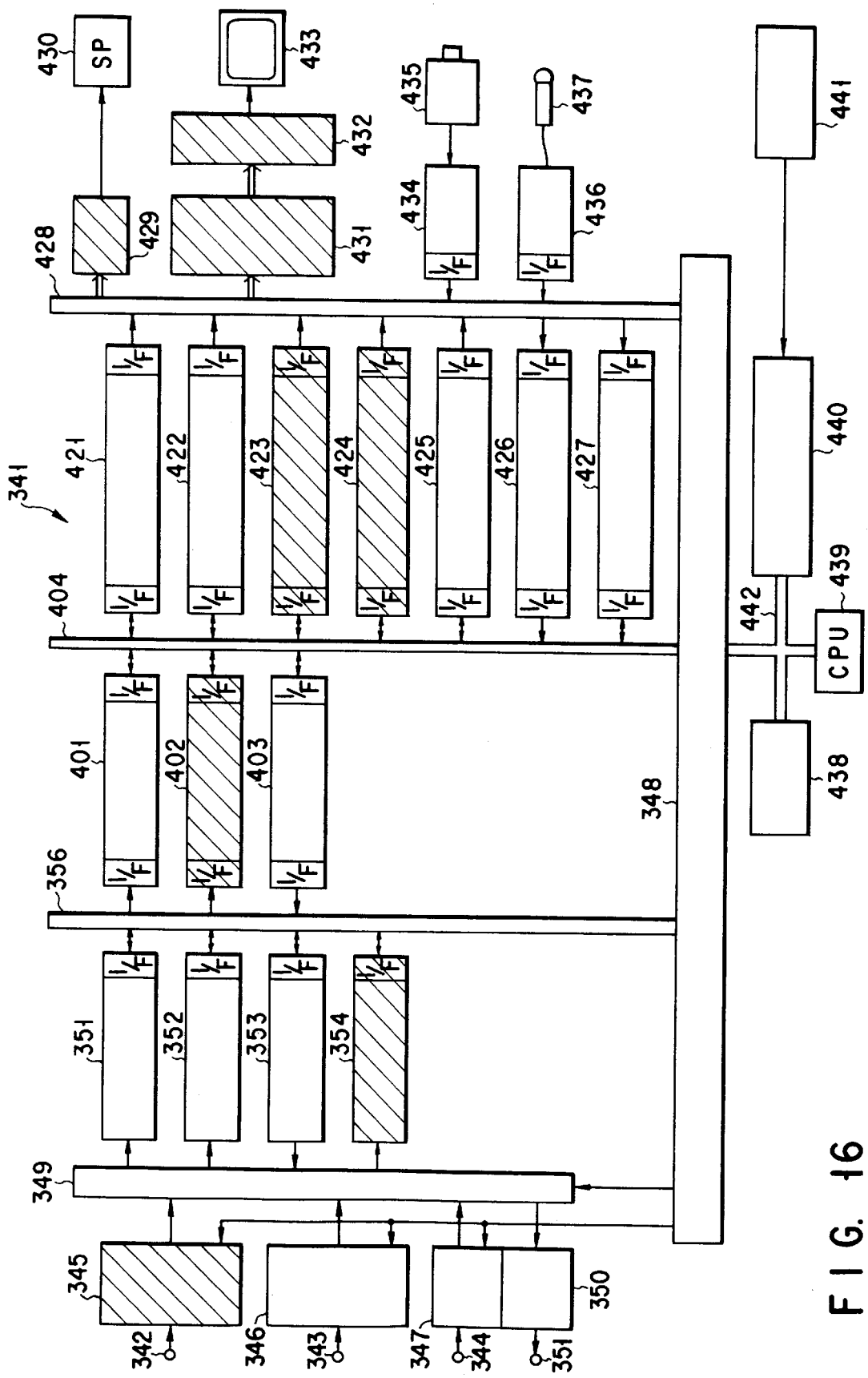
FIG. 16 is a block diagram for explaining how the television receiver of FIG. 4 accomplishes a fourth broadcasting service.

With reference to FIG. 16 it will be explained how the television receiver 341 operates when it receives a second-generation EDTV signal.

To process the second-generation EDTV signal, the EDTV vertical decoder section 424 of the encoder/decoder module group is used, along with the modules used to decode the NTSC signal, as can be understood from FIG. 16. The NTSC/EDTV horizontal decoder section 423 separates a horizontal reinforcing signal from the second-generation EDTV signal and demodulates the horizontal reinforcing signal. The demodulated reinforcing signal is added to the main image signal, thus improving the horizontal resolution. On the other hand, the EDTV vertical decoder section 424 separates a vertical reinforcing signal from the second-generation EDTV signal and demodulates the vertical reinforcing signal. The demodulated vertical reinforcing signal is added to the main image signal, thus improving the vertical resolution. The main image signal, which represents an image having improved horizontal and vertical resolution, is supplied to the graphics controller 431.

The amplifier 429, the graphics controller 431, and the post-processing section 432 operate exactly in the same way as in the case where the television receiver 341 receives a NTSC signal.

Figure 17:
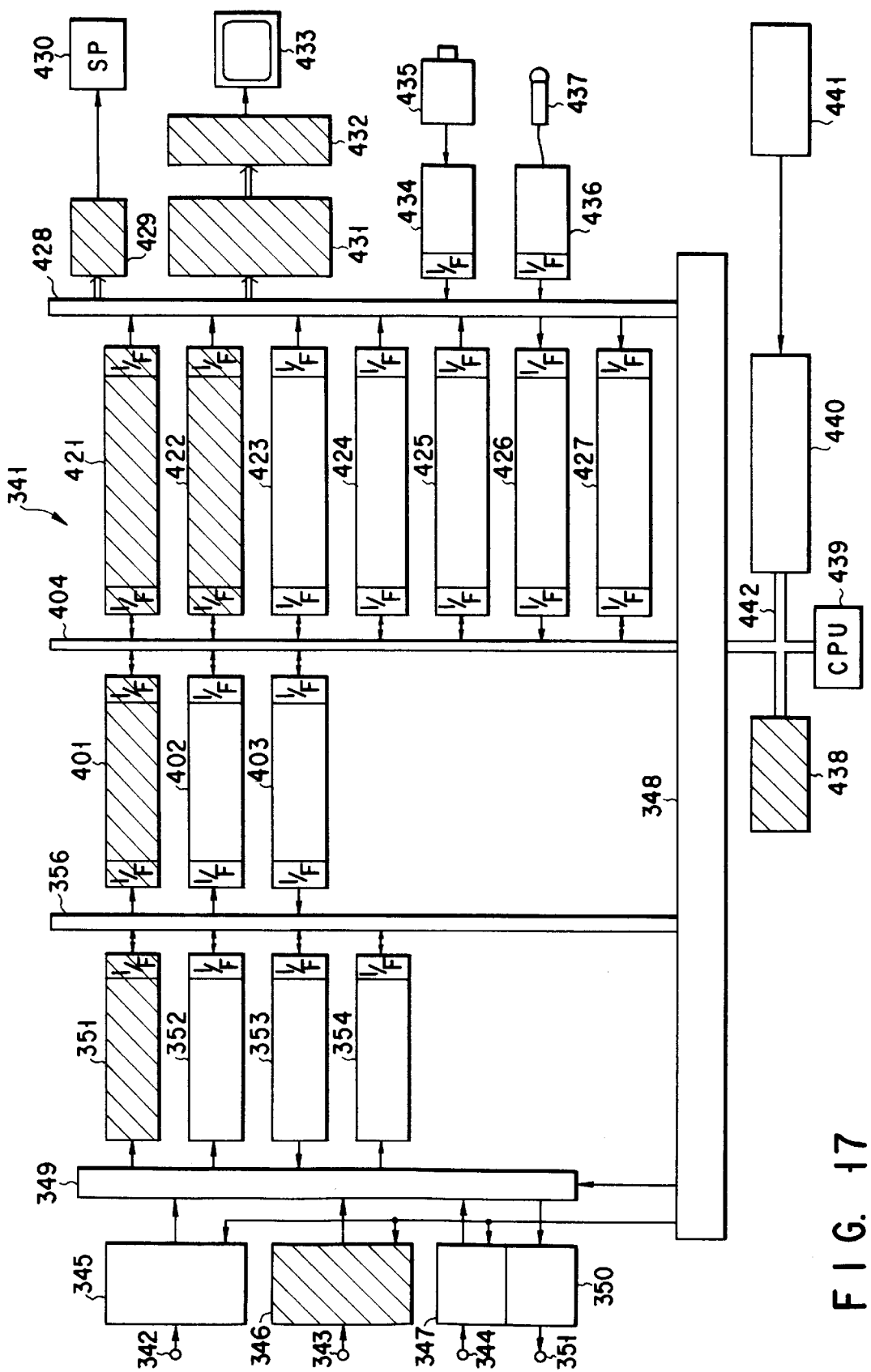
FIG. 17 is a block diagram for explaining how the television receiver of FIG. 4 provides a fifth broadcasting service.

With reference to FIG. 17 it will be explained how the television receiver 341 operates when it receives an ISDB signal.

The ISDB signal received at the input terminal is supplied to the ISDB tuner 346. The tuner 346 frequency-converts the ISDB signal and supplies it to the analog switch box 349. The ISDB signal is supplied to the QPSK-demodulation section 351. The section 351 demodulates the ISDB signal into a bit stream, which is supplied to the first bus 356. The bus controller 348 selects the output of the QPSK demodulation section 351 and transfers it via the first bus 356 to the depacket/descramble section 401.

A control signal is supplied to the depacket/descramble section 401 from the bus controller 348 through the second bus 404. The control signal changes the parameters set in the depacket/descramble section 401, so that the section 401 may process the ISDB signal. The section 401 converts the ISDB bit stream to a data stream, which is supplied to the second bus 404. The data stream consists of video data and audio data. The video data is supplied to the MPEG2 video-decoder section 421, while the audio data is supplied to the MPEG2 audio-decoder section 422.

The depacket/descramble section 401 decodes the video data into image data. The MPEG2 audio-decoder section 422 decodes the audio data into speech data. The image data is supplied the graphics controller 431 through the third bus 428, and the speech data to the amplifier 428 through the third bus 438.

In ISDB broadcasting, graphics data is transferred to the depacket/descramble section 401 and stored into the memory 438 through the second bus 404. The CPU 439 supplies the graphics data to the graphics controller 431. The graphics controller 431 synthesizes the image data from the depacket/descramble section 401 and the image data read from the memory 438, producing a single image data item. This image data is supplied to the post-processing section 432. The section 432 processes the image data, producing an image signal and supplying it to the monitor 433. The monitor 433 displays the image represented by the graphics data.

Figure 18:
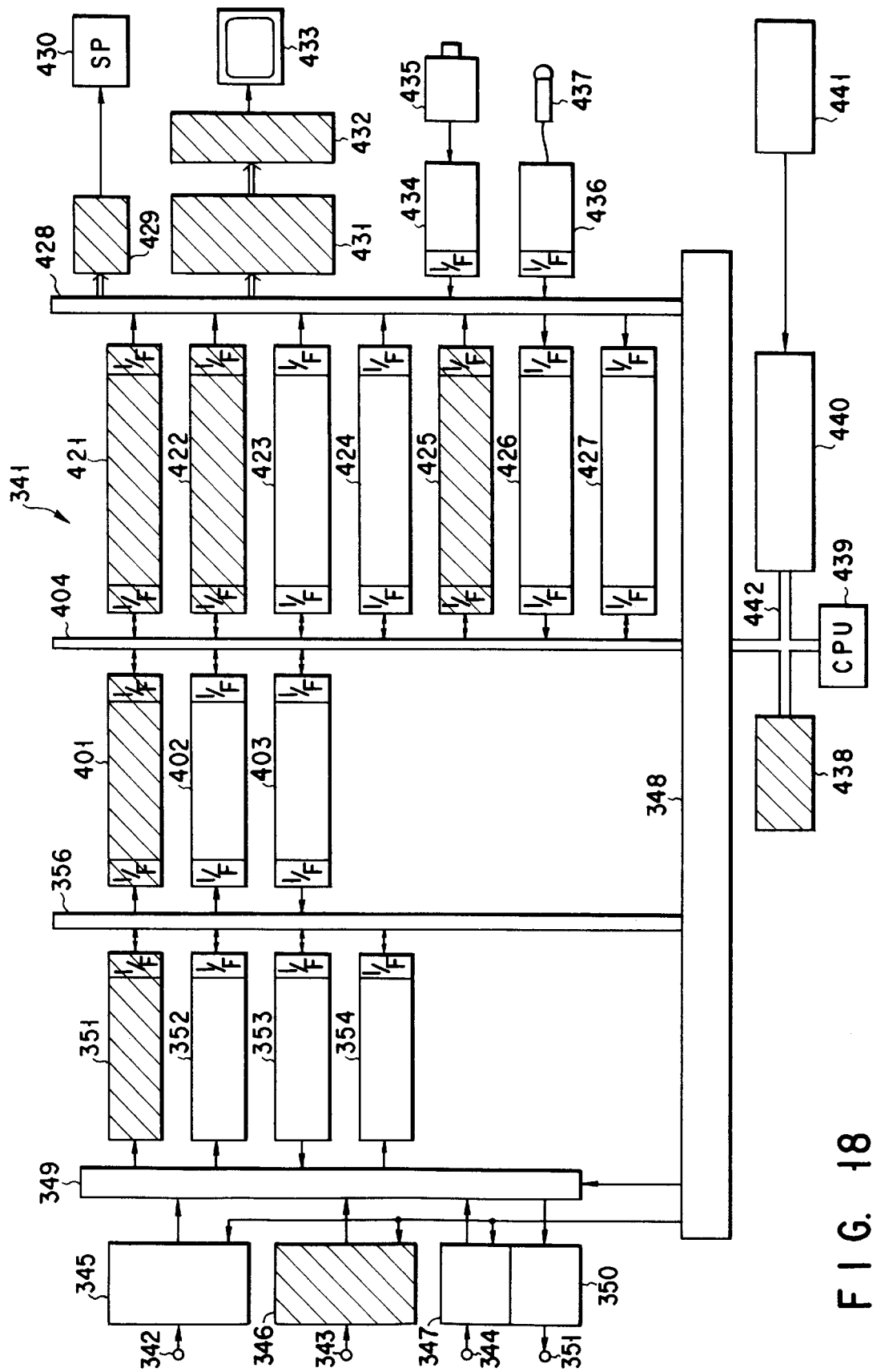
FIG. 18 is a block diagram for explaining how the television receiver of FIG. 4 achieves a sixth broadcasting service.

With reference to FIG. 18 it will be explained how the television receiver 341 operates to perform multi-screen display in ISDB broadcasting.

As seen from FIG. 18, the MPEG2 video-decoder sections 421 and 425 are used, along with the modules used to decode the ISDB signal. Two video data items are supplied in time-sharing from the depacket/descramble section 401 are input to the MPEG2 video-decoders 421 and 425, respectively. The sections 421 and 425 decode the video data items into two image data items. Both image data items are supplied via the third bus 428 to the graphics controller 431. The graphics controller 431 synthesizes the image data items into a single image data item. This image data is supplied to the post-processing section 432. The section 432 processes the image data, producing an image signal. The image signal is supplied to the monitor 433. The monitor 433 displays the two image at the same time.

Figure 19:
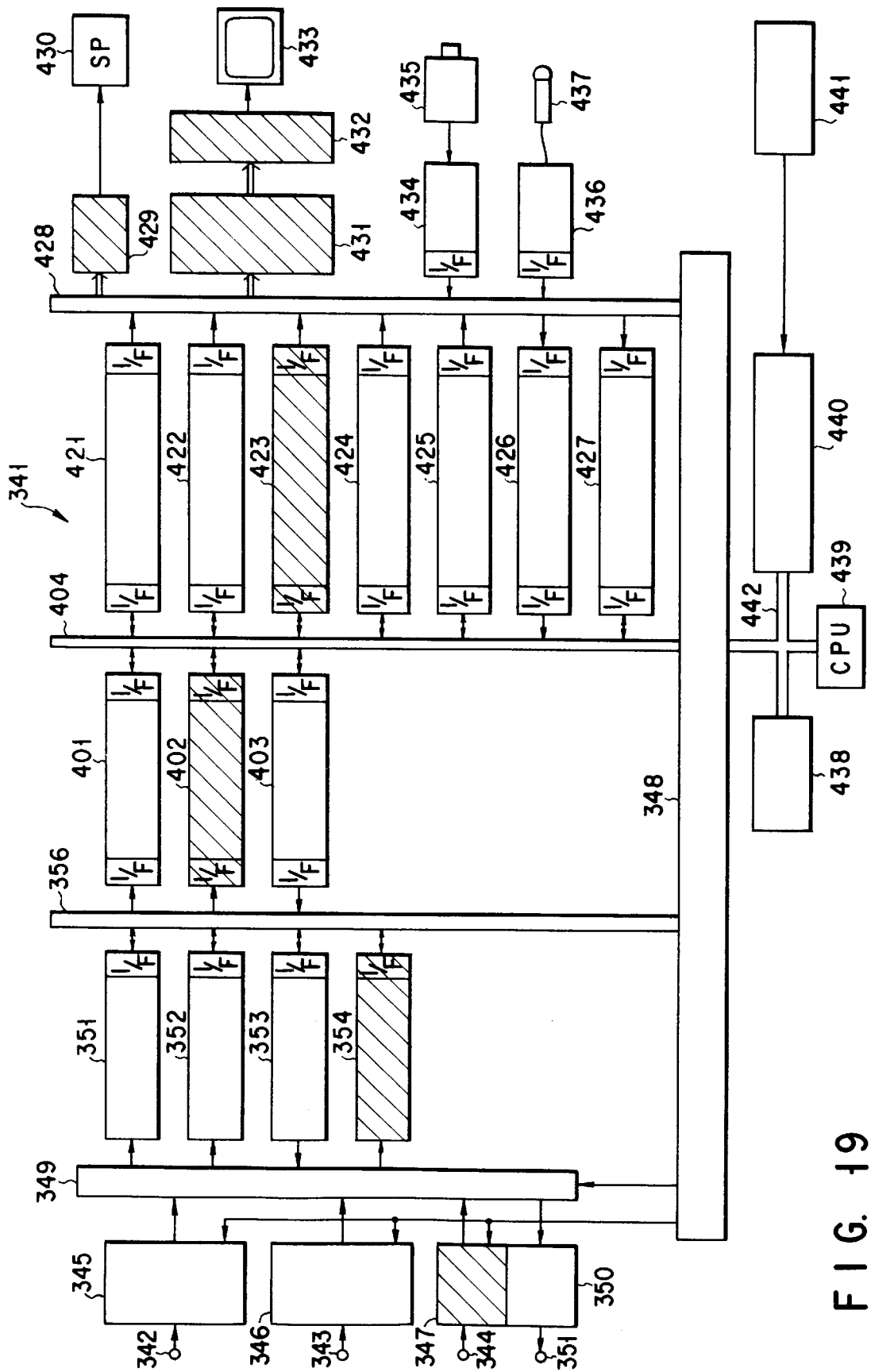
FIG. 19 is a block diagram for explaining how the television receiver of FIG. 4 accomplishes a seventh broadcasting service.

With reference to FIG. 19 it will be explained how the television receiver 341 operates when it receives an analog CATV signal.

The analog CATV signals received at the input terminal 344 are input to the CATV tuner 347. The CATV tuner 347 selects the analog video signal of the channel selected and supplies it to the analog switch box 349. The analog video signal is supplied from the box 349 to the A/D, clock-reproducing section 354. Thereafter, the descramble/through section 402, NTSC/EDTV horizontal decoder section 423, amplifier 429, graphics controller 431, and post-processing section 432 operate exactly in the same way as in the case where the television receiver 341 receives a NTSC signal.

With reference to FIG. 20 it will be explained how the television receiver 341 operates to accomplish two-way communication by using digital CATV broadcasting system.

CATV signals from CATV stations are supplied to the input terminal 344, while a CATV signal is supplied to the CATV stations from the output terminal 351. The signals input via the input terminal 344 are supplied to the CATV tuner 347. Form the input CATV signals the CATV tuner 347 selects the CATV signal of the selected channel. The CATV signal of the selected channel is supplied via the analog switch box 349 to the QPSK demodulation section 351 and the 64QAM-demodulation section 352.

The QPSK demodulation section 351 demodulates the control data input to it, generating a bit stream. The bit stream is supplied to the first bus 356. The 64QAM-demodulation section 352 demodulates the digital CATV signal into a bit stream. The bit streams generated by the sections 351 and 352 are supplied via the first bus 356 to the depacket/descramble section 401. The section 401 converts the input bit streams into a data stream which consists of control data, video data, and audio data.

Of the data stream generated by the depacket/descramble section 401, the control data is transferred via the second bus 404 to the CPU 439, the video data to the MPEG2 video-decoder section 421, and the audio data to the MPEG2 audio-decoder section 422. The CPU 439 controls the decoder sections in accordance with the control data. The MPEG2 video-decoder section 421 decodes the video data, whereas the MPEG2 audio-decoder section 422 decodes the audio data. The decoded video data and the decoded audio data are supplied to the third bus 428. As a result, the CATV image data is supplied to the graphics controller 431, and the CATV speech data is supplied to the amplifier 429.

The amplifier 429, graphics controller 431, and post-processing section 432 operate exactly in the same way as in the case where the television receiver 341 receives CATV analog signals.

On the other hand, the data generated as the user operates the remote controller 441 is supplied from the CPU 439 to the QPSK-modulation section 353 through the bus controller 348. The QPSK-modulation section 353 QPSK-modulates the input data. The QPSK-modulated data is supplied to the CATV modulator 350 through the analog switch box 349 and finally supplied from the television receiver 341 through the output terminal 351.

Assume that data will be output from the receiver 341 to the CATV station. The video camera 435 generates an image signal, which is supplied to the A/D conversion section 434. The A/D conversion section 434 converts the image signal to digital image data and supplies the image data it to the third bus 428. Meanwhile, the microphone 437 collects speech and generates speech data, which is supplied to the third bus 428, too. The bus controller 348 supplies the image data to the MPEG2 video-encoder section 426, and the speech data to the MPEG2 audio-encoder section 427. The section 426 generates an MPEG video data stream, and the section 427 generates an audio MPEG data stream. The MPEG vide data stream and the audio MPEG data stream are via the second bus 404 to packet section 403.

The packet section 403 decodes the MPEG video data stream and the MPEG audio data stream, into a data packet. The data packet is transferred via the first bus 356 to the QPSK-modulation section 353. The QPSK-modulation section 353 QPSK-modulates the data packet and supplies it via the analog switch box 349 to the CATV modulator 350. The QPSK data packet is superposed on a carrier of a predetermined frequency, and is supplied through a CATV cable (not shown) to the CATV station.

As explained with reference to FIGS. 13 to 20, the television receiver 341 shown in FIG. 4 can attain the same advantages as the television receivers 301 and 331 illustrated in FIGS. 1 and 3, respectively. Although the receiver 341 comprises more modules than the receivers of FIGS. 1 and 3, the modules serve to process NTSC signals, ISDB signals, and CATV signals.

Therefore, the television receiver 341 has less components than in the case where three sets of modules are required, a first set for NTSC signals, a second set for ISDB signals, and the third set for CATV signals. In terms of hardware scale, the television receiver 341 is much smaller than the conventional multimedia television receivers.

In the television receiver 341, several decoder modules are connected to a bus and can decode signals of various types. The decoder modules are selected in accordance with the type of signals to be decoded. The receiver 341 can, therefore, be manufactured at low cost and can yet operates in various types of broadcasting.

In order to clarify the differences between the present invention and the prior art, a second-generation EDTV system, an ISDB system, and a digital CATV system will be described in brief.

Scanning lines effective for the second-generation EDTV signals are those located in the central region of the NTSC receiver screen which has an aspect ratio of 4:3, said central region having an aspect ratio of 16:9. Hence, when the NTSC television receiver, which now prevails in use, receives second-generation EDTV signals, it performs so-called letter-box display, displaying a wide image in only the central region of the screen and leaving the upper and lower regions of the screen blank. The letter-box display is notwithstanding advantageous in that the image of an EDTV program can be displayed, in its entirely, in the central region of the NTSC receiver screen.

As indicated above, the effective scanning lines for the second-generation EDTV signals are only those located in that central region of the NTSC receiver screen. More precisely, of the 480 scanning lines effective for the NTSC signals, only 360 scanning lines are effective for the second-generation EDTV signals. Thus, in a second-generation EDTV television receiver, the second-generation EDTV signal is decoded such that the number of effective scanning lines is converted from 360 to 480. This decoding technique, however, results in a second-generation EDTV image inferior to an NTSC image in terms of resolution. To compensate for this resolution decrease, it has been decided that the broadcasting stations should transmit second-generation EDTV signals, each containing a horizontal reinforcing signal and a vertical reinforcing signal.

Figure 21:
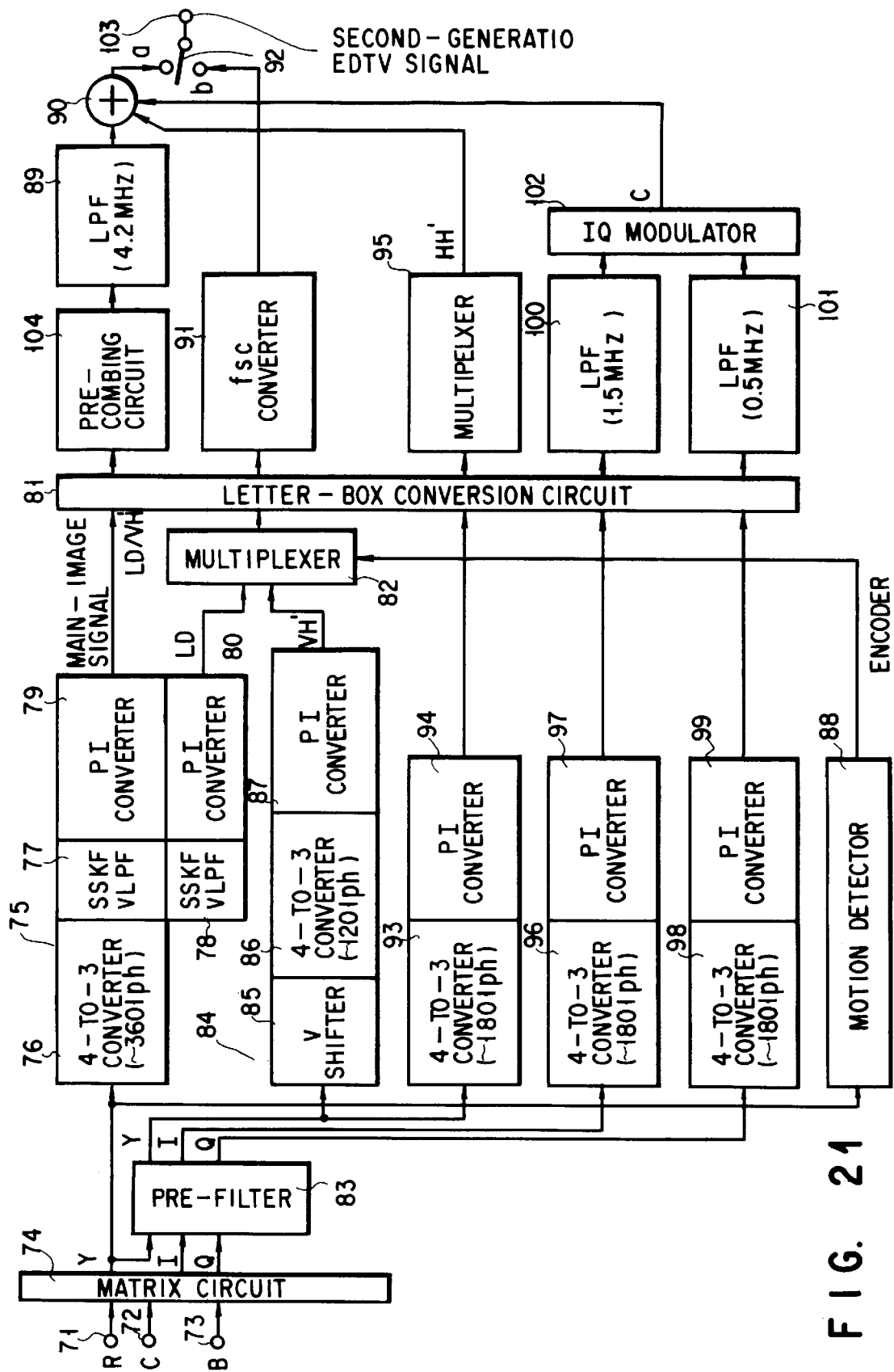
FIG. 21 is a block diagram showing an encoder for generating a second-generation EDTV signal.

FIG. 21 shows an encoder for generating second-generation EDTV signals, each containing horizontal and vertical reinforcing signals. In this encoder, progressive scanning signals for 480-line height screen are line-converted to rate of 3 from 4 and then converted to interlace signals, which form a main-image signal. The main-image signal, thus formed, is transferred during a main-image period. The component VH and LD, which are vertical-reinforcing signals are transferred during the upper and lower non-image periods. The component VH is a removed component when the band limitation performed to prevent image distortion due to the conversion of scanning signals of the still image to interlace signals. The component LD is a removed component when the band limitation performed to convert the scanning signals of the moving image to the interlace signals.

In the encoder shown in FIG. 21, the input terminals 71, 72 and 73 receive the R, G and B signals of a source image, respectively. A matrix circuit 74 converts the R, G and B signals to a Y (luminance) signal, an I signal, and a Q signal. The Y signal is supplied to a 4-to-3 converter 76 incorporated in a vertical-canning processing section 75. The 4-to-3 converter 76 converts the Y signal, which is a 480-lph signal, to a 360-lph signal. The SSKFs (Symmetric Short Kernel Filters) 77 and 78, both incorporated in the processing section 75, function as a vertical low-pass filter (LPF) and a vertical high-pass filter (HPF), respectively. To be more specific, the SSKF 77 separates a vertical low-band component from the Y signal, while the SSKF 78 separates a vertical high-band component from the Y signal. The outputs of the SSKFs 77 and 78 are connected to PI converters 79 and 80, which are provided in the vertical-canning processing section 75, too. The PI converter 79 converts the vertical low-band component of the Y signal into an interlace scanning signal, which is supplied to a letter-box conversion circuit 81. The PI converter 80 converts the vertical high-band component of the Y signal into an interlace scanning signal. This interlace scanning signal is supplied to a multiplexer 82, as a vertical, high-band LD signal which is of 180 lph to 360 lph.

The Y signal, the I signal, and the Q signal are supplied from the matrix circuit 74 to a pre-filter 83. The pre-filter 83 narrows the band of each input signal. The band-limited Y signal output from the filter 83 is a vertical, high-band processing section 84. The section 84 comprises a V shifter 85, a 4-to-3 converter 86, and a PI converter 87. The V shifter 86 converts the vertical high-band component of the Y signal to a low-band component. The 4-to-3 converter 86 converts the low-band component to a 360 to 480-lph vertical high-band component. The PI converter 87 converts the 480-lph vertical high-band component to a interlace scanning signal. A vertical high-band VH' signal which has a value of 360-lph per field is supplied to the multiplexer 82.

The Y signal from the matrix circuit 74 is supplied to a motion detector 88, as well. The motion detector 88 detects the motion of an image from the Y signal and generates a motion signal, which is input to the multiplexing circuit 82. From the motion signal the multiplexer 82 determines whether or not the image is a still picture or a moving picture. If the image is a still picture, the multiplexer 82 multiplexes the VH' signal and the LD signal, producing a multiplex signal. The multiplex signal is input to the letter-box conversion circuit 81. If the image is a moving picture, the multiplexer 82 supplies only the LD signal to the letter-box conversion circuit 81.

The letter-box conversion circuit 81 allocates the main-image signal output by the PI converter 79, to the time slot for the central screen region, and the output of the multiplexer 82 used as a vertical reinforcing signal, to the time slot for the upper and lower screen regions. The main-image signal output from the circuit 81 is supplied to a pre-combing circuit 104, which effects pre-combing on the main-image signal. The main-image signal is input to an LPF 89, which narrows the band of the main-image signal within 4.2 MHz. The band-narrowed signal is supplied via a multiplexer 90 to the first contact a of a switch 92. The pre-combing is performed to make a hole in the multiplex-frequency range for an HH' signal, which will be described later. A vertical reinforcing signal (LD/VH') from the letter-box conversion circuit 81 is input to an fsc modulator 91. Using a color sub-carrier, the fsc modulator 91 modulates the vertical reinforcing signal and supplies it to the second contact b of the switch 92. The vertical reinforcing signal has been compressed along time axis to one-third the original duration, in the letter-box conversion circuit 81.

In the second-generation EDTV broadcasting, signal components of 4.2 MHz or more, which cannot be transmitted in the existing broadcasting band, are transmitted from the stations in order to improve the image resolution in the horizontal direction. More specifically, a 4-to-3 converter 93 converts the horizontal high-band component of the Y signal in terms of the number of scanning lines, and a PI converter 94 converts the output of the converter 93 to a interlace scanning signal. The output of the PI converter 94 is supplied, as a horizontal high-band HH signal, to the letter-box conversion circuit 81. The circuit 81 allocates the HH signal to the time slot for the central screen region, and supplies the HH signal to a multiplexer 95. The multiplexer 93 shifts the HH signal in terms of frequency, to a hole which is a frequency range conjugate to the color sub-carrier, thereby producing an HH' signal. The HH' signal is supplied to the multiplexer 90. The multiplexer 90 multiplexes the HH' signal with the main-image signal.

The I signal and the Q signal, both supplied from the pre-filter 83, are supplied to 4-to-3 converters 96 and 98, respectively. The converter 96 converts the I signal in terms of the number of scanning lines, and supplies it to a PI converter 97. The converter 98 converts the Q signal in terms of the number of scanning lines, and supplies it to a PI converter 99. The PI converter 97 converts the I signal into an interlace scanning signal, and the PI converter 99 the Q signal to an interlace scanning signal. The interlace scanning signals output from the PI circuits 97 and 99 are supplied to the letter-box conversion circuit 81 and hence to LPFs 100 and 101, respectively. The LPFs 100 and 101 narrow the bands of the I and Q signals to 1.5 MHz and 0.5 MHz. The I and Q signals, thus band-narrowed, are input to an IQ modulator 102. The IQ modulator 102 performs orthogonal modulation on the band-narrowed I and Q signals and supplies them to the multiplexer 90. The multiplexer 90 multiplexes the I and Q signals with the Y signal, producing a main-image signal.

The switch 92 selects the main-image signal from the multiplexer 90 during a main-image period. It selects the vertical reinforcing signal from the fsc modulator 91 during a non-image period. The main-image signal and the vertical reinforcing signal are supplied, as a second-generation EDTV signal, from the output terminal 103.

When an NTSC television receiver receives this second-generation EDTV signal, it achieves letter-box display, displaying the entire image of the EDTV program in the central region of the screen, though leaving the upper and lower screen regions blank. When an second-generation EDTV receiver receives the second-generation EDTV signal, the receiver can display a high-resolution image, thanks to the horizontal and vertical reinforcing signals contained in the EDTV signal.

Figure 22:
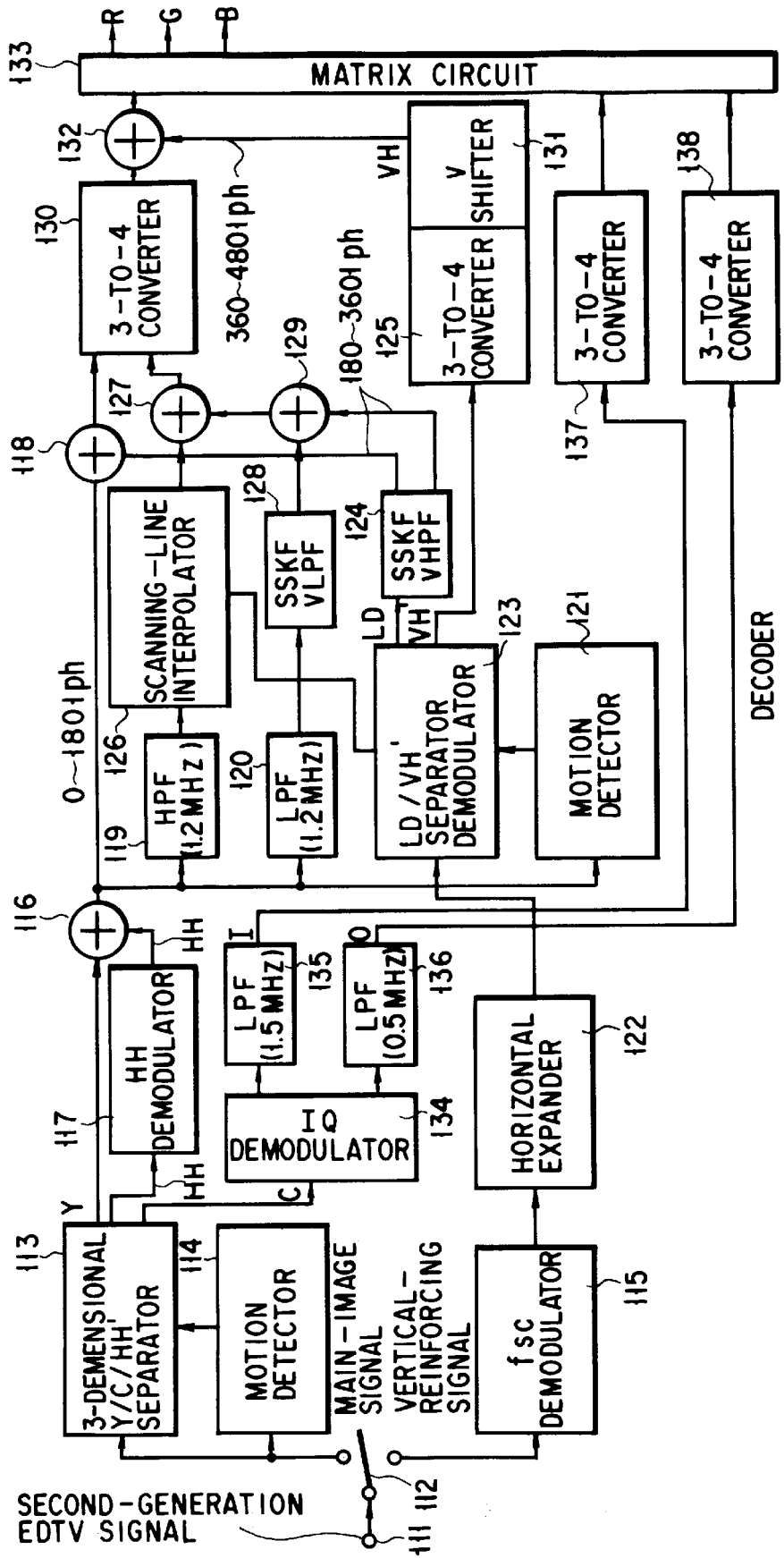
FIG. 22 is a block diagram showing a decoder for decoding a second-generation EDTV signal.

FIG. 22 shows the decoder incorporated in an second-generation EDTV receiver, which is desired to decode a second-generation EDTV signal generated by the encoder shown in FIG. 21.

In this decoder, the second-generation EDTV signal received at the input terminal 111 is supplied to a switch 112. The switch 112 supplies the main-image signal contained in the EDTV signal to a 3-dimensional Y/C/HH' separator 113 and a motion detector 114, and supplies the vertical reinforcing signal contained in the EDTV signal to a fsc demodulator 115. The motion detector 114 detects the motion of an image from the vertical reinforcing signal and generates a motion signal. The 3-dimensional Y/C/HH' separator 113 has a frame memory (not shown), and separates the Y signal, and the color signal (i.e., I and Q signals) and the horizontal reinforcing signal (i.e., HH' signal) from the main-image signal. The Y signal is input an adder 116. The HH' signal is input to an HH demodulator 117. The HH demodulator 117 demodulates the Y signal into an HH signal, which is a horizontal high-band component having a frequency ranging from 4.2 HMz to 6 MHz. The HH signal is input to the adder 116. The adder 116 adds the Y signal and the HH signal together, generating a main-image signal having an improved horizontal resolution. This main-image signal is supplied to an adder 118, a high-pass filter (HPF) 119, a low-pass filter (LPF) 120, and a motion detector 121.

In the meantime, the fsc demodulator 115 demodulates the vertical reinforcing signal supplied from the switch 112. The demodulated signal is input to a horizontal expander 122, which expands the vertical reinforcing signal three times the original duration. The expanded vertical reinforcing signal is supplied to an LD/VH' separator/demodulator 123. The motion detector 121 detects the motion of the image represented by the main-image signal, generating a motion signal. This motion signal is input to the LD/VH' separator/demodulator 123. In response to the motion signal the separator/modulator 123 divides the vertical reinforcing signal into an LD signal and a VH' signal. The LD signal is supplied to an SSKF-VHPF 124, whereas the VH' signal is supplied to a 3-to-4 converter 125. The LD signal and the VH' signal, both output from the LD/VH' separator/modulator 123, will be used to improve the vertical resolution of the image represented by the main-image signal.

The SSKF-vHPF 124 effects reverse filtering on the modulated LD signal, supplying the vertical, high-band component of the Y signal to the adder 118. The adder 118 adds the vertical, high-band component of the Y signal to the main-image signal, thereby compensating for the decrease of resolution caused by interlace conversion at the transmitter. The output of the adder 118 is input to a 3-to-4 converter 130.

The LD signal contains no components of 1.2 MHz or more since it has been modulated in the broadcasting station, by using the color sub-carrier. Therefore it is impossible to improve resolution for any main-image data component of 1.2 MHz or more, by using the vertical reinforcing signal. To improve the resolution for such a component of the main-image data, scanning lines are interpolated in accordance with a motion signal. More precisely, the high-pass filter (HPF) 119 extracts narrows the band of the main-image signal supplied from the adder 116, outputting only the component of 1.2 MHz or more. The component of 1.2 MHz is input to a scanning-line interpolator 126. The interpolator 126 interpolates scanning lines in accordance with the motion detected signal supplied from the motion detector 121 via the LD/VH' separator/modulator 123. The output of the interpolator 126 is input to an adder 127. If the interpolator 126 performs under the consecutive scanning process instead of interlace scanning process, the processing speed will be need increase. Therefore, the scanning lines transmitted from the broadcasting station are supplied from the adder 116 to the adder 118, whereas the scanning lines generated by the interpolator 126 are supplied to the adder 127. That is, the direct signal path and the interpolation signal path are exist.

The LPF 120 extracts that component of the main-image signal which has a horizontal frequency of 1.2 MHz or less. This component is supplied to the SSKF-vLPF 128. The SSKF-vLPF 128 supplies the vertical, low-band component of the main-image signal to the adder 129. The adder 129 adds the outputs of the 128 to the output of the SSKF-vLPF 124, thereby improving the resolution for the horizontal low-band component produced in the interpolation system. The output of the adder 129 is input to the adder 127. The adder 127 adds the horizontal low-band component to the horizontal high-band component supplied from the scanning-line interpolator 126. The output of the adder 127 is input to the 3-to-4 converter 130, which has received the main-image signal supplied from the broadcasting station. The 3-to-4 converted 130 converts the input signals into a 480-lph signal, which is supplied to an adder 132.

The 3-to-4 converted 125 converts the VH' signal from the LD/VH' separator/modulator 123, thereby increasing the number of scanning lines to 4/3 times the original value. The VH' signal thus processed is input to a V shifter 131. The V shifter 131 shifts the frequency of the VH' signal back to the vertical high-band and supplied it to the adder 132. The adder 132 adds the 360-lph to 480-lph vertical high-band component to 360-lph vertical low-band component supplied from the 3-to-4 converter 130, thereby compensating for the decrease of resolution performed. The 480-lph scanning signal from the adder 132 is input to a matrix circuit 133.

The color signal C the 3-dimensional Y/C/HH' separator 113 has separated from the main-image signal is supplied to an IQ demodulator 134. The IQ demodulator 134 demodulates the color signal C into I signal Q signal. The signal and the Q signal are input to LPFs 135 and 136, respectively, which narrow the horizontal bands of the I and Q signals. The I and Q signals, both band-narrowed, are supplied to 3-to-4 converters 137 and 138, respectively. The 3-to-4 converters 137 and 138 effects scanning-line conversion on the respective input signals, converting the signals into 480 scanning signals. The 480 scanning signals are supplied to the matrix circuit 133. From these scanning signals the matrix circuit 133 generates R, G and B signals. The R, G and B signals are supplied to a display (not shown), which displays a wide color image improved in both the horizontal resolution and the vertical resolution.

The signal processing equivalent to the processing which the decoder of FIG. 22 performs is accomplished by the components shaded in FIG. 16.

Figure 23:
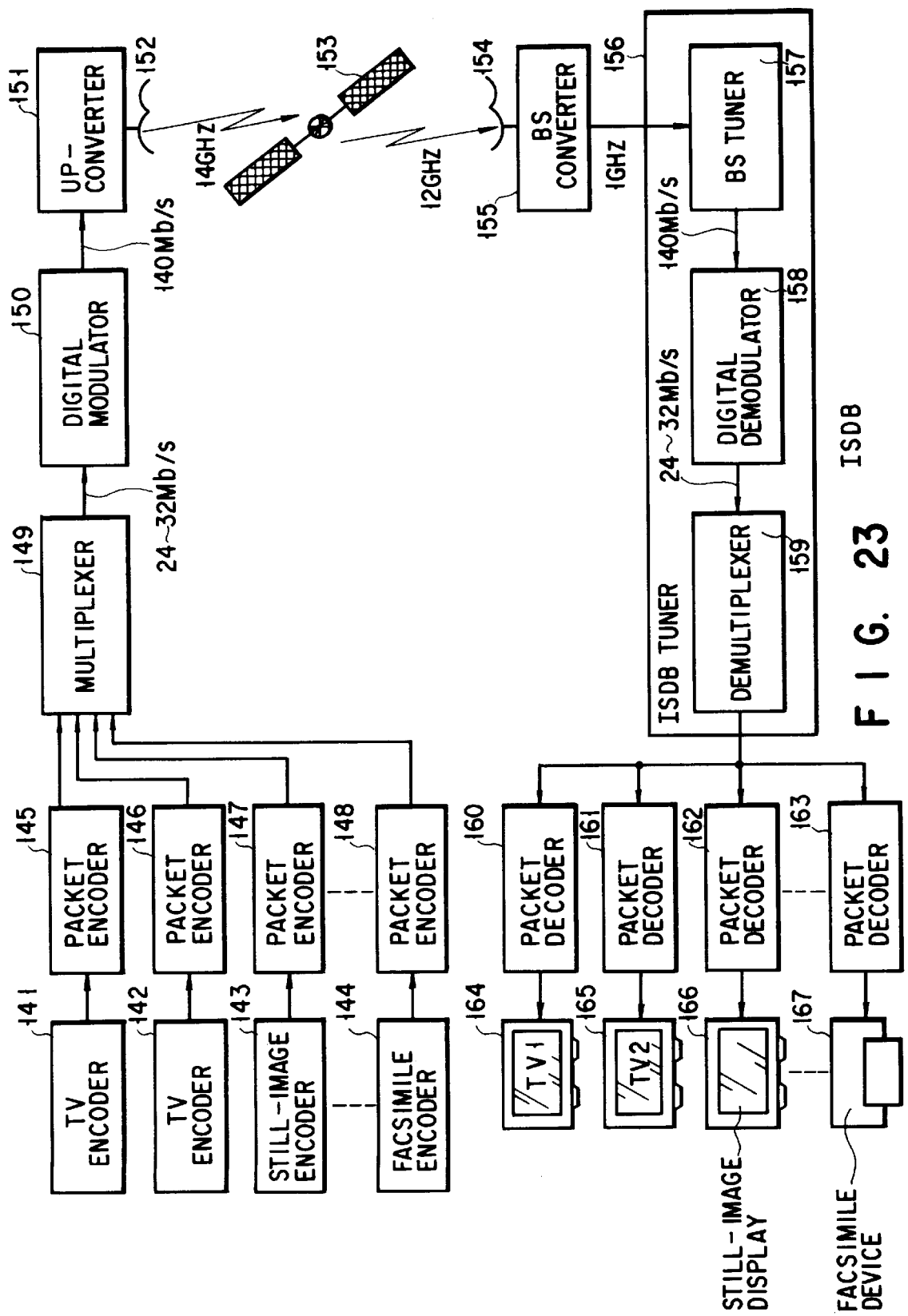
FIG. 23 is a block diagram illustrating an ISDB system.

FIG. 23 shows an ISDB (Integrated Service Digital Broadcasting) system in which BS signals of 12 GHz-band BS waves are used. The ISDB system comprises a broadcasting station, a broadcasting satellite 153, and a household television receiver.

The broadcasting station comprises two TV encoders 141 and 142, a still-image encoder 143, a facsimile encoder 144 and some other encoders (not shown), a multiplexer 149, a digital modulator 150, an up-converter 151, and an antenna 152. The household television receiver comprises an antenna 154, an ISDB tuner 156, packet decoders 160 to 163 and some other packet decoders (not shown), TV displays 164 to 165, a still-image display 166, some other displays (not shown), and a facsimile device 167. The ISDB tuner 156 comprises a BS converter 155, a BS tuner 157, a digital demodulator 158, and a demultiplexer 159.

How the ISDB system operates will be explained. In the broadcasting station, the encoders 141 and 142 generate two digital signals which represent television images TV1 and TV2, respectively. The still-image encoder 143 generates a digital signal which represents a still image. The facsimile encoder 144 generates a digital signal which represents a facsimile image.

The other encoders (not shown) generate digital signals. The digital signals generated by the encoders 141 to 144 are supplied to packet encoders 145 to 148, respectively. The digital signals generated by the other encoders are supplied to the other packet encoders, respectively. The packet encoders 145 to 148 and the other packet encoders (not shown) packetize the input digital signals, producing bit streams, which are input to the multiplexer 149. The multiplexer 149 multiplexes the input bit stream, generating and supplying a digital data stream to the digital modulator 150. The digital modulator 150 modulates the data stream, generating a digital signal. The digital signal is supplied the up-converter 151. The upconverter 151 up-coverts the digital signal, thereby generating a 14 GHz-band signal. The 14 GHz-band signal is transmitted from antenna 152 toward a broadcasting satellite 153.

The satellite 153 receives the 14 GHz-band signal, converts the signal to a 12 GHz-band signal and transmits the 12 GHz-band signal toward a household television receiver. In the household television receiver, the antenna 154 receives the 12GHz-band signal transmitted from the broadcasting satellite 153. The 12GHz-band signal is supplied to the BS converter 155. The BS converter 155 converts the input signal to a 1 GHz-band signal, which is input to the ISDB tuner 156. In the ISDB tuner 156, the BS tuner 157 changes the frequency of the input signal and supplies the signal to the digital demodulator 158. The digital demodulator 158 demodulates the signal input signal and supplies it to the demultiplexer 159. The demultiplexer 159 generates data streams from the output signal of the digital demodulator 158. The data streams, i.e., the output of the ISDB tuner 156, are input to the packet decoders 160 to 163 and the other packet decoders (not shown). The packet decoders 160 to 163 and the other packet decoders the data streams, generating bit streams. The bit streams are input to the TV displays 164 and 165, the still-image display 166, the facsimile device 167, and the other displays (not shown). The TV displays 164 and 165 display the television images TV1 and TV2, respectively. The still-image display 166 displays a still image. The facsimile device 167 outputs a facsimile image.

In the ISDB system of FIG. 23, a plurality of television images are converted into digital data items, and these image data items are transferred in time-division fashion. In addition, other digital data, such as facsimile data and game-soft data, can be transferred together with the image data items.

FIG. 24 illustrates the layers of processing data which are performed in the broadcasting station before the data is transmitted to the household television receiver, and also the layers of processing data which are performed in the reception side the data is displayed and printed. Also illustrated in FIG. 24 are formats which data assumes at the interfaces between the steps.

The first to third layers in the broadcasting station are concerned with the steps of processing data to transmit data to the television receiver. The fifth to seventh layers are concerned with the steps of processing data for other services. The fourth layer is concerned with the step of connection the layers.

In the broadcasting station, video data, audio data, and character data are input at the seventh layer. At the sixth layer, the input data items are encoded. At the fifth layer, the data items are divided into groups. At the fourth layer, the supply rate of bit streams is changed. At the third layer, the bit stream are packetize and multiplexed in time-dividing fashion. At the second layer, the error correction code is added. At the first layer, the coded data items are modulated. The modulated data items are transmitted via a transmission path to the household television receiver.

In the household television receiver, the received data items are processed at the first to seventh layers, exactly in the reverse order. As a result, the program signal is reproduced from the received data items.

Figure 25:
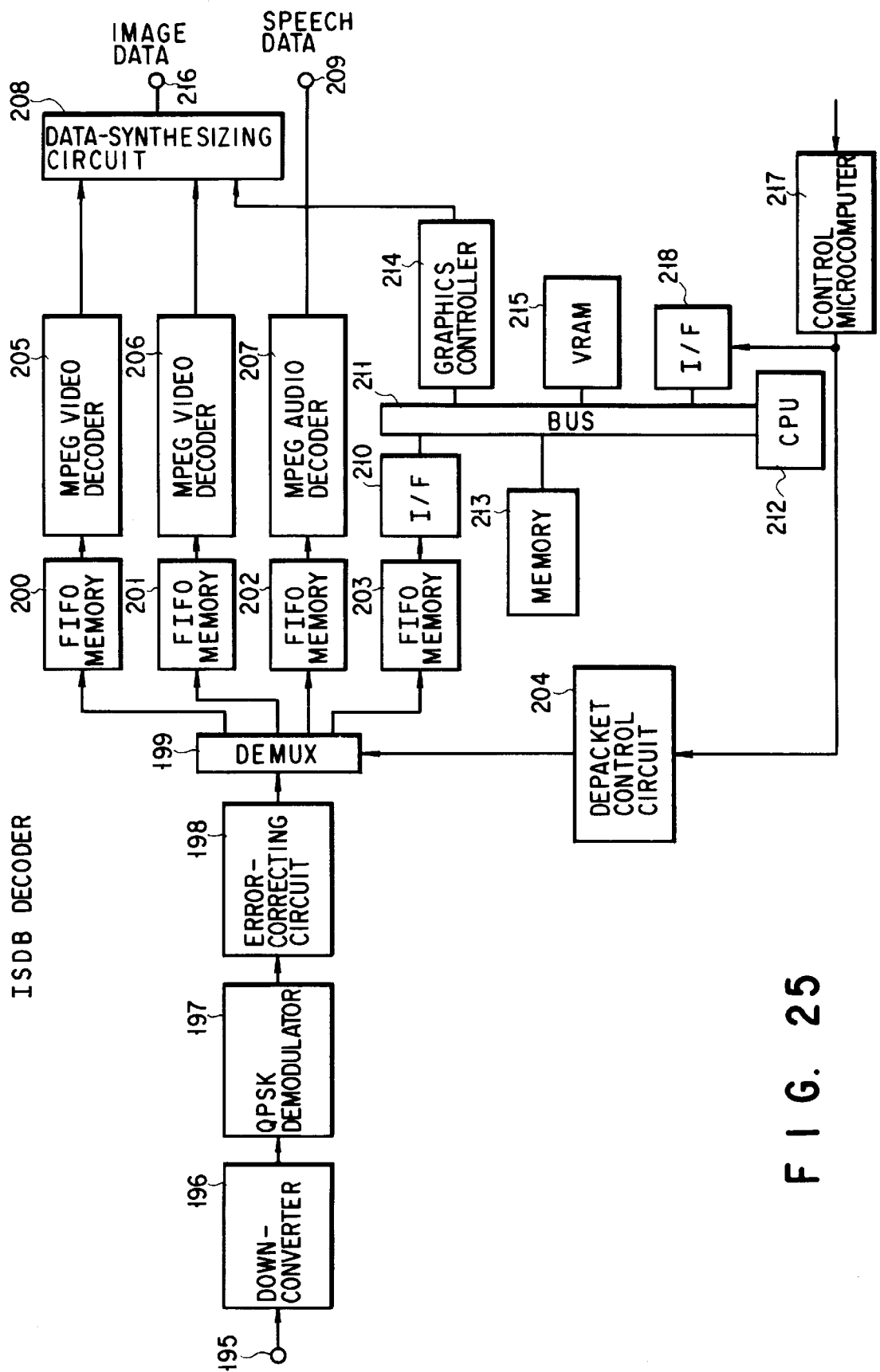
FIG. 25 is a block diagram showing the decoder incorporated in the ISDB system.

FIGS. 25 and 26 show the decoders and the encoders, respectively, which are related to the ISDB system illustrated in FIG. 24.

As shown in FIG. 26, in the broadcasting station, image signal A and speech signal A, either being a digital signal, are supplied to input terminals 171 and 172, respectively. The image signal A and the speech signal A are input to MPEG video encoders 176 and 177, respectively. The encoder 176 compresses the image signal A, generating image data A. The encoder 177 compresses the speech signal A, generating speech data A. The image data A and the speech data A are supplied to a packet encoder 178. The packet encoder 178 converts the image data A and the speech data A into data packets. The data packets are supplied to a FIFO (First-IN, First-Out) memory 179.

In the meantime, image signal B and speech signal B, either being a digital signal, are supplied to input terminals 173 and 174, respectively. The image signal B and the speech signal B are input to MPEG video encoders 181 and 182, respectively. The encoder 181 compresses the image signal B, generating image data B. The encoder 182 compresses the speech signal B, generating speech data B. The image data B and the speech data B are supplied to a packet encoder 183. The packet encoder 183 converts the image data B and the speech data B into data packets. These data packets are supplied to a FIFO memory 184.

Further, digital data, e.g., character data, is supplied to an input terminal 175. The digital data is input to a converter 185. The converter 185 converts the input data into a bit stream, which is supplied to an packet encoder 186. The packet encoder 186 converts the digital data into data packets. The data packets are supplied from the encoder 186 to a FIFO memory 187.

Bit streams are read from the FIFO memories 179, 184 and 187 and supplied to a multiplexer (MUX) 180. The MUX 180 multiplexes the input bit streams in time-dividing fashion and outputs a digital data stream. The digital data stream is input to an error-correcting circuit 188. The circuit 188 adds a correction code to the input data stream. The output data stream of the circuit 188 is input to a QPSK modulator 189. The QPSK modulator 189 modulates the input data stream, generating modulated data. The modulated data is supplied to an up-converter 190, which changes the frequency of the input data. The output data of the up-converter 190 is supplied to an output terminal 191.

As shown in FIG. 25, in the television receiver, an input terminal 195 receives a signal transmitted from the broadcasting satellite 153. The signal is supplied to a down-converter 196. The down-converter 196 changes the frequency of the signal. The output signal of the down-converter 196 is input to a QPSK-demodulator 197. The QPSK demodulator 197 demodulates the input signal into a data stream. The data stream is supplied to an error-correcting circuit 198. The circuit 198 corrects errors in the data stream. The data stream is supplied to a demultiplexer (DEMUX) 199.

The DEMUX 199 divides the input data stream into packet streams under the control of a depacket control circuit 204. The packet stream generated from the image signal A is supplied via a FIFO memory 200 to an MPEG video decoder 205, which decodes this packet stream. The decoded packet stream is supplied to a data-synthesizing circuit 208. Meanwhile, the packet stream generated from the image signal B is supplied via a FIFO memory 201 to an MPEG video decoder 206, which decodes this packet stream. This decoded packet stream is supplied to the data-synthesizing circuit 208, too. The packet streams generated from the speech signals A and B are supplied via a FIFO memory 202 to an MPEG decoder 207. The MPEG decoder 207 decodes these input packet streams into speech data. The speech data is output from an output terminal 209.

The packet stream produced from the digital data is input from the DEMUX 199 to a FIFO memory 203. This packet stream is then supplied to a bus 211 through an interface (I/F) 210. A CPU 212 stores the packet data into a memory 213 through the bus 211. The CPU reads the packet data from the memory 213 and decodes it. The decoded packet data is input to a VRAM 215 through a graphics controller 214. The VRAM 215 develops the packet data into image data. The image data, thus obtained, is supplied to the data-synthesizing circuit 208 through the graphics controller 214.

The data-synthesizing circuit 208 synthesizes the packet streams produced from the image signals A and B, generating image data which represents images A and B. The image data is output via an output terminal 216. The image data is supplied to a display (not shown), which displays images A and B simultaneously on the same screen.

The displaying of images can be controlled by a remote controller (not shown). A signal generated by operating the remote controller is transmitted to a control microcomputer 217. The microcomputer 217 decodes the signal and supplies it to the depacket control circuit 204. Thus, the depacket control circuit 204 controls the DEMUX 199 in accordance with the signal transmitted from the remote controller. For example, the controller 204 may cause the DEMUX 199 to output the packet stream representing speech B and only one of the packet streams representing images A and B. The signal decoded by the control microcomputer 217 is supplied via an interface (I/F) 218 to the CPU 212, as well. In accordance with this signal the CPU 212 controls the generating of image data. For instance, the CPU can designates that position on the screen at which the image represented by the image data is to be displayed.

In the ISDB system of FIG. 23, the image data, the speech data and the other digital data can be processed along with each other, by means of the components equivalent to those shaded in FIGS. 17 and 18.

FIG. 27 represents the spectrum of a signal which is used in a two-way CATV system.

As seen from FIG. 27, about 50 downward analog-data transfer channels provided at present are allocated to the band ranging from 50 MHz to 450 MHz. The extended channels available now are allocated to the band ranging from 450 MHz to 500 MHz. Further, digital two-way channels are allocated to the band ranging from 500 MHz to 1 GHz. To be more precise, allocated to this 500 MHz-1 GHz band are: downward control channels, downward digital-data transfer channels, upward digital-data transfer channels, and mobile-telephone channels.

Each downward control channel has a band width of 1.5 MHz and is used to transfer QPSK-modulated waves. The downward transfer channels number about 15 at maximum, has a band width of 12 MHz, and adopts 64QAM-modulation system. All downward channels are allocated to a band which ranges from 500 MHz to 708 MHz. The upward digital-data transfer channels are allocated to a band which ranges from 900 MHz to 972 MHz and number at about 45 at maximum. Each upward channel has a band width of 1.5 MHz and is used to transfer QPSK-modulated waves.

Figure 29:
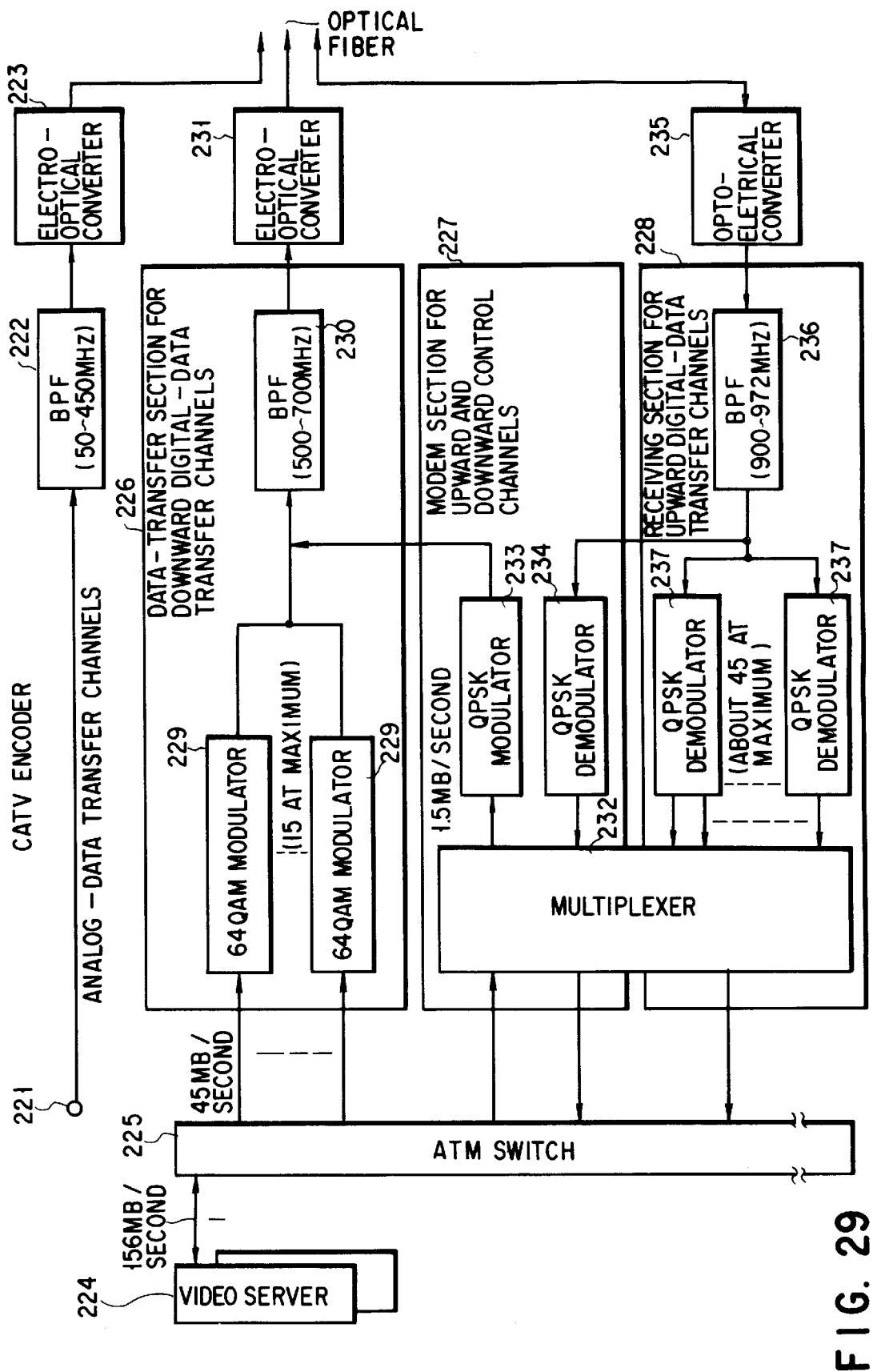
FIG. 29 is a block diagram showing the encoder used in the two-way CATV system.

FIGS. 28 and 29 show the decoder and encoder used in the two-way CATV system described above.

In the CATV encoder shown in FIG. 29, signals transmitted on about 50 analog-data transfer channels are supplied from an input terminal 221 to a band-pass filter (BPF) 222. The BPF 222 outputs signals which falls within a band ranging from 50 to 450 MHz. These signals are supplied to an electrooptical converter 223. The converter 223 converts the input signals to optical signals, which are supplied via an optical fiber to the CATV decoder (FIG. 28).

The CATV encoder has a video server 224 in order to provide video soft in real time at the demand made by a user and supplied from his or her television receiver. The video server 224 is connected by transfer lines to an asynchronous-transfer mode (ATM) switch 225. The ATM switch 225 is connected to a modem section 227 provided for the upward and downward control channels and also to a receiving section 228 provided for the upward digital-data transfer channels. The video server 224 stores a plurality of video programs and outputs image data at the demand from a user. The image data is supplied to the ATM switch 225 which is connected to a data-transfer section 226 provided for downward digital-data transfer channels. The section 226 has at most 15 64QAM-modulators 229. The ATM switch 225 selects one of 15 downward digital-data transfer channels and supplies the image data to the 64QAM-modulator 229 associated with the channel selected.

In the data-transfer section 226, the 64QAM-modulator 229 associated with the channel selected by the ATM switch 225 modulates the input image data into an image signal. The image signal is input to a bandpass filter (BPF) 230. The BPF 230 outputs an image signal of a band ranging from 500 to 708 MHz. The output image signal of the BPF 230 is supplied from the data-transfer section 226 to an electrooptical converter 213. The converter 231 converts the input signal to optical signal, which are supplied via the optical fiber to the CATV decoder (FIG. 28). The modem section 227 and the receiving section 228 shares a multiplexer 232, which is connected to the ATM switch 225. The multiplexer 232 multiplexes the data supplied from the ATM switch 225 at the rate of 1.5 MB/sec, generating data which will be transferred at the rate of 45 MB/sec. Control data supplied from a control circuit (not shown) to the ATM switch 225 is supplied to the multiplexer 232 and hence to a QPSK modulator 233. The QPSK-modulator 233 performs QPSK modulation on the input data, generating QPSK-modulated data. The QPSK-modulated data is supplied from the modem section 227 to the data-transfer section 226. This data is input to the BPF 230, along with the image transmitted signal through the selected downward digital-data transfer channel.

In the meantime, an optical signal transferred via the optical fiber is supplied to the CATV encoder (FIG. 29). In the CATV encoder, this optical signal is input to an opto-electrical converter 235. The converter 235 converts the input signal to an electric signal, which is supplied to the receiving section 228. The receiving section 228 has a band-pass filter (BPF) 236 and at most 45 QPSK-demodulators 237. In the section 228, the electric signal is input to the BPF 236. The BPF 236 outputs a signal of a band ranging from 900 to 972 MHz. The signal is supplied to the QPSK-demodulators 237. One of the QPSK-demodulators 237 demodulates the signal and supplies it to the multiplexer 232. The QPSK-modulator 237 demodulates a control data, too. The demodulated signal and the demodulated control signal are supplied to the multiplexer 232. The multiplexer 232 multiplexes the signal and the control data, generating data. This data is supplied to the ATM switch 225.

As shown in FIG. 28, the CATV decoder provided in a television receiver comprises an analog decoding section, a modem section 243, a graphics section 244, and an image decoding section 245. The input terminal of the CATV decoder has an input terminal 241 which is connected to the optical fiber 241. Through the optical fiber 241 a signal having the spectrum shown in FIG. 27 is supplied to the input terminal 241. The signal is supplied from the terminal 241 to a display (not shown) and also to the analog decoding section 242.

The analog decoding section 242 is designed to decode NTSC analog signals. In the section 242, analog signals from the terminal 241 are supplied to an analog tuner 246. The analog tuner 246 receives the analog signal of a channel selected by an analog-channel selector 247. The turner 246 converts the analog signal into a base-band video signal. The video signal has been scrambled in the broadcasting station. The scrambled video signal is input to a descramble circuit 248, which descrambles the video signal. The descramble video signal is supplied to an adjusting circuit 249. The circuit 249 adjust the volume and the like of the signal. The output signal of the adjusting circuit 249 is supplied to a signal-mixing circuit 250. It is not the signal-mixing circuit 250 which decodes the NTSC signal. Rather, the NTSC decoder incorporated in the display (not shown) does decode the NTSC signal.

In the meantime, the signals on downward digital-data transfer channels are supplied to the modem section 243. The modem section 243 is designed to demodulates downward data and modulates upward data. In the section 243, the downward data is supplied to a 64QAM-demodulator 251, and the control data is supplied to a QPSK demodulator 252. The 64QAM-demodulator 251 demodulates the downward data and supplies it to a frame-dividing circuit 254. The QPSK-demodulator 252 demodulates the control data and supplies it via an RF circuit controller 253 to a VCI (Virtual Channel Identifier) circuit 255 which is incorporated in the signal-mixing circuit 250. The VCI circuit 255 extracts the image data from an video program. This image data is supplied to an MPEG decoder 256. The MPEG decodes the image data, which is input to the signal-mixing circuit 250.

As shown in FIG. 28, the graphics section 244 comprises a CPU main board 258 and a graphics board 259. The CPU main board 258 outputs graphics data for controlling the display (not shown) such that graphics data is displayed on the screen of the display. The graphics data is supplied to the graphics board 259. The graphics board 259 converts the graphics data to image data, which is supplied to the signal-mixing circuit 250. The graphics data may be supplied from the CPU main board 258 to a printer (not shown) or the like to print the graphics data.

The signal-mixing circuit 250 synthesizes or switches the audio data supplied from the analog decoding section 242 and the image data items supplied from the modem section 243 and the graphics section 244, thereby supplying an video signal and an audio signal to the display (not shown). As a result, the display displays the image of the video program which the user has demanded, along with the graphics data generated at the television receiver.

The upward data has been generated by a control circuit (not shown). It is supplied through the RF circuit controller 253 to the QPSK modulator 257 which is provided in the modem section 243. The QPSK-modulator 257 modulates the upward data. The modulated upward data is supplied via the terminal 241 to the optical fiber.

In the CATV decoder, various data items are processed by the components equivalent to those shaded in FIGS. 19 and 20.

A personal computer designed to perform various functions remains in booting state for some time after its power switch has been closed. That is, when the power switch is turned on, the bootstrap program is executed, the memories are tested, and the IPL (Initial Program Loader) loads the OS (Operating System) into one of the memories. After the OS is loaded into the memory, the computer can control video function. Until the OS is loaded into the memory, the display connected to the personal computer displays a message "BOOTING." As long as the personal computer remains in booting state, the user is unable to select a channel or to enjoy seeing a TV program.

Figure 30:
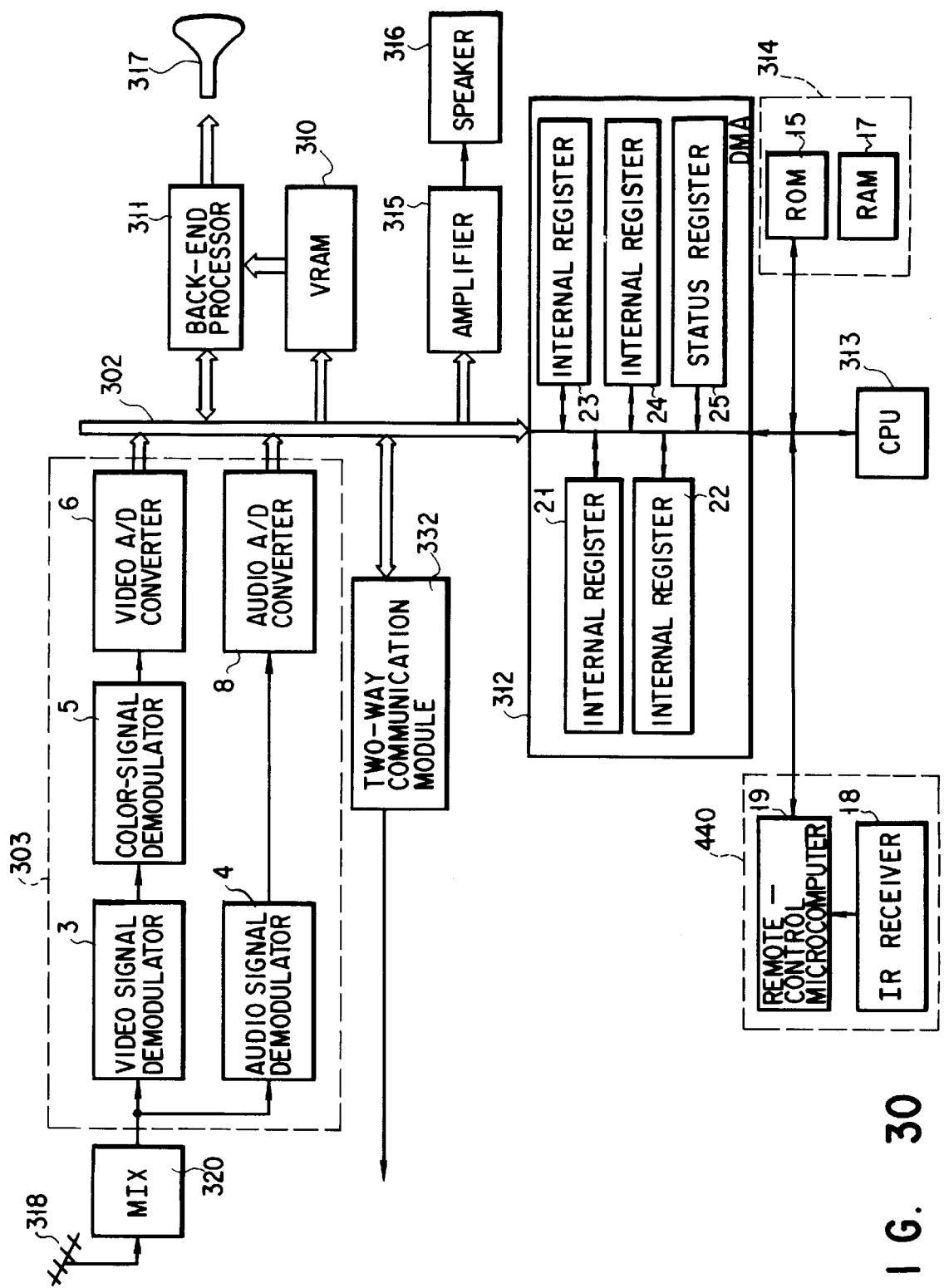
FIG. 30 is a block diagram illustrating still another television receiver according to the present invention.

FIG. 30 illustrates another television receiver according to the present invention, which comprises a television section and a personal computer section. This television receiver is characterized in that the user can see a TV program immediately after the power switch is turned on, through the computer section in booting state for some time, and that the personal computer section controls the television section.

In FIG. 30, the components identical or similar to those shown in FIGS. 1 to 3 and FIG. 4 are designated at the same reference numerals.

As shown in FIG. 30, the TV signals generated in an antenna 318 are supplied to a MIX 320 which functions as a tuner. The MIX 320 selects the TV signal of the channel selected by the user and supplies the TV signal to an NTSC decoder module 303.

In the module 303, a video signal demodulator 3 detects an IF signal and generates a base-band video signal. The video signal is input to a color-signal demodulator 5. The demodulator 5 demodulates the video signal, producing a R signal, a G signal, and a B signal. These signals are supplied to an video A/D converter 6. The video A/D converter 6 converts the input signals to digital video data, which is supplied to a bus 302. An audio signal demodulator 4 detects an intermediate-frequency component of the IF signal and supplies it to an audio A/D converter 8. The audio A/D converter 8 converts the input signal to digital audio data, which is supplied to the bus 302.

The bus 302 is a combination of the analog switch 349 and the three buses 356, 404 and 428, all shown in FIG. 4. The bus 302 is controlled by a DMA device 312, transferring data items to the other components of the television receiver. A VRAM 310 is provided to store image data supplied via the bus 302. A back-end processor 311 converts the image data read from the VRAM 310, to an analog signal. The analog signal is supplied to a CRT 317. The CRT 317 displays the image represented by the video signal supplied from a backend processor 311.

The audio data is supplied via the bus 302 to an amplifier 315 which contains a audio DSP (Digital Signal Processor). The amplifier 315 converts the audio data to an speech signal, which is supplied to a speaker 316. The speaker 316 generates a speech represented by the speech signal.

Controlled by a CPU 313, the DMA device 312 controls the transfer of data through the bus 302. The DMA device 312 comprises three internal registers 21 to 24 and a status register 25. The internal registers 21 and 22 store the address data items supplied from the CPU 313 and designating the addresses to which the video data and the audio data should be transferred. The internal register 23 stores data supplied from the CPU 313 and representing the number of video data blocks to transfer. The internal register 24 stores data supplied from the CPU 313 and representing the number of audio data blocks to transfer.

A main memory 314 is connected to the bus 302. The main memory 314 comprises a ROM 15 and a RAM 17. Stored in the ROM 15 is the bootstrap program which the CPU 313 reads when the user turns on the power switch of the television receiver.

Figure 31:
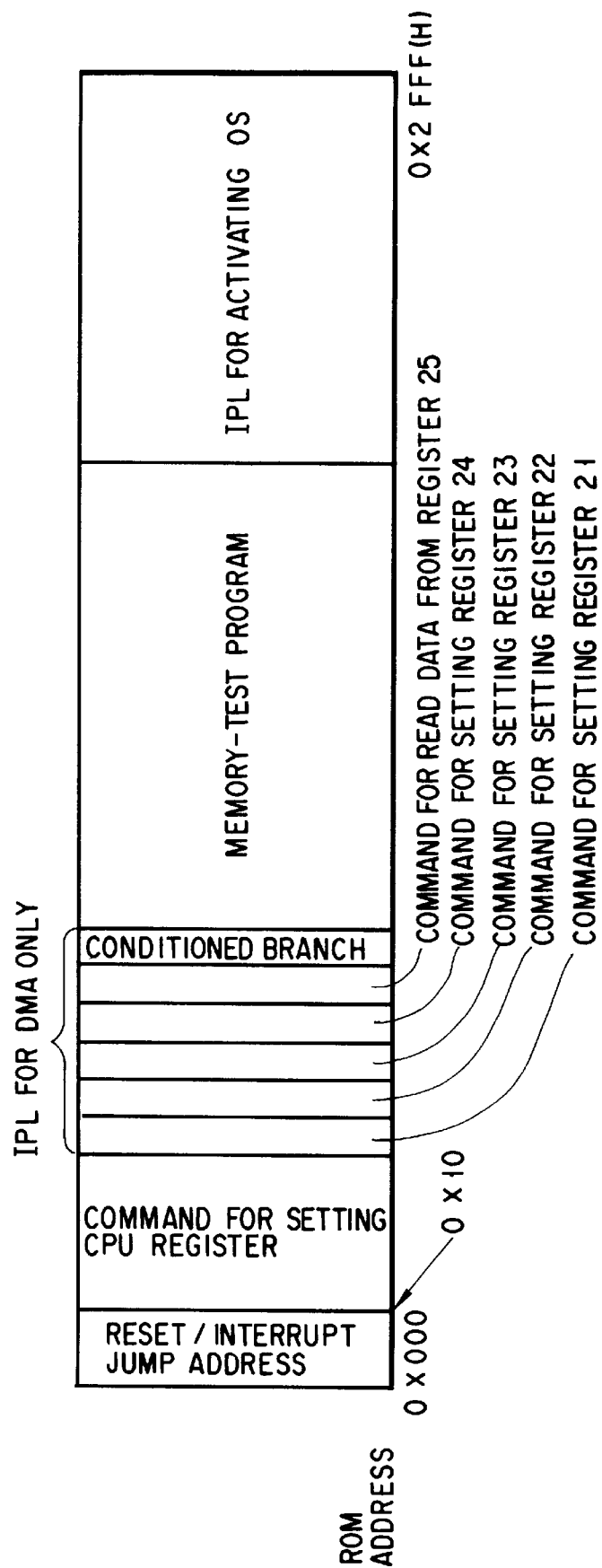
FIG. 31 is a diagram representing the boot-strap program stored in the ROM incorporated in the television receiver shown in FIG. 30.

FIG. 31 is a schematic representation of the bootstrap program stored in the ROM 15. Hereinafter, the memory addresses will be expressed in hexadecimal notation.

The bootstrap program is stored in the addresses 0X00000000 to 0X00002FFF of the ROM 15. Stored at the addresses 0X00000000 to 0X00000010 is a jump address which will be used to reset or interrupt the television receiver. The jump address represents the start address of the bootstrap program which is executed automatically when the television receiver is reset. In the present embodiment, a command for setting CPU register and an IPL for the DMA device only are stored at the addresses 0X00000010 et seq., which are designated by a resent/interrupt jump address. The IPL for the DMA device is constituted by commands for setting the registers 21 to 24, a command for reading data from the status register 25, and a command for conditioned branch. When the command for setting CPU register is issued, parameters will be stored into the register provided in the CPU 313. When the CPU 313 issues commands for setting the registers 21 to 24, parameters will be stored into the internal registers 21 to 24. When the CPU 313 issues a command for reading data from the status register 25 is issued, parameters will be read from the status register 25. A memory-test program and an IPL for activating the OS are stored at the other addresses.

The CPU 313 resets the other components of the television receiver the moment the user turns on the power switch.

More specifically, the CPU 313 issues a reset address (0X00000000) to the ROM 15. The bootstrap program stored in the ROM 15 is thereby executed. The CPU 313 controls the other components in accordance with the programs stored in the ROM 15.

Figure 32:
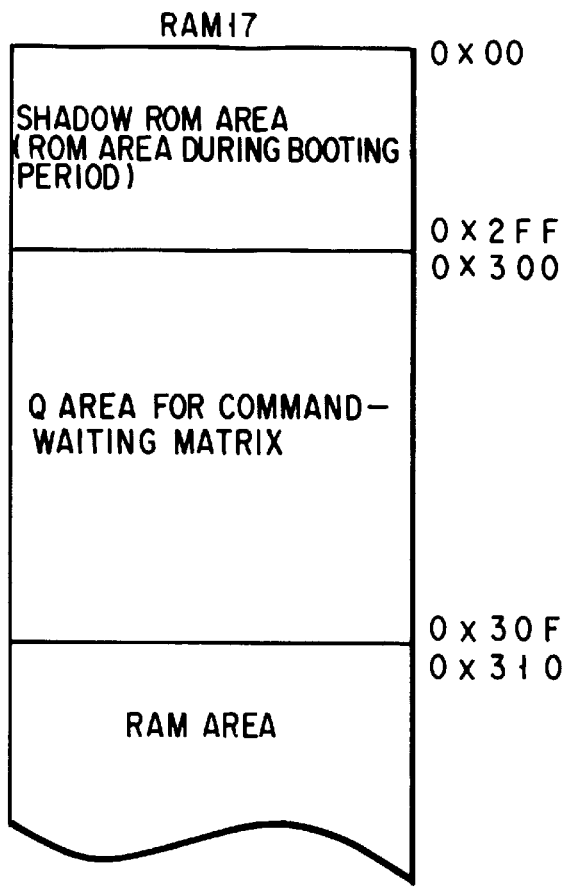
FIG. 32 is a diagram depicting the storage areas of the RAM incorporated in the television receiver shown in FIG. 30.

FIG. 32 depicts the storage areas of the RAM 17. A shown in FIG. 32, the RAM 17 has a shadow ROM area, a Q area, and a RAM area. The shadow ROM area is used as a ROM area while the bootstrap program is being executed. It consists of the addresses 0X00000000 to 0X00002FFF. The Q area is provided to store a command-waiting matrix and consists of the addresses 0X00000300 to 0X0000030F. The command-waiting matrix is written into and read from the Q area under the control of a remote-control microcomputer 19. The RAM area consists of the addresses 0X00000310 and et seq.

Connected to the remote-control microcomputer 19 is an IR receiver 18. The IR receiver 18 receives an infrared beam emitted from a remote controller (not shown) and converts the beam into a remote-control signal. The remote-control signal is input to the remote-control microcomputer 19. The microcomputer 19 converts the remote-control signal to a command, which is stored into the Q area of the RAM 17. Thus, as infrared beams are sequentially applied to the IR receiver 18, the remote-control microcomputer 19 supplies commands into the RAM 17, one after another.

Connected to the bus 302 is a two-way communication module 332. The module 332 receives upward data from the CPU 313, generating modulated data. The data is transferred to a broadcasting station.

Figure 34:
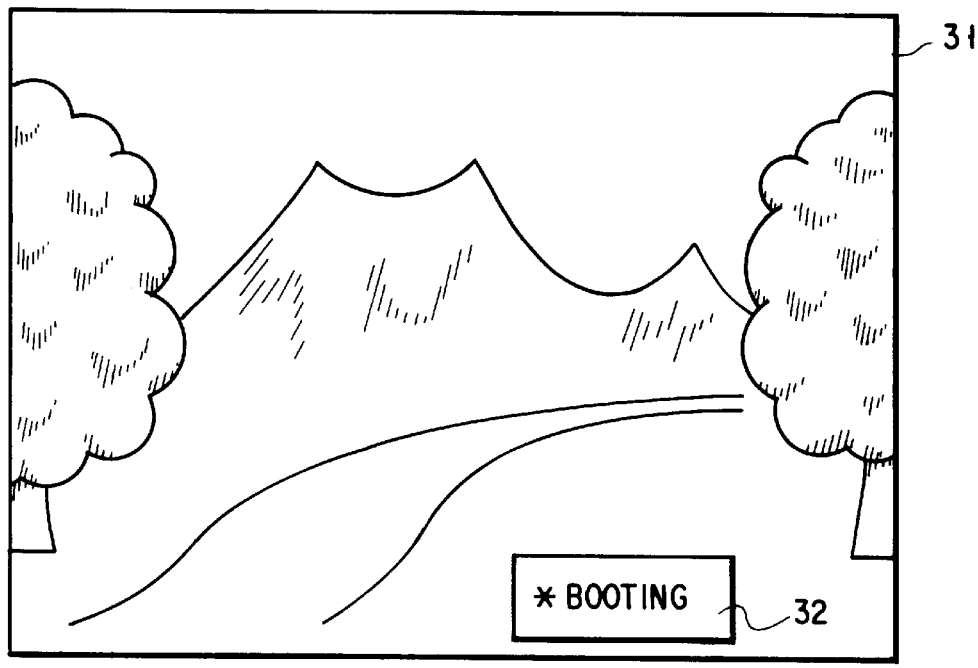
FIG. 34 is a diagram explaining an image displayed at the time of booting the television receiver shown in FIG. 30.

How the television receiver shown in FIG. 30 operates will now be explained, with reference to FIG. 4, and FIGS. 33 and 34. FIG. 33 is a chart, showing the write and read areas of the RAM 17, the read area of the ROM 15, and the addresses designated by the CPU 313. FIG. 34 shows an image displayed at the time of booting the television receiver.

When the user closes the power switch of the television receiver, the CPU 313 supplies the reset address (0X00000000) to the ROM 15, whereby the jump address (0X00000010) is read from the ROM 15. The CPU 313 issues the jump address. As a result, the data is read from the address (0X00000010) of the ROM 15. As described above, a command for setting the CPU 313 and an IPL for the DMA device 312 are stored at the jump address. Hence, the CPU 313 sets the address for storing the image data in the internal register 21, the address for storing the audio data in the internal register 22, the number of image data blocks to be transferred in the internal register 23, and the number of audio image data blocks to be transferred in the internal register 24. Once these parameters are set in the internal registers 21 to 24, the CPU 313 issues a read command to the status register 25. As a result, the parameters are read from the status register 25, determining that the DMA device 312 is operative. Now that the DMA device 312 is operative, the video signal and the audio signal can be transferred through the bus 302.

When the power switch is closed, the MIX 320, the video signal demodulator 3, the audio signal demodulator 4, the color-signal demodulator 5, the video A/D converter 6, the audio A/D converter 8, the bus 302, the back-end processor 311, and the amplifier 315 containing an audio DSP are reset. When reset, these function modules supplies interruption signals to the DMA device 312, indicating that they can process data and start receiving data. Thus, the television receiver starts receiving TV signals after the IPL for the DMA device 312 is executed, even if neither the memory-text program nor the IPL for activating the OS has been executed. Once the parameters are set in the DMA device 312, the DMA device 312 can control the transfer of data through the bus 302, not controlled by the CPU 313 at all.

The MIX 320 selects one of the TV signals the antenna 318 have generated. The video signal demodulator 3 demodulates the output of the MIX 320, producing a baseband video signal. The video signal is input to a color-signal demodulator 5, which demodulates the video signal, producing a R signal, a G signal, and a B signal. The video A/D converter 6 converts the R, G and B signals to digital video data, which is supplied to a bus 302. The output signal of the MIX 3 is supplied to the audio A/D converter 8, which converts the signal to digital audio data. The digital audio signal is supplied to the bus 302.

The DMA device 312 transfers the digital video data to the VRAM 10 and the digital audio data to the amplifier 315, in accordance with the parameters set in the internal registers 21 to 24. The video data is read from the VRAM 310 to the back-end processor 311. The processor 311 converts the video data to an analog signal, which is input to the CRT 317. The CRT 317 displays the image represented by the analog video signal supplied from the back-end processor 311. On the other hand, the amplifier 315 converts the digital audio data into an analog speech signal, which is supplied to the speaker 316. The speaker 316 generates a speech represented by the analog speech signal.

As can be understood from the above, the function modules operate independently of one another, not controlled by the OS. It is the DMA device 312 which synchronizes the video signal and the audio signal.

The CPU 313 continues bootstrap processing while the video signal and the audio signal are being processed. More specifically, as shown in FIG. 33, the CPU 313 reads the memory-test program from the ROM 15 upon executing the IPL for the DMA device 312, thereby testing the RAM 17. While testing the RAM 17, the CPU 313 outputs a boot-message data to the back-end processor 311 through the DMA device 312. The back-end processor 311 synthesizes the boot-message data with the image data read from the VRAM 310, generating composite image data. The composite image data is supplied to the CRT 317. The CRT 317 displays a message "*BOOTING" on its screen, as illustrated in FIG. 34. Seeing this message, the user can understand that the computer section is now in booting state. In view of this, the television receiver is user-friendly.

Next, the CPU 313 reads the OS-activating IPL from the ROM 15 and executes it. More precisely, the CPU 313 transfers the core of the OS into the RAM 17 so that it may accessed quickly. After the OS is thereby booted, the addresses 0X00000000 to 0X00002FFF of the RAM 17, which have been used as ROM area, are switched from a ROM area to a RAM area as a shadow ROM.

After the OS has been booted, the function modules and the DMA device 312 are set under the control of the OS. As long as data is transferred through the bus 302, the function modules are operating. When the modules are set under the control of the OS while operating, they may not be controlled momentarily. Errors may occur in the transfer of data through the bus 302. In the worst case, the television receiver may malfunction. To prevent data transfer errors, it is required that the modules be released from the control of the DMA device 312 into the control of OS at a time when no data is transferred through the bus 302 and when the quality of the image displayed is not affected at all.

Therefore, the CPU 313 switches the DMA control to the OS control during a non-display period (e.g., vertical blanking period) when no data is transferred through the bus 302 and the image displayed is not influenced at all. The CPU 313 controls the back-end processor 311, which supplies boot-message data to the CRT 317. The CRT 317 displays a message "*BOOTING" on its screen. Thus, the television receiver is set, as a whole, under the control of the OS.

One of the NTSC signals which the antenna 318 has generated from the ground waves can be selected even while the CPU 313 is booting the OS. However, two-way communication cannot be achieved during the booting of the OS. This is because the two-way communication module 332 cannot operate unless it is controlled by the OS. It follows that the user cannot receive service such as "home shopping." Nonetheless, the television receiver enables the user to input commands into the personal computer section to receive any two-way communication service—before the CPU 313 boots the OS completely.

Assume the user operates the remote controller (not shown) to input a command to receive a two-way communication service, before the CPU 313 boots the OS completely. When operated, the remote controller emits an infrared beam. The IR receiver 18 receives the infrared beam and converts it into a remote-control signal, which is input to the remote-control microcomputer 19. The microcomputer 19 converts the remote-control signal to a command. The command is readily stored as a command-waiting matrix into the Q area of the RAM 17. This is because the Q area consists of the addresses 0X00000300 to 0X0000030F which are close to the first address of the RAM 17 as shown in FIG. 32 and which are therefore tested soon after the test of the RAM 17 is started.

When the OS is completely booted, the television system is set under the control of the OS. The remote-control microcomputer 19 immediately starts searching for the Q area. The microcomputer 19 executes commands one after another, if any in the Q area. The microcomputer 19 supplies data indicating the commands executed, to the CPU 313 in order to smoothen the OS control.

The user may utilizes a GUI (Graphics User Interface) may be utilized in order to receive various services at the television receiver. Generally it is meaningless for the user to operate a GUI cannot before the OS is booted. Nevertheless, with the present embodiment (FIG. 30) it is possible for the user to input commands through a GUI before the OS is booted, if the user have well learned how to operate the GUI to receive two-way communication services. In view of this, too, the television receiver is useful.

As described above, with the television receiver shown in FIG. 30 it is possible to set parameters in the internal registers 21 to 24 of the DAM 312 right after the user has closed the power switch and well before the test program and the OS-activating IPL are read from the ROM 15. The modules incorporated in the receiver can therefore operate to process video data before the OS is booted, enabling the user to enjoy seeing a TV program at once. In other words, the television receiver can receive TV signals within a short time after the power switch has been turned on. The receiver is useful, particular to a user who wants to enjoy TV programs.

As described above, the CPU 313 continues bootstrap processing even while the video signal and the audio signal are being processed immediately after the power switch has been turned on. This means that the video and audio signals can be processed under the control of the OS once after the OS is booted. Namely, the CRT 317, for example, can display images under the control of the CPU 313. Furthermore, the commands generated by operating the remote controller before the OS is booted can be stored into the Q area of the RAM 17. These commands can be executed once after the OS is booted. The television receiver shown in FIG. 30 is, therefore, user-friendly.

FIG. 35 illustrates another television receiver according to the present invention. This television receiver differs from the television receiver shown in FIG. 30, only in two respect. First, parameters are read from a boot ROM 46 provided in the DMA device and set in the internal registers of the DMA device. Second, a DMA device 41 is used in place of the DMA device 312, and ROMs 42 and 43 in place of the ROM 15, and a RAM 44 in place of the RAM 17. The components similar or identical to those shown in FIG. 30 are denoted at the same numerals and will not be described in detail.

Figure 37:
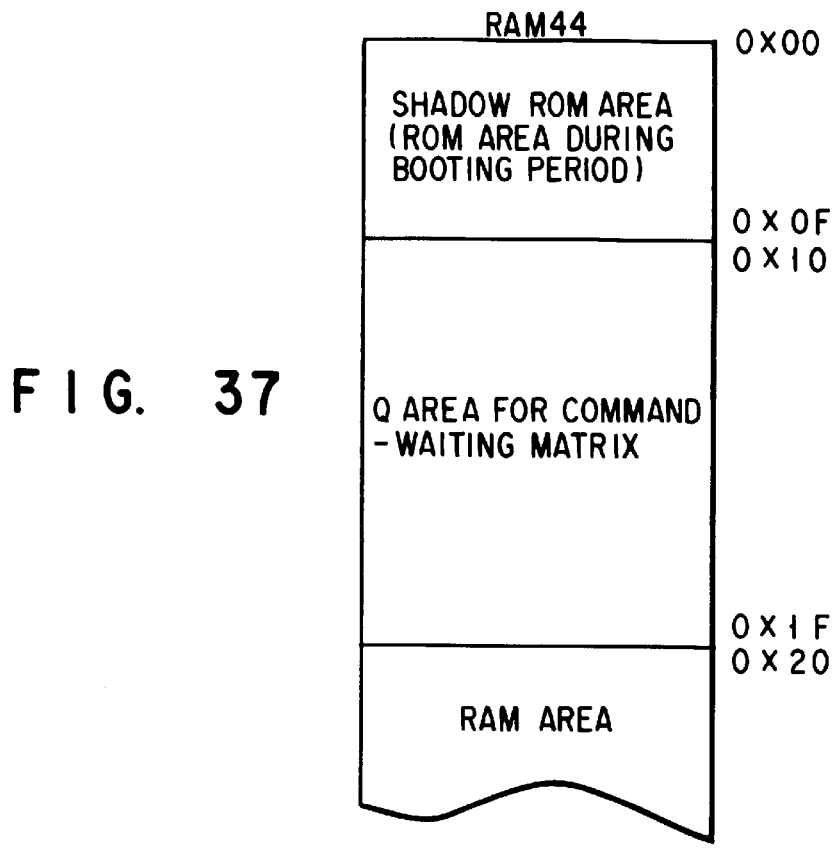
FIG. 37 is a diagram depicting the storage areas of the RAM incorporated in the television receiver shown in FIG. 35.

FIG. 36 shows the contents of the ROMs 42 and 43 and those of boot ROM 46. FIG. 37 depicts the storage areas of the RAM 44.

The ROMs 42 and 43 stores the bootstrap programs which the CPU 313 will read immediately after the power switch is closed. As shown in FIG. 36, the ROM 42 has addresses 0X00000000 to 0X00000010, at which a resent/interrupt jump address is stored. The ROM 42 stores the first address 0XF0000000 of the ROM 43 as a jump address. A command for setting CPU register, a command for initializing the DMA device 41, a memory-test program, and an IPL for activating the OS are stored at the addresses 0XF0000000 to 0XF0002FFF.

As shown in FIG. 35, the DAM device 41 has the boot ROM 46. It also has registers A to D and a status register (not shown). The registers A to D stores initial parameters which are required to process video and audio signals to display images. The status register stores data indicating whether the DMA device 41 is ready or not. As shown in FIG. 36, the boot ROM 46 stores commands for setting parameters in the resistors A to D, a command for reading data from the status register, and a conditioned-branch command. The DMA device 41 reads the contents of the boot ROM 46 upon receipt of a DMA-initializing command from the CPU 313. The DMA device 41 is thereby booted, and its configuration is established.

As shown in FIG. 37, the RAM 44 has a ROM area, a Q area and a RAM area. The shadow ROM area is set in the ROM area when the CPU 313 performs bootstrap processing and consists of addresses 0X00000000 to 0X0000000F and addresses 0XF0000000 to 0F0002FFF. The Q area is provided to store a command-waiting matrix and consists of addresses 0X00000010 to 0X0000001F. Data is read into and read from the Q area under the control of the remote-control microprocessor 19. The RAM area consists of addresses 0XF0002FFF to 0XFFFFFFFF.

Figure 39:
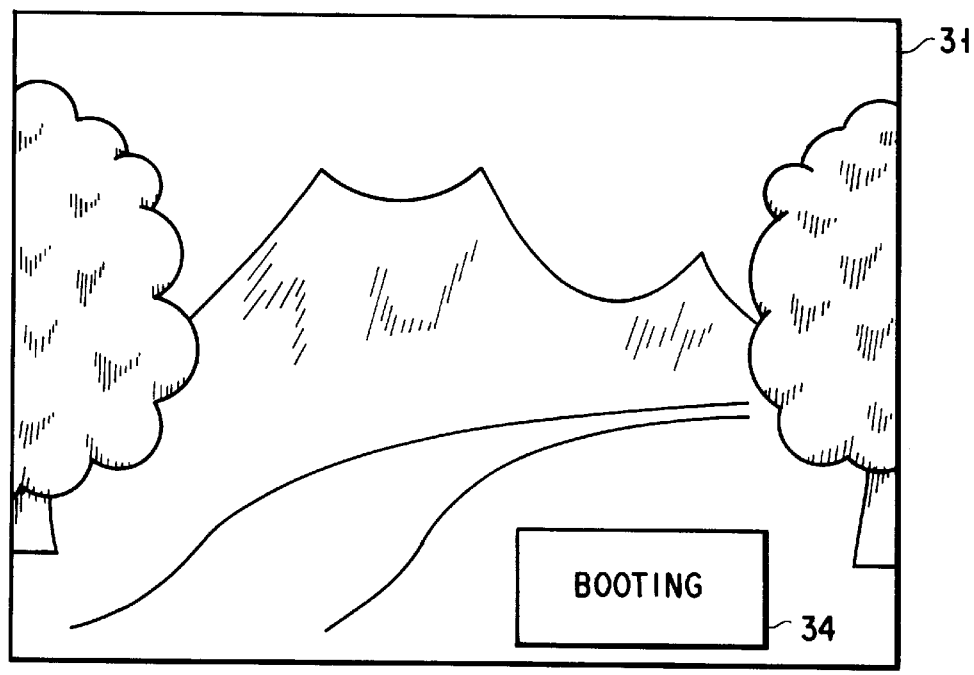
FIG. 39 is a diagram explaining an image displayed at the time of booting the television receiver shown in FIG. 35.

The operation of the television receiver shown in FIG. 35 will be explained with reference to FIGS. 38 and 39. FIG. 38 is a chart explaining the booting of the television receiver. FIG. 39 is a diagram explaining an image displayed at the time of booting.

When the power switch is turned on, the CPU 313 supplies a reset address (0X00000000) to the ROM 42 as shown in FIG. 38. The jump address stored in the ROM 42, at the addresses 0X00000000 et seq., is read out. The CPU 313 issues the jump address to the ROM 43. Data is thereby read from the ROM 43, from the first address (0XF0000000) and the following addresses.

The CPU 313 issues a command for setting the CPU register and a command for initializing the DMA device 41.

The DMA device 41 reads the data (FIG. 36) from the boot ROM 46 and executes this data. Parameters are thereby set in the registers A to D incorporated in the DMA device 41. The data stored in the status register is read, showing that the DMA device 41 is ready. Now that the DMA device 41 is ready, video and audio signals can be transferred through the bus 302.

Thereafter, the video and audio signals are processed under the control of the DMA device 41, not under the control of the CPU 313. As a result, the CRT 371 displays the image represented by one of the TV signals generated at the antenna 318, in the same way as in the television receiver shown in FIG. 30.

In this embodiment, too, the CPU 313 continues bootstrap processing even while the video signal and the audio signal are being processed. As shown in FIG. 38, the CPU 313 executes the command for initializing the DMA device 41, then reads the memory-test program from the ROM 43, and tests the RAM 44. Since the Q area is more closer to the first address of the RAM 44 than in the embodiment of FIG. 30, the Q area can be used within a shorter time from the start of the memory test. The CPU 313 controls a display controller 10, whereby the CRT 317 displays a message 35, i.e., "BOOTING," on the screen 31 as illustrated in FIG. 39.

Next, the CPU 313 reads the OS-activating IPL from the ROM 43 and executes it. More precisely, the CPU 313 transfers the core of the OS into the RAM 44 so that it may accessed quickly. The OS is thereby booted. The contents of the ROM 42 are transferred to the RAM 44 and stored at the addresses 0X00000000 to 0X0000000 thereof. The contents of the ROM 43 are transferred to the RAM 44 and stored at the addresses 0XF0000000 to 0XF0002FFF thereof. When the OS is completely booted, the addresses 0X00000000 to 0X00000010 of the RAM 44, which have been used as ROM area, are switched to a shadow ROM. After the OS has been booted, the function modules and the DMA device 312 are set under the control of the OS, as in the television receiver shown in FIG. 30. The commands generated by operating the remote controller are stored into the Q area of the RAM 44, and are read from the RAM 44 and executed after the OS is booted, as in the television receiver illustrated in FIG. 30.

The television receiver shown in FIG. 35 achieves the same advantages as the television receiver shown in FIG. 30. Since the Q area is tested earlier than in the receiver shown in FIG. 30, the present embodiment can more reliably receive the commands generated by operating the remote controller before the OS booting.

Figure 40:
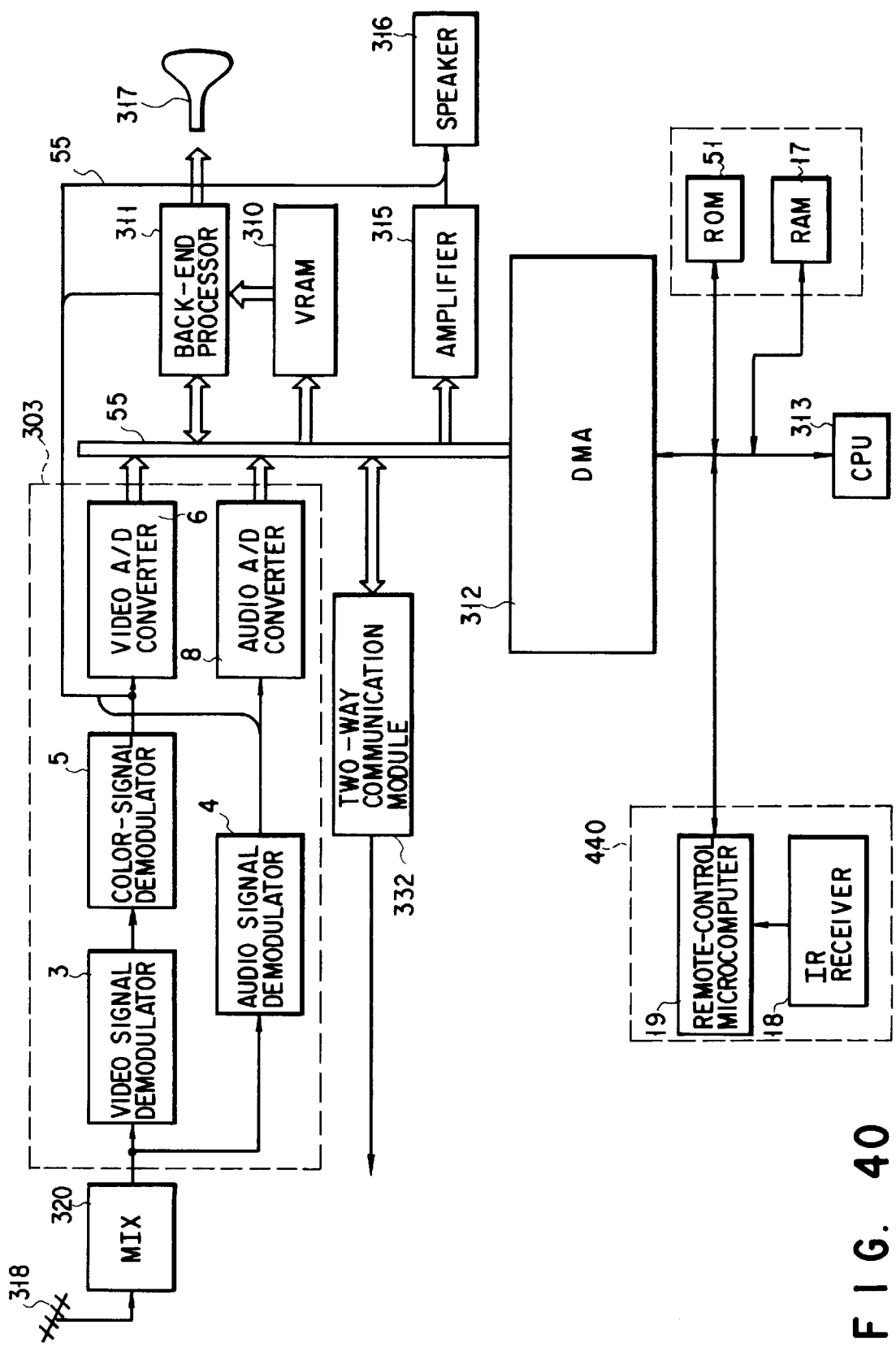
FIG. 40 is a block diagram illustrating another television receiver according to the present invention.

FIG. 40 shows still another television receiver according to the present invention. This television receiver differs from the television receiver shown in FIG. 30, in two respects. First, any analog TV signal received is transferred to the CRT 317, without being converted to a digital signal, and the back-end processor 311 connected to the CRT 317 has a display controller for processing the analog signal. Second, a ROM 51 and an analog bus 55 are used in place of the ROM 15 and the bus 302, respectively. The components similar or identical to those shown in FIG. 30 are denoted at the same numerals and will not be described in detail.

Figure 41:
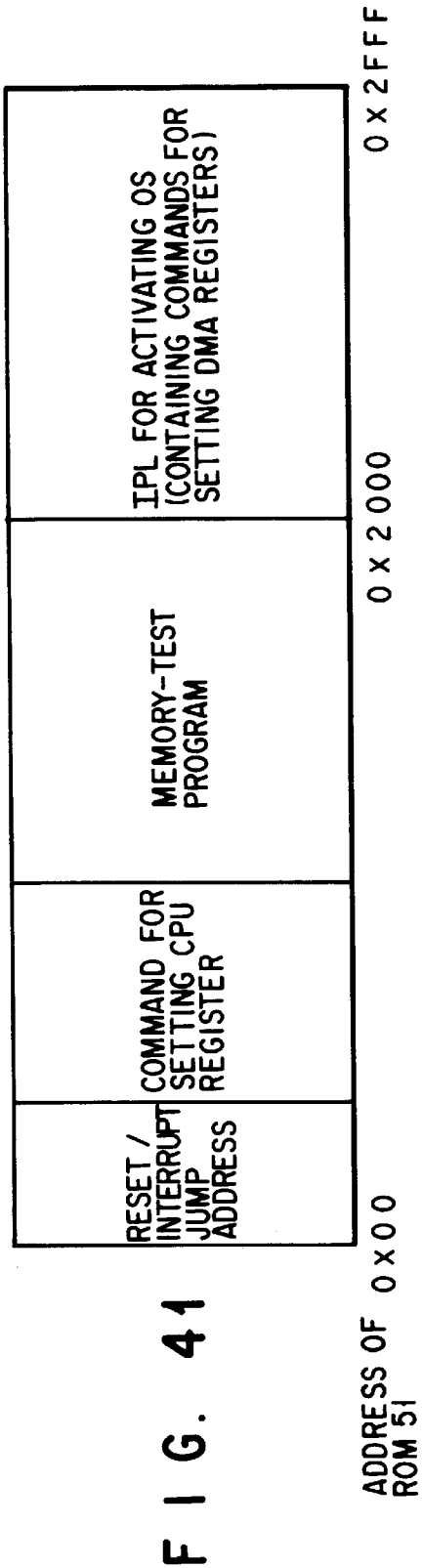
FIG. 41 is a diagram showing the contents of the ROM incorporated in the television receiver shown in FIG. 40.

FIG. 41 shows the contents of the ROM 51 shown in FIG. 40. As shown in FIG. 41, The bootstrap program is stored in the addresses 0X00000000 to 0X00002FFF of the ROM 51. Stored at the addresses 0X00000000 to 0X00002000 of the ROM 51 are a resent/interrupt jump address, a command for setting the CPU, and memory-test program. Stored in the addresses 0X0000200 to 0X00002FFF is an IPL for the DMA device. The IPL contains commands for setting the internal registers (not shown) of the DMA device 312. Thus, the contents of the ROM 51 are identical to the bootstrap program for used in ordinary microcomputers.

Figure 43:
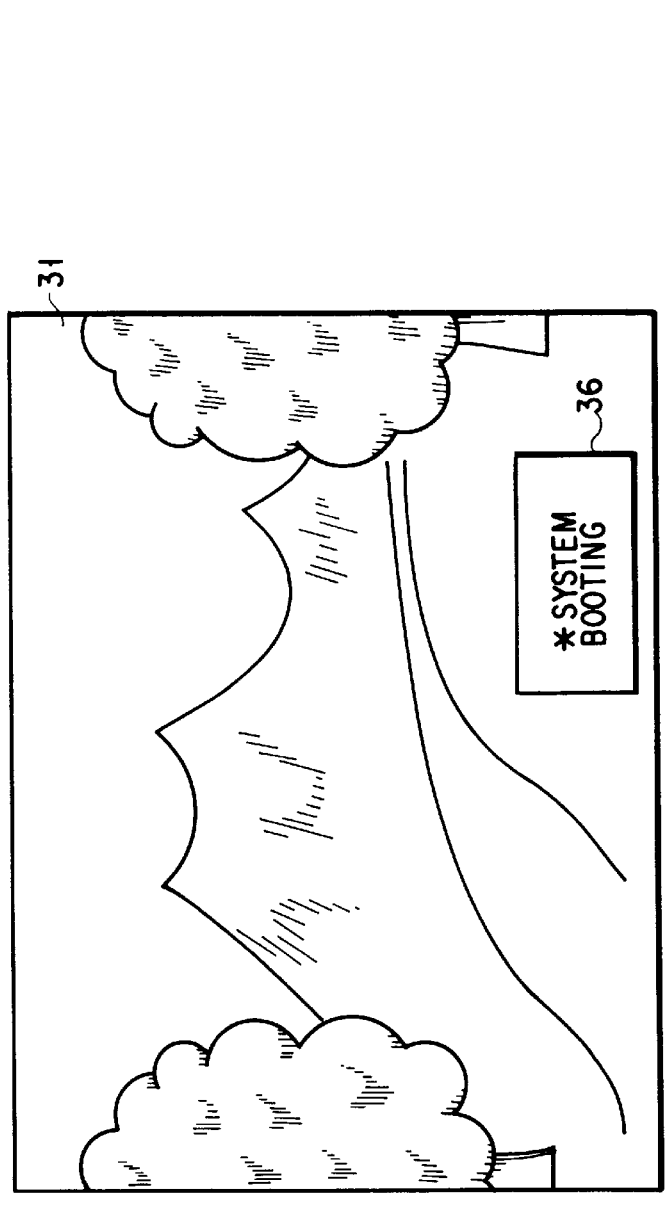
FIG. 43 is a diagram explaining an image displayed at the time of booting the television receiver shown in FIG. 40.

The operation of the television receiver shown in FIG. 40 will now be explained, with reference to FIGS. 42 and 43. FIG. 42 shows the read/write area of the RAM 17, the read/write area of ROM 51, and the addresses designated by the CPU 313, and explains the booting of the television receiver. FIG. 43 is a diagram explaining an image displayed at the time of booting.

A video signal can be transferred through the analog bus 55 immediately after a user turns on the power switch of the television receiver. The receiver operates in the same manner as an ordinarily television receiver, and the CRT 317 can display images even while the CPU 313 is performing bootstrap processing. Namely, R, G and B signals are supplied from the color-signal demodulator 5 to the back-end processor 311 through the analog bus 55, and the CRT 317 displays an image. Meanwhile, an audio signal is supplied from the audio signal demodulator 4 to the speaker 316 through the analog bus 55, and the speaker 316 outputs a speech represented by the audio signal. The back-end processor 311 causes the CRT 317 to display a message "*BOOTING" as shown in FIG. 43, until the other components of the television receiver 39 are set under the control of the OS.

When the power switch is turned on, the CPU 313 supplies a reset address (0X00000000) to the ROM 51 as shown in FIG. 42. The CPU 313 reads the jump address (0X00000010) stored in the ROM 51. Data is thereby read from the ROM 43, from the first address (0XF0000000) and the following addresses, and is executed. Further, the CPU 313 reads a command for setting the CPU register and a memory-test program from the ROM 51 and executes them sequentially. After the RAM 17 is tested, the CPU 313 transfers the core of the OS into the RAM 44 so that it may accessed quickly. Further, the CPU 313 reads the OS-activating IPL from the addresses 0X00002000 et seq. of the ROM 51, thereby setting parameters in the internal registers (not shown) of the DRAM device 312.

The CPU 313 reads the data from the status register (FIG. 30), determining whether the DMA device 312 is read or not. If the DMA is found to be ready, the CPU 313 completes the booting of the OS. When the OS is completely booted, the addresses 0X00000000 to 0X00002FFF of the RAM 17, which have been used as ROM area, are switched to a RAM area as a shadow ROM.

After the OS has been booted, the function modules and the DMA device 312 are set under the control of the OS, as in the television receiver shown in FIG. 30. Once the modules and the device 312 are set under the control of the OS, the bus 302 is used, in place of the analog bus 55, to transfer the video and audio signals. Thus, the R, G and B signals are supplied from the color-signal demodulator 5 to the video A/D converter 6. The converter 6 converts these signals to a digital video signal, which is transferred via the bus 302 to the VRAM 310. On the other hand, the audio signal supplied from the audio signal demodulator 4 is input to the audio A/D converter 8. The converter 8 converts the audio signal to a digital signal, which is supplied to the amplifier 315 through the bus 302. The converts the digital audio data to an analog speech signal, which is supplied to the speaker 316. The speaker 316 generates a speech represented by the analog speech signal. Thereafter, the video signal and the audio signal are processed under the control of the OS and converted into an image and a speech, respectively.

As indicated above, the R, G and B signals are converted to a digital video signal, and the digital video signal is stored into the VRAM 310. The digital video signal input via the bus 302 to the VRAM 310 and hence input to the back-end processor 311 is delayed about 1 or 2 field-period with respect to the video signal input to the back-end processor 310 through the analog bus 55. Due to this delay, the image displayed by the CRT 317 is distorted at the time the function modules are set under the control of the OS. In order to prevent such distortion, the control under the OS at the time of changing one channel to another Alternatively, the control of the function modules may be switched during the blanking period of the TV signal or during the changing of scenes. The blanking period can be detected by monitoring the sync signal. The change of scenes can be detected when the inter-frame difference signal monitored is greater in magnitude than a preset value.

The commands generated by the remote controller are stored into the Q area of the RAM 17, read out from the Q area, and executed by the remote-control micro-computer 19 after the OS booting, exactly in the same manner as in the television receiver illustrated in FIG. 30.

The television receiver shown in FIG. 40 achieves the same advantages as the television receiver shown in FIG. 30.

As described above, the OS-activating IPL stored in the ROM 51 initializes the DMA device 312 in the television receiver shown in FIG. 40. Instead, a boot ROM may be incorporated into the DMA device 312, so as to initialize the DAM device 312 automatically in response to a boot start-up command supplied from the CPU 313.

The present invention is not limited to the embodiments described above. Rather, various changes and modification can be made, without departing from the scope and spirit of the invention. For instance, a memory may be provided to store exclusively the command-waiting matrix. Furthermore, the DMA device may be initialized automatically when the power switch is closed, not by the set command stored in the ROM or the boot ROM.

As has been described, the present invention can provide a television receiver which comprises a television section and a personal computer section, and in which the personal computer controls the television section to enable the television section to display a TV program shortly after the power-supply switch is turned on.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A television receiver comprising:
    a receiving module for receiving broadcast signals;
    an analog switch box for receiving signals from the receiving module;
    a demodulation module for demodulating a signal selected by the analog switch box and generating demodulated data therefrom;
    a first bus for carrying the demodulated data;
    a converting module for receiving the demodulated data via the first bus and converting the demodulated data to a data stream;
    a second bus for carrying the data stream;
    a decoding module for receiving the data stream via the second bus and decoding the data stream, thereby to generate decoded data;
    a third bus for carrying the decoded data;
    an image-outputting module for receiving the decoded data via the third bus and outputting an image represented by the decoded data;
    a speech-outputting module for receiving the decoded data via the third bus and outputting a speech represented by the decoded data;
    a bus controller connected to the analog switch box and the first, second and third buses;
    control means for controlling the receiving module, the converting module, the decoding module, the image-outputting module, and the speech-outputting module, by using the analog switch box, the first to third buses and the bus controller, thereby to change an operating mode of each module in accordance with the broadcast signals;
    a video encoder section and an audio encoder section connected between the second bus and the third bus;
    a packet section connected between the first bus and the second bus, for generating a packet from an output of the video encoder section and the output of [said] the audio encoder section; a modulating module connected between [said] the analog switch box and the first bus, for modulating the packet generated by the packet generated by the packet section; and
    a transmission module connected to the analog switch box, for transmitting an output of the modulating module in the form of the broadcast signals.

2. The television receiver according to claim 1, wherein externally input data is supplied to the third bus.

3. The television receiver according to claim 1, further comprising:
    memory means for storing a digital video signal output by the demodulating module;
    display means for reading the digital video signal stored in the memory means and displaying an image represented by the digital video signal;
    data-transfer control means for controlling transfer of data through the first to third buses;
    a ROM storing a bootstrap program for activating an operating system;
    an analog bus for supplying an analog video signal output from the demodulating module, to a display control section incorporated in the demodulating module; and
    control-shift control means for supplying the analog video signal to the display means through the analog bus and the display control section, for initializing the data-transfer control means in accordance with the bootstrap program stored in the ROM, thereby to transfer data through the first to third buses, and for activating the operating system, thereby to set the other components of the television receiver under the control of the operating system.

4. The television receiver according to claim 3, wherein the control-shift control means sets the components the television receiver under the control of the operating system while a scene is changing to another on a screen of the display means.

5. The television receiver according to claim 3, wherein the display means displays a message of "BOOTING" while the control-shift control means is executing the bootstrap program.

6. The television receiver according to claim 3, further comprising a RAM for storing a command generated by a device operated by a user, while the control-shift control means is executing the bootstrap program, and control means for reading and executing the command stored in the RAM after the components of the television receiver are set under the control of the operating system.

7. The television receiver comprising:
a receiving module for receiving signals that have been broadcast;
an analog switch box for receiving signals from the receiving module;
a demodulating module for demodulating a signal selected by the analog switch box and generating demodulated data therefrom;
a first bus for carrying the demodulated data;
a converting module for receiving the demodulated data via the first bus and converting the demodulated data to a data stream;
a second bus for carrying the data stream;
a decoding module for receiving the data stream via the second bus and decoding the data stream, thereby to generate decoded data;
a third bus for carrying the decoded data;
an image-outputting module for receiving the decoded data via the third bus and outputting an image represented by the decoded data;
a speech-outputting module for receiving the decoded data via the third bus and outputting a speech represented by the decoded data;
a bus controller connected to the analog switch box and the first, second and third buses; and
control means for controlling the receiving module, the converting module, the decoding module, the image-outputting module, and the speech-outputting module, by using the analog switch box, the first to third buses and the bus controller, thereby to change an operating mode of each module in accordance with the broadcast signals, wherein the receiving module includes an NTSC tuner, and ISDB tuner, and a CATV tuner;
the demodulating module includes a OPSK-demodulating section, a 640AM-demodulating section, an A/D converting section, and a clock-generating section; and
the converting module includes a depacket/descramble section for depacketizing and/or descrambling a demodulated signal generated by the demodulating module, and a descramble/through section for descrambling and/or passing the demodulated signal generated by the demodulating module.

8. The television receiver according to claim 7, wherein the demodulating module includes two MPEG2 video decoder sections, an MPEG2 audio decoder section, an NTSC/EDTV horizontal decoder section, and an EDTV vertical decoder section.

9. A television receiver comprising:
a receiving module for receiving broadcast signals;
an analog switch box for receiving signals from the receiving module;
a demodulating module for demodulating a signal selected by the analog switch box, thereby to generate demodulated data;
a first bus for carrying the demodulated data;
a converting module for receiving the demodulated data via the first bus and converting the demodulated data to a data stream;
a second bus for carrying the data stream;
a decoding module for receiving the data stream via the second bus and decoding the data stream, thereby to generate decoded data;
a third bus for carrying the decoded data;
an image-outputting module for receiving the decoded data from the decoding module through a third bus and outputting an image represented by the decoded data;
a speech-outputting module for receiving the decoded data via the third bus and outputting a speech represented by the decoded data;
a bus controller connected to the analog switch box and the first, second and third buses; and
control means for controlling the receiving module, the converting module, and the decoding module, the image-outputting module, and the speech-outputting module, by using the analog switch box, the first to third buses and the bus controller, thereby to change an operating mode of each module in accordance with the broadcast signals;
memory means for storing a digital video signal output by the demodulating module;
display means for reading the digital video signal stored in the memory means and displaying an image represented by the digital video signal;
data-transfer control mans for controlling transfer of data through the first to third buses;
a ROM storing a bootstrap program for activating an operating system; and
control-shift control means for initializing the data-transfer control means in accordance with the bootstrap program stored in the ROM, thereby to transfer data through the first to third buses, and for activating the operating system, thereby to set the other components of the television receiver under the control of the operating system, wherein the control-shift control means sets the components of the television receiver under the control of the operating system during a blanking period when no data is transferred through the third bus.

10. The television receiver according to claim 9, wherein the bootstrap program consists of an initializing command for initializing the data-transfer control means, a test program for testing the components of the television receiver, and an initial-program loader for loading the operating system, and the control-shift control means executes the initializing command, thereby initializing the data-transfer control means and then executes the test program and the initial-program loader.

11. The television receiver according to claim 9, wherein the ROM stores the initializing command at an address designated by the control-shift control means when the power switch is closed.

12. The television receiver according to claim 9, wherein the data-transfer control means has an internal register, and the initializing command includes a set command for setting addresses in the internal registers, to which the video and audio data is to be transferred through the first to third buses.

13. The television receiver according to claim 12, wherein the set command is transferred from the ROM.

14. The television receiver according to claim 12, wherein the set command is stored in a boot ROM incorporated in the data-transfer control means and activated by the set command supplied from the ROM.

15. The television receiver according to claim 9, wherein the display means displays a message of "BOOTING" while the control-shift control means is executing the bootstrap program.

16. The television receiver according to claim 15, wherein further comprising a RAM for storing a command generated by a device operated by a user, while the control-shift control means is executing the bootstrap program, and control means for reading and executing the command stored in the RAM after the components of the television receiver are set under the control of the operating system.

17. A television receiver comprising:

a receiving module for receiving broadcast signals;

an analog switch box for receiving signals from the receiving module;

a demodulating module for demodulating a signal selected by the analog switch box, thereby to generate demodulated data;

a first bus for carrying the demodulated data;

a converting module for receiving the demodulated data via the first bus and converting the demodulated data to a data stream;

a second bus for carrying the data stream;

a decoding module for receiving the data stream via the second bus and decoding the data stream, thereby to generate decoded data;

a third bus for carrying the decoded data;

an image-outputting module for receiving the decoded data via the third bus and outputting an image represented by the decoded data;

a speech-outputting module for receiving the decoded data via the third bus and outputting a speech represented by the decoded data;

a bus controller connected to the analog switch box and the first, second and third buses;

control means for controlling the receiving module, the converting module, the decoding module, the image-outputting module, and the speech-outputting module, by using the analog switch box, the first to third buses and the bus controller, thereby to change an operating mode of each module in accordance with the broadcast signals;

a video encoder section and an audio encoder section connected to the bus means;

a packet section for packetizing and output of the video encoder section and the output of the audio encoder section;

a modulating module connected between the analog switch box and the first bus, for modulating the packet generated by the packet section; and a transmission module connected to the analog switch box, for transmitting an output of the modulating module in the form of the broadcast signals.

* * * * *